US008615123B2

(12) United States Patent
Dabic

(10) Patent No.: US 8,615,123 B2
(45) Date of Patent: Dec. 24, 2013

(54) COIN IDENTIFICATION METHOD AND APPARATUS

(75) Inventor: Steven Dabic, Fountain Valley, CA (US)

(73) Assignee: IdentiCoin, Inc., Fountain Valley, CA (US)

( * ) Notice: Subject to any disclaimer, the term of this patent is extended or adjusted under 35 U.S.C. 154(b) by 0 days.

(21) Appl. No.: 13/577,898

(22) PCT Filed: Sep. 7, 2011

(86) PCT No.: PCT/US2011/050719
§ 371 (c)(1), (2), (4) Date: Aug. 8, 2012

(87) PCT Pub. No.: WO2012/036956
PCT Pub. Date: Mar. 22, 2012

(65) Prior Publication Data

US 2012/0301009 A1 Nov. 29, 2012

Related U.S. Application Data

(60) Provisional application No. 61/383,298, filed on Sep. 15, 2010.

(51) Int. Cl.
*G06K 9/62* (2006.01)

(52) U.S. Cl.
USPC ........... 382/136; 382/135; 382/137; 382/138; 194/317; 194/328; 194/334

(58) Field of Classification Search
USPC ......... 382/136, 135, 140, 168, 171, 172, 199, 382/203, 270, 169, 273, 138, 139; 194/317, 194/302, 303, 318, 319, 330, 331, 217, 347, 194/216, 218, 348, 349
See application file for complete search history.

(56) References Cited

U.S. PATENT DOCUMENTS

| | | | | |
|---|---|---|---|---|
| 4,811,040 | A | 3/1989 | Madsen | |
| 4,899,392 | A | 2/1990 | Merton | |
| 5,133,019 | A | 7/1992 | Merton | |
| 5,220,614 | A * | 6/1993 | Crain | 382/136 |
| 5,224,176 | A | 6/1993 | Crain | |
| 5,909,793 | A | 6/1999 | Beach et al. | |
| 6,318,536 | B1 * | 11/2001 | Korman et al. | 194/217 |
| 6,484,865 | B1 * | 11/2002 | Hibari et al. | 194/330 |
| 6,560,547 | B1 | 5/2003 | Bartsch et al. | |
| 6,634,482 | B1 | 10/2003 | Miele | |
| 6,685,000 | B2 | 2/2004 | Sugata et al. | |

(Continued)

FOREIGN PATENT DOCUMENTS

EP 0 439 669 8/1991

*Primary Examiner* — Mekonen Bekele
(74) *Attorney, Agent, or Firm* — Cislo & Thomas LLP

(57) ABSTRACT

A coin identification method and apparatus capable of reliably acquiring stable two-dimensional images of both surfaces of coins 217, and using the acquired two-dimensional images to perform identification and discrimination, reliably and at high speed, between coin denomination, types, dates and origins of mint. In a coin pathway, imaging devices 207*a,b* are positioned at an image-capture position such that images above and below the surface of passing coins are captured under illumination. The coin denomination is identified by geometric measurements of enhanced images, the coin type is identified by matching templates to enhanced images, and the coin date and mint are identified using template matching to segmented sub-images. In one embodiment, the coin identification information is used for the promotion of a coin counting service. The results are displayed in an entertaining and engaging manner.

16 Claims, 44 Drawing Sheets

(56) References Cited

U.S. PATENT DOCUMENTS

| | | | | |
|---|---|---|---|---|
| 6,688,449 | B1 | 2/2004 | Yamagishi | |
| 6,819,410 | B2 | 11/2004 | Adameck et al. | |
| 7,010,154 | B2 * | 3/2006 | Sugata | 382/136 |
| 7,044,285 | B2 | 5/2006 | Takebayashi | |
| 7,185,750 | B2 | 3/2007 | Sugata et al. | |
| 7,209,582 | B2 | 4/2007 | Takahashi | |
| 7,620,231 | B2 * | 11/2009 | Jones et al. | 382/137 |
| 8,437,532 | B1 * | 5/2013 | Jones et al. | 382/138 |
| 2002/0037096 | A1 * | 3/2002 | Sugata | 382/136 |
| 2002/0074209 | A1 * | 6/2002 | Karlsson | 194/330 |
| 2004/0108183 | A1 * | 6/2004 | Sugata et al. | 194/328 |
| 2007/0047795 | A1 | 3/2007 | Takahashi | |
| 2008/0133411 | A1 | 6/2008 | Jones et al. | |
| 2009/0305620 | A1 | 12/2009 | Hino et al. | |

* cited by examiner

Fig. 9A
Fig. 9B
LIBERTY
1995
QUARTER DOLLAR
UNITED STATES OF AMERICA

Fig. 11A
Fig. 11B
LIBERTY
1995
QUARTER DOLLAR
UNITED STATES OF AMERICA

-4°

-2°

0°

+2°

+4°

COIN IDENTIFICATION METHOD AND APPARATUS

TECHNICAL FIELD OF INVENTION

The present invention relates to an apparatus and method for identifying coins, more specifically identifying the denomination, type, date, and mint of coins which may be used for the discrimination of coins by said attributes and the promotion of a coin counter.

BACKGROUND OF THE INVENTION

Coin identification methods are often used for the purposes of determining the denomination and authenticity of coins and often for the purposes of mechanically discriminating coins based on that information. The most common coin discrimination devices, such as those used in automatic vending machines, coin-to-currency changers, gaming devices such as slot machines, bus or subway token "fare boxes", and the like, generally employ inductive coin testing methods to determine the denomination and authenticity of coins. These methods typically work by measuring the effect of a coin on an alternating electromagnetic field produced by one or more coils disposed at a passage through which a coin passes. The effect of the coin on the impedance of the coil(s) is dependent on one or more of the properties of the coin such as diameter, thickness, conductivity and permeability. The detection signals output from coil sensors of this type are concentrated in a basic pattern representative of these characteristics of the coin. By comparing the measured pattern with patterns established in advance, the genuine or counterfeit nature of the coin, and the denomination of the coin, can be determined.

More recently, optical sensors have been implemented to provide another method, or additional criteria, by which the denomination and authenticity of a coin may be determined. Optical sensor methods have been primarily directed towards the discrimination among coins of similar electromagnetic and physical properties, yet not authentic with respect to a specific sovereignty, such as coins originating from a foreign country or entity. In such methods, an optical sensor typically captures a two-dimensional image of a coin surface such as one of the faces, the periphery, or the ridge of the coin which is then used to perform pattern matching by comparing the acquired coin image to patterns of known coins to produce a discrimination signal. However, little effort has been directed towards the automated identification of coinage features deliberately minted, yet not universally present on coins of the same denomination or type, such as details indicating the date and the location of mint of a coin. Such information is desirable as it can be a source of novelty, entertainment and appreciation. Additionally, certain coins of particular date and mint are considered "rare" and are thus more valuable than coins of similar denomination yet produced with a differing date or mint. Currently, identifying and retrieving coins of specific date and mint from general circulation is difficult and time consuming. Date and mint information is typically determined "by eye," sometimes with the aid of magnification, and can often be taxing on the individual as the examination of a large number of coins can be tedious and time consuming. There is currently no device which automates the identification of these coin attributes, nor one which can do so at high speed and low cost.

Prior art has been directed towards capturing an image of a side of a coin, generating a binary image and discriminating the coin based on geometric relations among patterns detected in the binary image. In one such method, identification is based on the radius, number and area of connected regions and the distances between those connected regions; by comparing these measured values with those of known coins the authenticity and denomination of the coin is determined. However, methods of this type are insufficient for the robust identification of patterns not universally present on the denomination or type of coin detected, such as patterns indicative of the date and mint, which can have a plurality of shapes and features which subtly differ. For similar reasons, methods in which coin image data is highly abstracted, often in order to reduce computational complexity, prove insufficient to extract the desired coin attributes.

Much of the prior art makes use of the fact that coins can have authenticity and denomination specific information on the edge, periphery, or on both sides (obverse and reverse) of a coin, and thus the coin only needs to be imaged from one vantage point to determine the denomination and genuine nature of the coin. However, when date and mint information are present on a coin, that information tends to be present on only one side of the coin, thus both sides of a coin often need to be imaged to extract the desired information from the proper side of the coin. The need to capture and process images of both sides of a coin produces non-trivial difficulties which are not adequately overcome by the prior art, which are addressed by the invention described herein.

Prior art has been directed towards the use of MOS-type image sensors to capture coin images. MOS-type image sensors often suffer from blurring effects and geometrical distortion caused by the 'rolling shutter' of such sensors. One method overcomes these limitations by using an image acquisition method in which the image capture phase begins in advance, before a coin reaches a prescribed position, at which point the coin is briefly illuminated and the image capture is concluded. In several embodiments presented herein, rolling shutter issues arising from the use of MOS-type sensors are circumvented using a different, simpler method.

Prior art has been directed towards measuring the damage, or wear, of a coin using captured images of the sides of the coin. In one method, coins are advanced using a conveyor system; magnetic and image sensor data is then acquired of the coins and compared to data patterns of known coins. Other methods are aimed at the replication and automation of the grading processes used in the collectables industry to determine the quality of known coins. The methods and apparatuses described therein are generally unsuitable for the purposes of the present invention described herein.

Prior art has been directed towards converting circular images of coins into rectangular images and comparing those rectangular images to reference images for the purpose of determining the genuine or spurious nature of the coins. However, such methods produce non-linear spatial distortions that make robust identification difficult, especially for subtle details such as date and mint information. The method described herein does not require the transformation of circular images to rectangular images.

Prior art has been directed towards verifying the embossed nature of an imaged coin using special illumination and image processing methods. Such methods are also not necessary for the purposes of the invention described herein.

Devices capable of extracting denomination, type, date and mint information from coins may be used for the sorting of coins by such attributes as well as used to augment current devices that employ coin discrimination such as coin counters which typically aid untrained members of the general public in the conversion of their coins to cash. Such an augmented coin counting device could provide the return, compensation or redemption of users' coins deemed "rare" or valuable as well as provide entertainment for users of such devices and a means for promotion and loyalty for such devices. Such an augmented coin counting device may provide a sweepstakes-like experience for users as they are made aware of, or rewarded for, coins with additional value, be it collectible value, promotional value, monetary value, or otherwise, that the users were previously unaware of. Such an augmented coin counting device may provide entertainment to users which may be used to distinguish the device from that of competing products or services.

Prior art has been directed towards coin identification for the purpose of promotion and encouraging the use of coin counting kiosks. However the method described requires the minting and distribution of non-government issued promotional coins for which the winning/losing nature of the promotional coins cannot be visually determined. In said method, the winning/losing nature of a coin is made manifest only upon deposit into a coin counting kiosk, which detects, and discriminates on, the unique inductive signature of the promotional coin. The promotional methods described herein use the visual features of government issued coins, which do not require the additional minting and distribution efforts as the promotional coins described in the prior art, and for which the winning/losing nature, or relative place in a spectrum of rewards of the coin, can be visually determined prior to deposit.

Other uses for devices capable of extracting denomination, type, date and mint information from coins may be the aid in "vintage surveys" of coins in circulation conducted by central banks, minting agencies, government and academic authorities, etc. in which a large sample of coins is taken and the date and mint data is collected to determine statistics about the circulating money supply. Other areas of use may include sorting, entertainment, promotion or gaming.

SUMMARY OF THE INVENTION

In one embodiment, the method and apparatus described herein is implemented in conjunction with publicly used coin counting kiosks. Such coin counting devices are typically used for processing and/or discriminating coins or other objects, such as discriminating among a plurality of coins or other objects received all at once, in a mass or pile, from the user, with the coins or objects being of many different sizes, types or denominations. These coin counting devices typically have a high degree of automation and high tolerance for foreign objects and less-than-pristine objects (such as wet, sticky, coated, bent or misshapen coins), so that the device can be readily used by untrained members of the general public, requiring little or no human manipulation or intervention, other than inputting the mass of coins.

One aspect of the method and apparatus described herein is to identify the denomination, type, date, and mint of coins, or a subset of those coin attributes. In one embodiment, a plurality of coins are dropped into a hopper which then funnels the coins to a position where a carousel or other advancing mechanism can pick up individual, or a plurality of coins. The coin advancing mechanism is mechanically connected to a computer controlled stepper motor which allows the coins to be advanced along a coin sliding surface in discrete or continuous motion. The coin sliding surface, or a portion thereof, is transparent and coins passing over a specified region are illuminated by lighting sources. Imaging devices, such as cameras using CCD or CMOS type image sensors, then acquire digital images of both sides (or faces) of the coins, those which are adjacent to the coin sliding surface and those which are opposing.

A central computer or dedicated image processor then proceeds to process the two acquired digital images. A global threshold is applied to the acquired images resulting in black and white (binary) images; the white (positive) regions are then summed and if the resulting value is below a set threshold value, the images are discarded. If the resulting value is above the threshold value, the images are considered to be good candidates for containing coins or other objects. The images are then corrected for noise, background artifacts, geometric distortion, and camera orientation. The images then undergo an adaptive binary threshold and contours are detected in the resulting binary images. Contours with length smaller than a threshold value are rejected and ellipses are fit to the remaining contours using a least-squares fitting method. Ellipses with low eccentricity are considered good candidates for coins, and ellipses with an effective radius within the range of a valid coin radius are considered for further processing. For US coins, the effective radius typically indicates the denomination candidate of the coin imaged, which is further confirmed or disconfirmed upon subsequent processing. The location of the ellipse fitted to the contour of a valid coin is then used to crop the image in order to isolate the image of the individual coin for further processing. In the case of multiple coin processing, prior camera calibration and location coincidence criteria allows for images of the obverse and reverse sides of valid coins to be properly paired for further processing.

The binary image resulting from the adaptive threshold stage provides information indicative of the embossed detail of the coin due to a lighting configuration in which the coins are illuminated at a large angle relative to the normal of the sides of the coins. This binary image is then fit to templates of coins of known denomination and type at a plurality of rotational orientations. The template exhibiting the best fit identifies the orientation, type and respective face of the coin depicted in each image as well as provides further confirmation of the denomination of the coin. The acquired images are then corrected for the orientation of the coin.

Subsections of the rotationally corrected binary images are then taken from regions where date and mint information should approximately be located. These cropped images containing date and mint information are then matched to templates of all possible date and mint information for the particular coin denomination and type identified. The best match renders the date and mint information contained in the images. Various metrics and machine-learning algorithms can be further applied to the images and template matching results in order to improve recognition accuracy.

In one embodiment, the user of the coin counting kiosk is made aware of the denomination, type, date and mint data collected from their deposited coins using a monitor, or touch-screen, connected to the kiosk. This collected coin data and the natural rarity of specific types, dates and mints of coins in present circulation is used as the basis for entertainment, loyalty and promotion of the coin counting kiosk. Points, prizes, coupons, merchandise, badges, honors or publicity may then be awarded to the user based on the user's coin data and the likelihood of specific coins, groups of coins or other derivative events. Users' coin data is saved to a central database, via a modem or other communications facility connected to the coin counting kiosk, to allow users to access their coin data, and any derivative data, from auxiliary platforms such as computers, social networking platforms, social media outlets, mobile devices, Point-of-Sale (POS) systems, customer loyalty systems as well as from the same or a different coin counting kiosk.

In one embodiment, the denomination, type, date and mint of each processed coin is compared to a database of "rare" and/or user-defined coins. The user may then be informed of coins processed which match the database criteria, upon which the coins may then be returned to the user or the user may be credited for the deposit of their coin.

DETAILED DESCRIPTION OF INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1A:
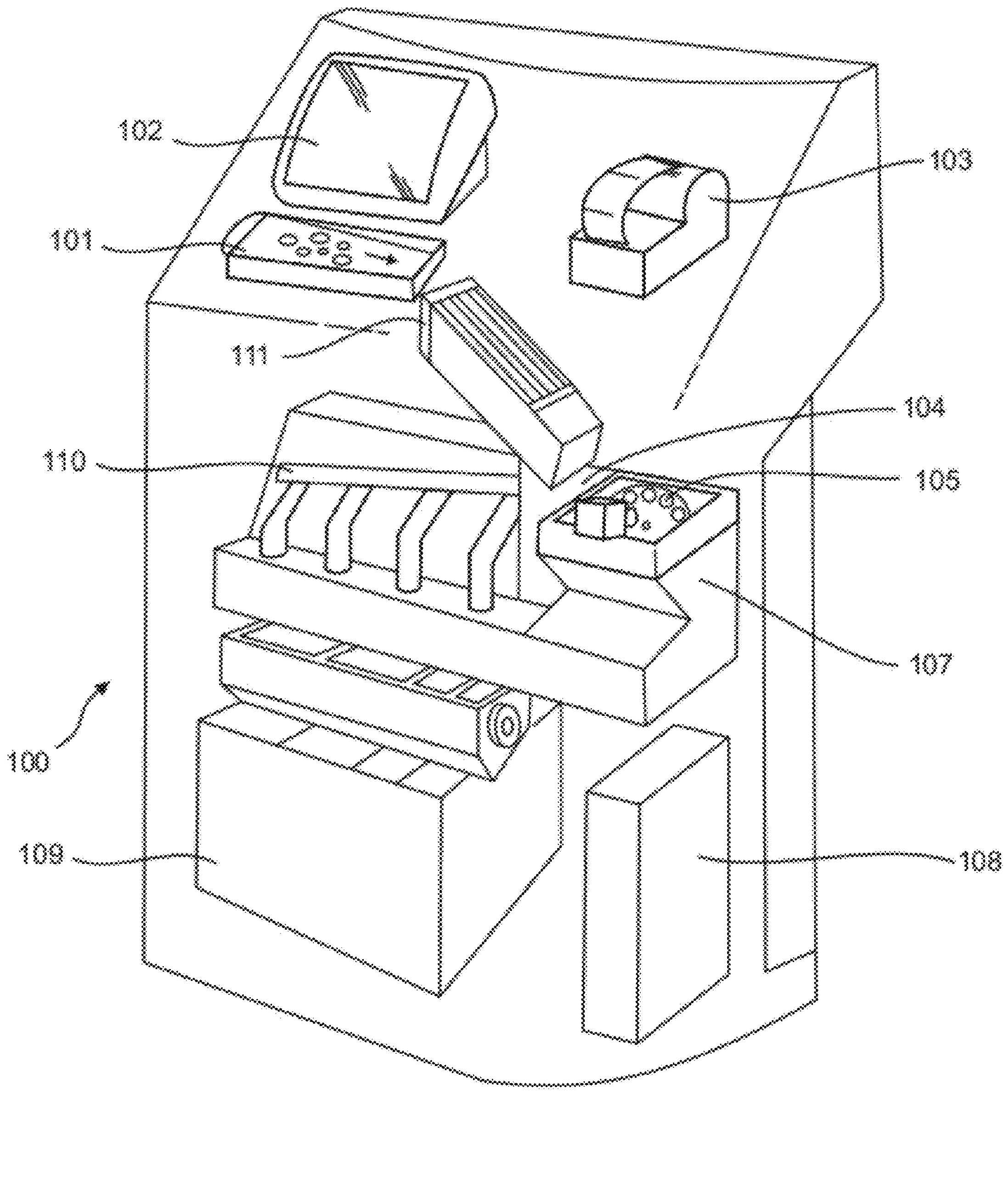
FIG. 1A depicts a coin handling apparatus that may be used in connection with an embodiment of the present invention.

The coin identification method and apparatus described herein can be used in connection with, or as an enhancement to, a number of devices and purposes. One such implementation is illustrated in FIG. 1A. In this device 100, coins are placed into a tray 101, and fed to an imaging region or area 105 via a first ramp 111 and coin pickup assembly 107. In the imaging region 105, image data is collected by which coins are identified by denomination, type, date, and origin of mint. Therefore, image data includes visible features on the obverse and reverse sides of coins, such as date of mint, place of mint or mint mark, inscription or legend (i.e. the portion of the coin on the obverse or reverse sides that tell us important things like who made the coin, Statehood, commemoration information, and denomination), the motto, the portrait, and the like. Optionally, a sensing region or area 104 can collect additional data, such as non-visual characteristics (weight, composition, etc.) by which coins can be discriminated from non-coin objects, and different denominations or countries of coins can be discriminated. The data collected at both the imaging region 105 and sensing region 104 can then be used by a computer 108 to control movement of coins along a second ramp 110 in such a way as to mechanically discriminate or route the coins into one of a plurality of bins 109. The computer 108 may output information such as the total value of the coins deposited by the user in addition to information visible on the obverse or reverse sides of the coin, such as the denomination, type, date, and origin of mint (collectively referred to hereafter as "primary attributes") of specific coins placed into the tray 101. Promotional value, such as statistics, graphics, prizes, promotions, vouchers, coupons, or loyalty program points relating to the coin attributes of the coins deposited by the user, may also be displayed via a printer 103, a screen 102, or the like. In the depicted embodiment, the coin pick up assembly 107 provides the coins to the imaging area 105 and sensing area 104 serially, one at a time. In another embodiment, a plurality of coins are provided to the imaging area 105.

Figure 1B:
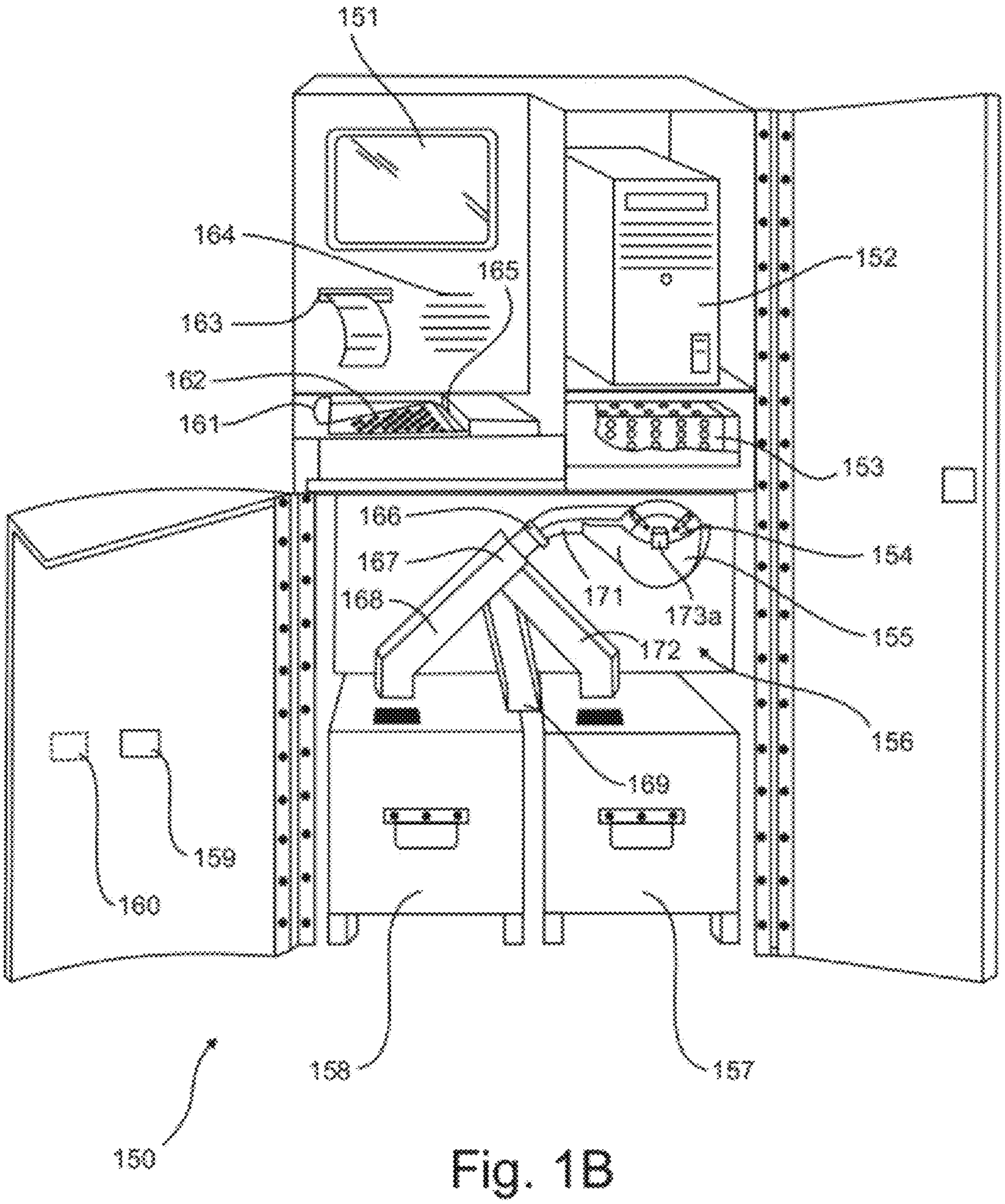
FIG. 1B depicts another coin handling apparatus that may be used in connection with an embodiment of the present invention.

Another implementation of the method and apparatus described herein is illustrated in FIG. 1B, which generally includes a coin imaging, counting and sorting portion 156 and a coupon/voucher dispensing portion 163. In the depicted implementation, the coin imaging, counting and sorting portion 156 includes an input tray 162, a coin return region 159, and customer I/O devices, including a speaker 164 and a "touch" video screen 151. In another embodiment, a keypad or mouse can be used for customer input along with a standard video monitor. Additionally, external lights such as LEDs can be used to signal the user during operation. A central computer 152 is used for coordinating the user interface with the operation of the apparatus. In some embodiments, the central computer 152 processes the image data collected in the coin imaging, counting and sorting portion 156. Image data can be any visible feature on obverse or reverse sides of a coin. The device 150 can include various indicia, signs, displays, advertisements and the like on its external surfaces.

The general coin path for the implementation depicted in FIG. 1B is from the input tray 162, down a chute to a coin tumbling device, or trommel 153, from which the coins fall into a hopper 155 which collects and guides the coins to a coin pickup assembly 154, along which the obverse and reverse sides of the coins are imaged by imaging sensors 173*a* and 173*b* (not shown in FIG. 1B). The coin pickup assembly 154 places the coins onto a coin rail 171 along which the coins pass a sensor 166 and move towards a means for mechanical discrimination of the coins. For example, if, based on the image data and/or sensor data, it is determined that the coin can and should be accepted, a controllable deflector flap 167 is activated to divert coins from their gravitational path to a coin tube 168 for delivery to a primary coin bin, or trolley, 158. If it has not been determined that a coin can and should be accepted, the deflector flap 167 is not activated, and coins (or other objects) continue down their gravitational or default path to a reject chute 169 for delivery to a customer-accessible reject or return box 159. In another implementation, specific coins may be returned to a special customer-accessible return box 160 or diverted via a second chute 172 into a special coin bin, or trolley 157 depending on user preferences and the data obtained by the imaging sensors. For example, coins of specific denomination, types, dates, and/or origins of mint, may be returned to the customer not in the customer-accessible reject or return box 159 but in the special customer-accessible return box 160. The criteria for returning a coin to the special customer-accessible return box 160 may be user-defined, predetermined, or a combination of the two. Additionally, the user may receive an audible signal via the speaker 164 and/or a visual signal via the touch-screen 151 notifying the user that a specific coin has been returned to the special customer-accessible return box 160. In another implementation, specific coins can be collected in a coin bin, or trolley 157 separate from the primary coin bin, or trolley 158. In another implementation, specific coins are returned along with rejected coins/objects to the customer-accessible reject or return box 159, and are accompanied with a signal on the touch-screen 151 and/or an audible signal or message from the speaker 164 notifying the user of the presence of a specific coin in the customer-accessible reject or return box 159.

In the implementation depicted in FIG. 1B the apparatus shown is used as follows. A user is provided with instructions such as on computer screen 151. The user places a mass of coins, typically of a plurality of denominations (typically accompanied by dirt or other non-coin objects and/or foreign or otherwise non-acceptable coins) in the input tray 162. The user is prompted to push a virtual or physical button to inform the machine that the user wishes to have coins discriminated and/or imaged. In a further implementation, users may specify if they wish the apparatus to return specific coins defined by the user based on the denomination, type, date, and/or origin of mint which may be in the plurality of coins to be processed by the apparatus 150. Thereupon, the computer 152 causes an input gate to open and illuminates a signal to prompt the user to begin feeding coins. The gate may be controlled to open or close for a number of purposes, such as in response to sensing a jam, sensing a load in the trommel 153 or coin pick-up assembly 154 or the like. When the gate is open, a motor is activated to begin rotating the trommel assembly 153. The user moves coins over the peaked edge 165 of the input tray 162, typically by lifting or pivoting the tray by a handle 161, and/or manually feeding coins over the peaked edge 165. The coins then pass the gate (typically set to prevent the passage of more than a predetermined number of stacked coins). Instructions on the computer screen 151 may be used to tell the user to continue or discontinue feeding coins, can relay the status of the machine, the amount of coins counted thus far, as well as information relating to the attributes of the coins input by the user, and any other information, including promotional value, such as loyalty points, prizes, coupons, awards, animations, video, etc.

Figure 2A:
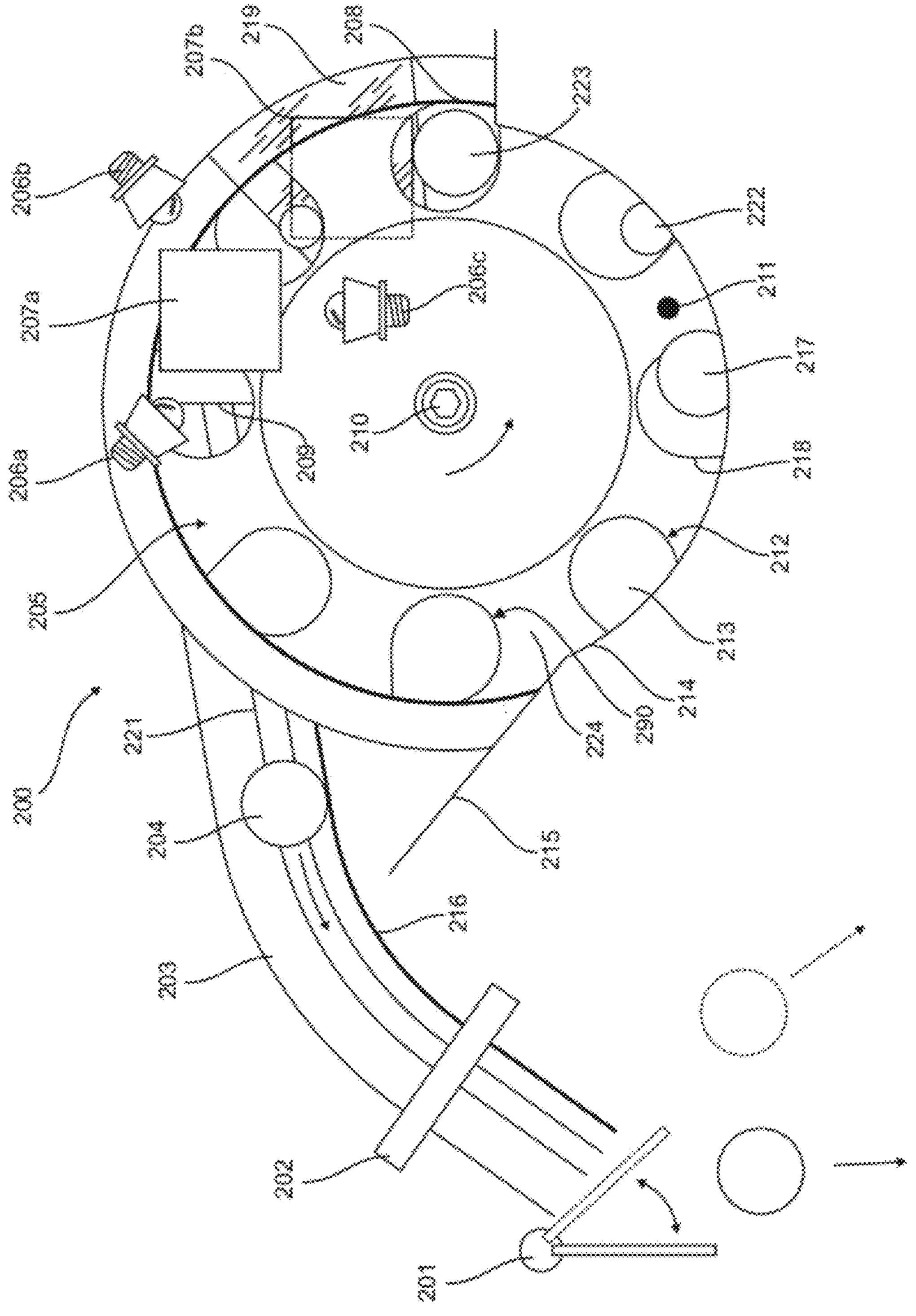
FIG. 2A is a side view of a coin pickup assembly, imaging sensor, coin rail, auxiliary sensor, and mechanical discrimination means according to an embodiment of the present invention.

FIG. 2A depicts a side view of an embodiment of a coin collection region, or hopper 214, a coin pickup assembly 205, imaging devices 207*a,b*, a guide rail 203, an auxiliary sensor 202 and a means for mechanical discrimination 201. Coins which fall into the hopper 214 are directed by the curvature of the hopper 214 towards the bottom position of the annular coin path defined by the periphery of the coin pickup assembly 205. In general, coins traveling over the downward-turning edge of the hopper are tipped onto their edge and, partially owing to the backward inclination of the apparatus, tend to fall into the annular space with their faces adjacent the face of a coin sliding surface 213, and/or the coin pickup assembly 205, as shown by the coin 217 in FIG. 2A. The coin sliding surface 213 may be composed of any type of hard material, such as plastic, thermoplastic, glass, metal, wood or some composite. In one embodiment, the coin sliding surface 213 is made of brushed stainless steel. In a further embodiment the stainless steel surface is treated with an anti-reflective coating or powdered coating with a matte black finish such that light is not easily reflected from the surface. In another embodiment, the coin sliding surface 213 is made of scratch resistant, optical grade glass such as Corning® Gorilla® Glass.

The coin pickup assembly 205, referred to hereafter as the carousel, is comprised of a circular plate 224 with machined holes or sockets 212, referred to hereafter as sockets, and a protrusion, extending axially outward along the circumference of the circular plate 224, referred to hereafter as the lip 208. In some embodiments, bumps or grooves may be placed on the lip 208 to facilitate the agitation of coins such that coins may position themselves into the sockets 212. Bumps or grooves may also be placed on the circular plate 224 of the carousel to facilitate coin agitation. The sockets 212 are cut through the circular plate 224 of the carousel 205 at regularly spaced intervals around and adjacent to the circumference of the circular plate 224. The sockets 212 are shaped such that they are conducive to capturing coins in the recess of the sockets 212.

For example, in one embodiment this shape consists of a circular region on the leading edge 290 with a flat portion on the trailing edge 218. The shape of the sockets 212 may also be sized such that only one coin can fit laterally in the recess at any one time. The thickness of the circular plate 224 of the carousel 205 is such that the recess formed by the sockets 212 allows for only one coin to sit on the ledge of the sockets 212 without sliding out. The axially oriented thickness of the lip 208 is such that coins which fall onto the carousel 205 can rest, or roll, on the lip 208 until they enter one of the sockets 212. The carousel 205 is affixed to an axle 210, about which the carousel 205 rotates. The front face 254 of the carousel 205 is parallel with the plane of the coin sliding surface 213; the opposing face of the carousel 205 is adjacent, or flush, with the coin sliding surface 213. The carousel 205 slides against the (stationary) coin sliding surface 213 upon rotation of the carousel 205. The carousel 205 may be made from any type of hard material, such as plastic, thermoplastic, glass, metal, wood or some composite. In one embodiment, the carousel 205 is constructed of hard plastic treated or painted such that it has low reflectivity of light. The underside of the carousel 205, that which is in physical contact with the coin sliding surface 213, may be composed of a different material conducive to low friction sliding against the coin sliding surface 213, such as a cloth or plastic, which may be attached to the underside of the carousel 205 with industrial glue, epoxy, mechanical fasteners, or the like. The carousel 205 may also have a calibration mark 211 placed at a radius such that it can enter the imaging area of the top camera 207*a* which allows for the calibration of the angular orientation of the carousel 205 with respect to the imaging devices 207*a,b*.

In another embodiment calibration marks are placed adjacent to every socket 212. The calibration mark 211 can be painted or be a separate material embedded in the carousel 205 such that it is flush with the circular plate 224 of the carousel 205. The calibration mark 211 can also be colored to produce a high contrast to the surface of the carousel 205, such as white or yellow.

The carousel 205 may be affixed to an axel 210 with a spring loaded coupler or any other device that provides a biasing force to keep the carousel 205 pressed flush against the coin sliding surface 213, preventing gaps between the carousel 205 and the coin sliding surface 213 through which coins may otherwise fall. Alternatively, or in addition to, a piece of material or biasing device around the circumference of the carousel 205 may apply uniform pressure, or provide a boundary, to the lip 208 of the carousel 205 to keep the carousel 205 flush to the coin sliding surface 213.

Figure 2B:
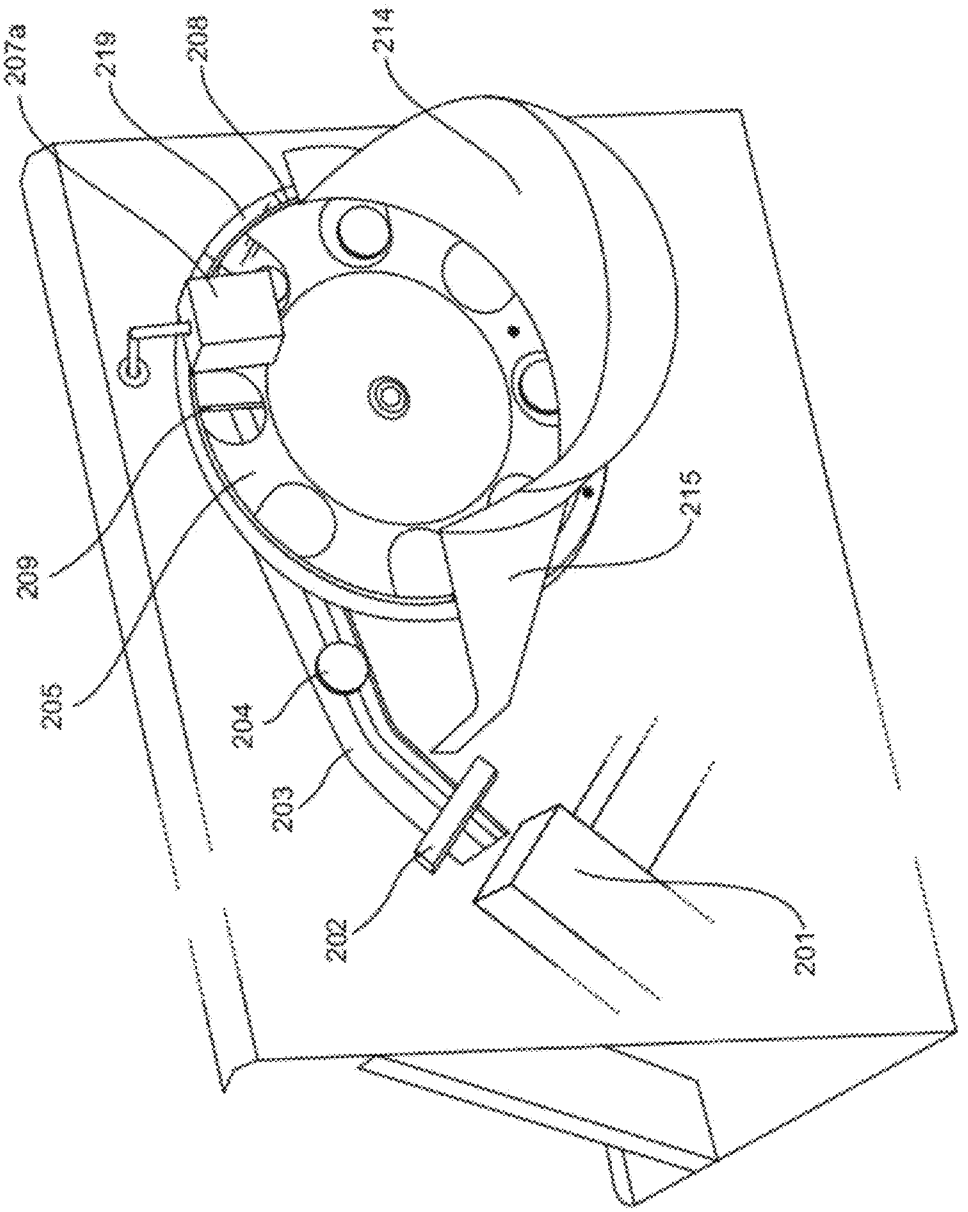
FIG. 2B is a perspective view of the front of the apparatus of FIG. 2A.
Figure 2C:
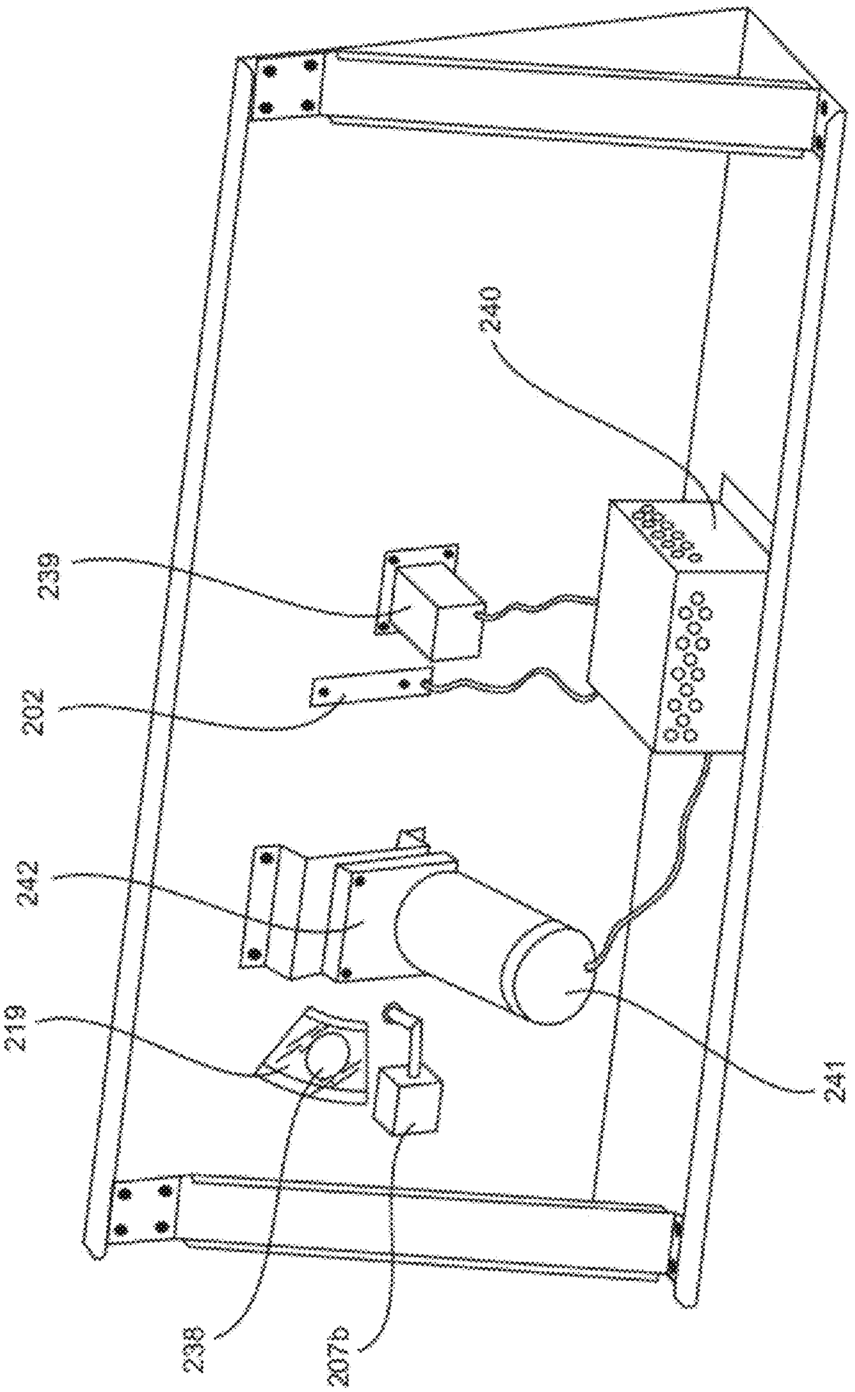
FIG. 2C is a perspective view of the rear of the apparatus of FIG. 2A.

The axle 210 on which the carousel 205 is affixed is connected to a motor 241 shown in FIG. 2C, which is a perspective view of the backside of a portion of the apparatus 200. In one embodiment, the motor 241 is computer controlled. In another embodiment, the motor 241 is a computer controlled stepper motor. The motor 241 may rotate the carousel 205 continuously or in discrete "steps" of specific angular displacement. In one embodiment, the steps are spaced such that the angular distance subtended by each advancement of the carousel 205 is equal to the angular spacing of the sockets 212. For example, in the carousel 205 depicted in FIG. 2A, the carousel 205 would be advanced in 45 degree increments. Between each advancement, the motor 241 pauses for a fixed or variable amount of time. In another embodiment, the angular displacement of each advancement is variable.

Discrete advancement of the carousel 205 may be achieved mechanically, with a dedicated circuit, or more preferably via a stepper type motor and a micro-controller 240 (FIG. 2C) which provides the interface between the stepper motor 241 and a central computer 152 (FIG. 1B). Additionally, a gearbox, or gear reducer 242 (FIG. 2C) may be used in conjunction with the motor 241 to increase the torque applied to the carousel 205.

As the carousel 205 rotates (counter-clockwise in FIG. 2A), coins with faces parallel to the plane of the coin sliding surface 213 naturally tend to fall into the sockets 212 of the carousel 205 owing to the backward inclination of the apparatus. The trailing edge 256 of a "captured" coin, for example coin 222, is then pushed by contact with the trailing edge 252 of a carousel socket 212 forcing the coin along an annular path. Coins which are not positioned with their faces adjacent to the sliding surface (such as coins that may be tipped outward or may be perpendicular to the coin sliding surface 213) will be struck by the carousel 205 as it rotates, agitating the coins, and eventually correctly positioning the coins in the annular space defined by the carousel lip 208.

Along the annular path, a captured coin 223 passes over a transparent surface 219 aligned in parallel (or flush) to the elevation of the coin sliding surface 213 such that the coin 223 can easily slide onto the transparent surface 219. In another embodiment, the entire coin sliding surface 213 is transparent such that there is no precipice, or edge, over which the coin 223 must pass over. The transparent surface 219 may be made of transparent plastic, or thermoplastic such as Plexiglas® or Lexan®. In one embodiment, the transparent surface 219 is constructed of scratch resistant, optical grade glass such as Corning® Gorilla® Glass. The transparent surface 219 may be easily removed to allow for cleaning and replacement to maintain the optical integrity of the transparent surface 219 throughout operation. Additionally, the underside of the carousel 205 may serve to wipe or buff the transparent surface 219 as the carousel 205 rotates, thus maintaining the optical integrity of the transparent surface 219 during operation.

Behind the transparent surface 219 is an imaging device 207*b* (FIG. 2C) such as a CMOS or CCD active pixel sensor which consists of an array of photo-detectors which convert optical images incident on the detector into digital signals. When the carousel 205 passes over the transparent surface 219, an image is captured of each socket 212 which passes over the transparent surface 219 and in which a coin may or may not be present. The carousel 205 then advances, bringing the socket 212 previously imaged by imaging device 207*b* into the imaging region of another imaging device 207*a*. For the case in which a coin is present in the socket 212, an image of the opposite side of the coin (that exposed towards the front of the apparatus) is then captured by the imaging device 207*a* on the front side of the apparatus. In another embodiment, both sides of the socket 212 may be imaged in one imaging area without the need for advancing the carousel 205 between capturing images from below and above the socket 212. The imaging sensors may be triggered by a central computer 152 which controls the position of the carousel 205. Additional methods of triggering may include a mechanical switch physically activated by the movement of the carousel 205, an optical switch, or a continuous acquisition method in which only images containing an entire socket, or coin, or other object, are processed further. The imaging devices 207*a,b* may be mounted such that the plane of the image capture sensor, or pixel array, can be accurately positioned to be substantially parallel with respect to the coin sliding service 213. Additionally, the mounting device may have dampers to mitigate the transfer of vibrations to the imaging devices 207*a,b*.

External lighting 206*a,b,c* (reverse side lighting not shown in FIG. 2C) may be implemented to illuminate the image capture areas of the imaging devices 207*a,b*. The illumination may be produced by a plurality of incandescent, fluorescent, halogen, LED, xenon gas sources and the like, or any combination thereof. Although the lighting 206*a,b,c* depicted in FIG. 2A is comprised of 3 individual lighting sources, more or fewer individual lighting sources may be used. The level of illumination for each source may be constant or variable, and may be fixed manually or by computer. The level of illumination may be constant during operation or may be operated in bursts or flashes which may be synchronized with the exposure of the imaging devices 207*a,b* via a controller or synchronizing circuit. In one embodiment, the lighting 206*a, b,c* is high current flash LEDs positioned at large angles with respect to the normal of the coin sliding surface 213. Such an orientation provides deeper contrast of the embossed, highly reflective, topographical surface of most coins. Preferably, the lighting is intense and uniform over the imaging area. In one embodiment, the lighting elements 206*a,b,c* produce the desired intensity and uniformity using a dedicated power supply and a plurality of lighting sources. Additionally, the illumination sources 206*a,b,c* may be cooled by fans.

After having both sides of a coin imaged, the images are processed by a central computer 152, the details of which are described in detail below. In one embodiment, a second image of a coin is captured only if the first side captured is not sufficient to extract all the information necessary to extract the desired attributes of the coin, thus conserving computation time and resources.

After image capture and image processing, the carousel 205 advances the coin to the apex of the coin sliding surface 213 where a hole in the coin sliding surface produces a ledge 209 that causes the coins to slide over and fall behind the plane of the coin sliding surface 213 onto a coin rail 203 which guides coins, e.g. coin 204, behind the plane of the coin sliding surface 213. The hole in the coin sliding surface 213 is sufficiently large such that coins of all sizes can pass through and fall onto the coin rail 203 due to their own gravity. The coin rail 203 behind the coin sliding surface 213 is spaced sufficiently such that a coin can pass freely behind the coin sliding surface 213. The face of the coin 204 rests adjacent the face of the coin rail 203 and sits on a protrusion, or ridge 216 along which the coin rolls due to the inclination of the coin rail 203.

The coin rail 203 may be made of any hard material such as plastic, thermoplastic, glass, metal, wood or some composite. In one embodiment, the coin rail 203 is constructed with a hard plastic such as high density polyurethane such that it does not electromagnetically interfere with the workings of an auxiliary sensor 202. Additionally, ridges 221 may be on the rail protruding slightly towards the plane of the coin sliding surface 213 to reduce surface contact with a coin 204 to avoid jams. Coins that fall off the coin rail 213 may be caught by a protrusion 215 of the hopper 214 and returned to the bottom position of the carousel 205 due to the curvature of the hopper 214. In some embodiments, a second ridge may rise perpendicular to ridge 216 to protect the coin from falling off ridge 216.

The coin may then pass through an auxiliary sensor 202 such as an inductance coil which can provide information regarding a coin's secondary attributes such as size, diameter, conductivity and weight. In one embodiment, these qualities are measured by applying a multi-frequency oscillating electromagnetic field.

As a coin 204 or object passes through the sensor 202, changes in inductance (from which the diameter of the object or coin can be derived), and the quality factor (Q factor), related to the amount of energy dissipated (from which conductivity of the object or coin can be obtained) are measured. Those skilled in the art will understand that a variety of methods and sensors can be employed to achieve discrimination based on secondary attributes, such as non-image based measurements. This data may be used in conjunction with the processed image data to decide the fate of the coin as well as the user data to be registered and displayed by the central computer 152. The sensor 202 can be connected to auxiliary electronics such as a micro-controller 240 which can perform the necessary processing tasks as well as serve as an interface between the sensor 202 and the central computer 152.

A means for mechanically discriminating the coins, depending on the processed image data and/or auxiliary sensor data, can be employed to separate coins based on predetermined factors. For example, coins may then be mechanically discriminated by a servomechanism 239 (FIG. 2C), or solenoid driven actuator which controls a discriminating means such as a door or flap 201 which can alter the trajectory of coins into bins, chutes, return trays, etc. The triggering of such means for discrimination can be done by a dedicated electrical circuit, a micro-controller, the central computer 152, optical switches, mechanical switches, or the like.

The entire apparatus 200 may be enclosed such that ambient light is insulated from the imaging devices 207*a,b*.

Figure 3:
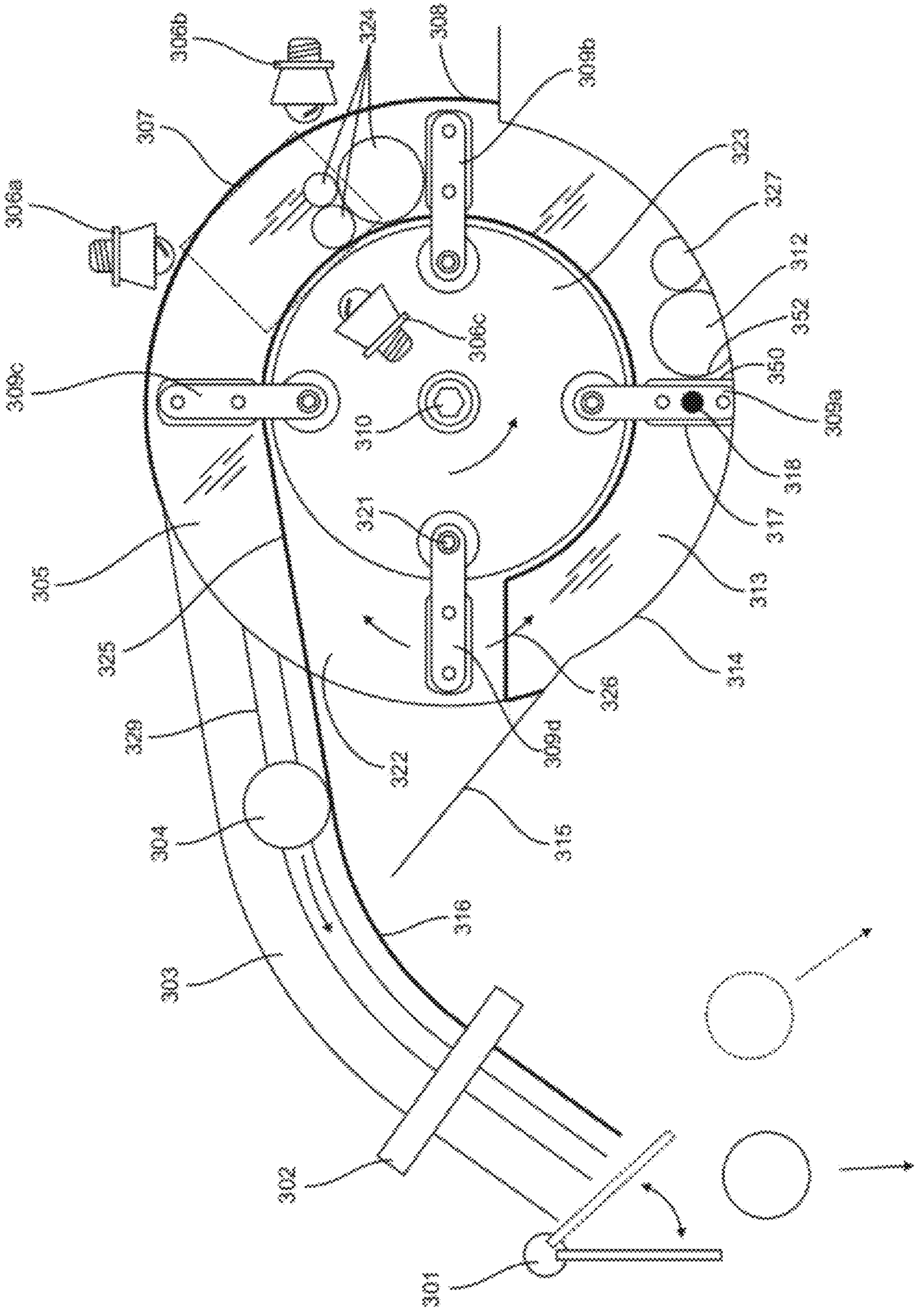
FIG. 3 is a side view of a coin pickup assembly, imaging sensor, coin rail, auxiliary sensor, and mechanical discrimination means according to an embodiment of the present invention.

FIG. 3 shows another embodiment of the invention described herein. This embodiment most significantly differs from the embodiment depicted in FIG. 2A-C in that the coin pickup assembly implements paddles 309*a,b,c,d* instead of a carousel 205 to push coins along an annular path which is defined, on the outside, by the edge of a circular recess 308 and, on the inside, by an edge formed by a rail disk 322. Coins are moved along the annular path by paddles 309*a,b,c,d* for delivery to a coin rail 303. This embodiment may be better suited to accommodate a larger variety of coins and may be less susceptible to jams than the embodiment depicted in FIG. 2A-C; however, by advancing a plurality of coins as opposed to one coin at a time as with a carousel embodiment, a different imaging configuration may be necessary to achieve efficient execution of the image processing method described below. Further, accurate mechanical discrimination of coins based on their respective image data may be more difficult with a paddle implementation.

In one embodiment, the paddles 309*a,b,c,d* are pivotally mounted on tension disk pins 321 so as to permit the paddles 309*a,b,c,d* to pivot in directions 326 parallel to the plane of the tension disk 323. Such pivoting 326 is useful in reducing the creation or exacerbation of coin jams since coins or other items which are stopped along the coin path will cause the paddles 309*a,b,c,d* to flex, or to pivot around pins 321, rather than requiring the paddles 309*a,b,c,d* to continue applying full motor-induced force on the stopped coins or other objects. Springs resist the pivoting, urging the paddles 309*a, b,c,d* to a position oriented radially outward, in the absence of resistance (e.g. from a jammed coin). In another embodiment, a different number of paddles are implemented, such as 6 or 8 paddles, which may cause a smaller number of coins to be advanced such that the entirety of the coins may be imaged by a minimal number of imaging devices.

Similar to the embodiment depicted in FIG. 2A-C, coins which fall into the hopper 314 are directed by the curvature of the hopper 314 towards the 6:00 position of the annular coin path 308. In general, coins traveling over the downward-turning edge of the hopper 314 are tipped onto their edge and, partially owing to the backward inclination of the apparatus, tend to fall into the annular space with their faces adjacent the face of the coin sliding surface 313. The coin sliding surface 313 may be composed of any type of hard material, such as plastic, thermoplastic, glass, metal, wood or some composite. In one embodiment the coin sliding surface 313 is a transparent hard material, such as a hard plastic Plexiglas® or Lexan®, or scratch resistant, optical grade glass such as Corning® Gorilla® Glass. In one embodiment, only a portion of the coin sliding surface 313 may be transparent. The transparent surface may be easily removed to allow for cleaning and easy replacement to ensure its optical integrity. In one embodiment, the transparent surface is rotationally symmetric such that the surface can be angularly shifted in the event that scratches or debris obstruct an imaging region 307.

The paddles 309*a,b,c,d* may be composed of any type of hard material, such as plastic, thermoplastic, glass, metal, wood or some composite. In one embodiment, the paddles 309*a,b,c,d* are composed of a plastic that prevents the degradation or scratching of the transparent portion of the coin sliding surface 313. In another embodiment, the radially inward portion of the paddle head 317 is composed of a cloth or rubber material that aids in the cleaning and polishing of the transparent portion of the coin sliding surface 313 to maintain the optical integrity of the transparent portion of the coin sliding surface 313. The transparent portion of the coin sliding surface 313 may also be treated with an anti-reflective coating to reduce reflections from lighting.

Coins which are not positioned in the space with their faces adjacent the coin sliding surface 313 (such as coins that may be tipped outward or may be perpendicular to the coin sliding surface 313) may be struck by the paddles 309*a,b,c,d* as they rotate, agitating the coins and eventually correctly positioning the coins in the annular space with the edge of the coins adjacent the face of the annular space defined by the circular recess 308.

Once coins are positioned along the annular path 308, for example coin 312, the leading edge 350 of a paddle head 317 contacts the trailing edge 352 of the coin 312, forcing the coin 312, and any adjacent coins such as coin 327, along the coin path. In one embodiment, each paddle 309*a,b,c,d* can move a plurality of coins, such as up to 10 coins. The paddles 309*a,b,c,d* are connected to a tension disk 323 which is rigidly affixed to a shaft 310 which is connected to a means for generating a rotational force such as a motor, or a computer controlled stepper motor. The motor may be used in conjunction with a gearbox or gear reducer to increase the torque applied to the tension disk 323. The motor may rotate the paddles 309*a,b,c,d* continuously or in discrete "steps" of specific angular displacement. In one embodiment, the steps are spaced such that the angular distance subtended by each advancement of the paddles 309*a,b,c,d* is equal to the angular spacing of the paddles 309*a,b,c,d*. For example, for the particular paddle configuration depicted, the paddles 309*a,b,c,d* would be advanced in 90 degree increments. In such an embodiment, coins travel in discrete angular advances, such as 90 degrees, then briefly pause for a fixed or variable amount of time. Coins which pause over the imaging area 307 are then captured by opposing imaging devices (not shown) above and below the plane of the coin sliding surface 313.

In one embodiment, the imaging devices and the respective lighting 306*a,b,c* (for the front imaging device), which can be similar in make and orientation to that of the embodiment depicted in FIG. 2A, are triggered in temporal succession such that the respective light associated with one imaging device does not get captured by the imaging device on the opposing side of the transparent portion of the coin sliding surface 313. In this way the majority of the light captured by a particular imaging device is that reflecting from the coins being imaged and originating from the respective lighting for each imaging device. Alternatively, if the orientation of the lighting is at a sufficiently obtuse angle with respect to the normal of the transparent portion of the coin sliding surface 313, reflections may be sufficiently small to allow for simultaneous flash illumination or constant illumination. Anti-reflective coatings, which may be applied to both front and back surfaces of the coin sliding surface 313 may mitigate reflections from the illuminating elements, which might otherwise generate artifacts in the images acquired. This may be particularly beneficial for the backside imaging sensor which must acquire images through the transparent coin sliding surface 313. Additionally, the imaging devices may implement polarizing filters to mitigate reflections.

In another embodiment, multiple imaging devices may be used above and below the coin sliding surface 313 to enlarge the area of the imaging region 307, such that all coins which may be pushed by the paddles 309*a,b,c,d* through the imaging area 307 can be imaged simultaneously. The imaging device may also be staggered with respect to the coin path as in the embodiment depicted in FIG. 2A-C. In another embodiment, a single imaging device may be employed in conjunction with optical reflectors (mirrors) in configurations such as those depicted in FIGS. 6A and 6B and described in more detail below. Alternatively, the paddles 309*a,b,c,d* may be advanced in fractions of the standard step size and multiple images can be captured and later "stitched together" such that all of the coins pushed by a particular paddle are imaged. In another embodiment, more paddles may be used, such as 6 or 8 paddles, so a smaller number of coins can be advanced and thus fully imaged using one imaging sensor per side of the coin sliding surface 313.

Preferably the imaging area 307 is as close to the apex of the annular coin path 308 as possible such that coins stacked edge-on-edge like coins 324 will be singulated along the coin rail 303 in a determinable succession allowing for the mechanical discrimination of coins based on their respective image data by discriminating device 301. This also allows time for any coin which may be stacked on top of another coin side-to-side (or face-to-face) to fall and return to the bottom position of the hopper 314 so that the faces of the coins entering the imaging area 307 are not obstructed upon being imaged.

The coins are eventually forced to travel onto and along the linear portion 325 of the rail disk 322 and subsequently roll onto the coin rail 303, such as coin 304. As the paddles 309*a,b,c,d* continue to move along the circular path, they contact the linear portion 325 of the rail disk 322 and flex axially outward facilitated by a tapered shape of the radially inward portion of the paddle pad 317 to ride over (i.e. in front of) a portion of the rail disk 322. Singulation of the coins occurs along the linear portion 325 of the rail disk 322 and the coin rail 303, and various design features can be implemented to further facilitate the singulation of coins. In one embodiment, the coin rail 303 may be designed with a wall and gap such that coins cannot fall off the coin rail 303 upon entering the gap; such an embodiment would prevent errors in attributing image data to specific coins for the purpose of mechanical discrimination. The remainder of the coin path (and the embodiment depicted in FIG. 3) is similar to that of the embodiment depicted in FIG. 2A-C and described above with a coin sensor 302 downstream, and friction reducing rail protrusions 329 along the coin rail 303. In another embodiment, image capture occurs along the coin rail 303.

Figure 4A:
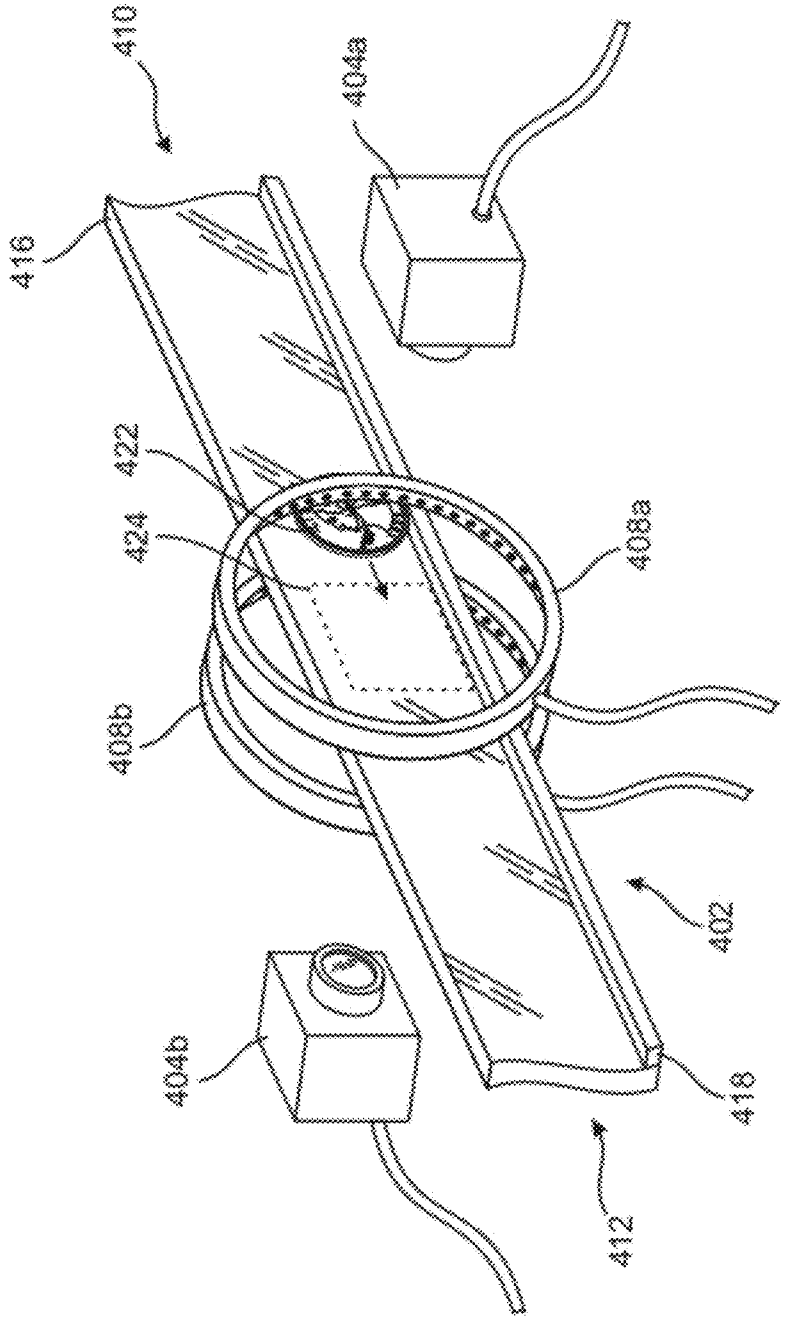
FIG. 4A is a perspective view of a coin rail, illumination elements and imaging assembly according to an embodiment of the present invention.

FIG. 4A depicts a perspective view of another embodiment of the proposed invention. In this embodiment, coins are fed onto a coin rail 402 by a coin pickup device such as a carousel or paddle mechanism such as that described for the embodiments depicted in FIGS. 2A-C and FIG. 3. However, in this embodiment, imaging takes place along the coin rail 402 on which coins roll after being advanced via the coin pickup device. This embodiment is advantageous as the coins continuously travel along the coin rail 402 and tend to be singulated and unobstructed, with a well defined trajectory. In configurations where an auxiliary sensor is employed downstream of the imaging region 424, the coin rail embodiment allows for more accurately associating image data with the respective auxiliary data for each coin, also allowing for the more accurate mechanical discrimination of a coin based on its respective image data.

In one embodiment, the coin rail 402 comprises a first wall 416, a protrusion, or lip 418, connected to and extending from the first wall 416. The rail 402 may be made of any type of hard material, such as plastic, thermoplastic, glass, metal, wood, or some composite. In one embodiment, the rail 402 is made from hard plastics, with transparent sections made from optical grade, scratch resistant Plexiglass®. In another embodiment, the transparent sections are made of optical grade, scratch resistant glass such as Corning® Gorilla® Glass.

The lip 418 is sufficiently wide so as to allow coins 422 of various shapes and sizes to pass parallel and along the wall 416, as the coin 422 rolls along its edge, without falling over. In the same respect, the wall 416 should be sufficiently high so as to prevent a coin 422 resting on its edge on the lip 418 from falling behind the rail 402. Due to the backward (or transverse) inclination of the coin rail 402, the sides of coins 422 are biased against the wall 416 of the coin rail 402 by gravity. Coins 422 which fall off in front of the rail 402 may be redirected back to the coin pick up device, for example by a hopper, and placed onto the rail 402 again by the coin pick up device.

A first image capture device 404*a* is positioned adjacent to and directed towards the transparent portion of the first wall 416 to allow the first imaging device 404*a* to capture the image of a first side (or the obverse side) of a coin 422 passing through the imaging region 424 of the rail 402. A second image capture device 404*b* is positioned adjacent to and directed towards the transparent portion of the first wall 416 to allow the second image capture device 404*b* to capture the image of a second side (or reverse side) of the coin passing through the imaging region 424 of the rail 402.

In embodiments in which the material cannot be made transparent, such as wood or metal, a hole may be centered in line with the imaging device 404*a* or 404*b* so that the image capture device 404*a* or 404*b* can take a picture of the coin 422 as it passes by the hole. In some embodiments, the hole may be covered with a transparent material such as plastic, thermoplastic, glass, and the like to prevent the coin 422 from falling out as it passes by the hole. The transparent material may be easily removed to facilitate cleaning and replacement of the transparent material to maintain the optical integrity of the imaging system. Further, an automated wiping or cleaning system may be employed to maintain the optical integrity of the transparent portion of the coin rail 402.

Figure 5:
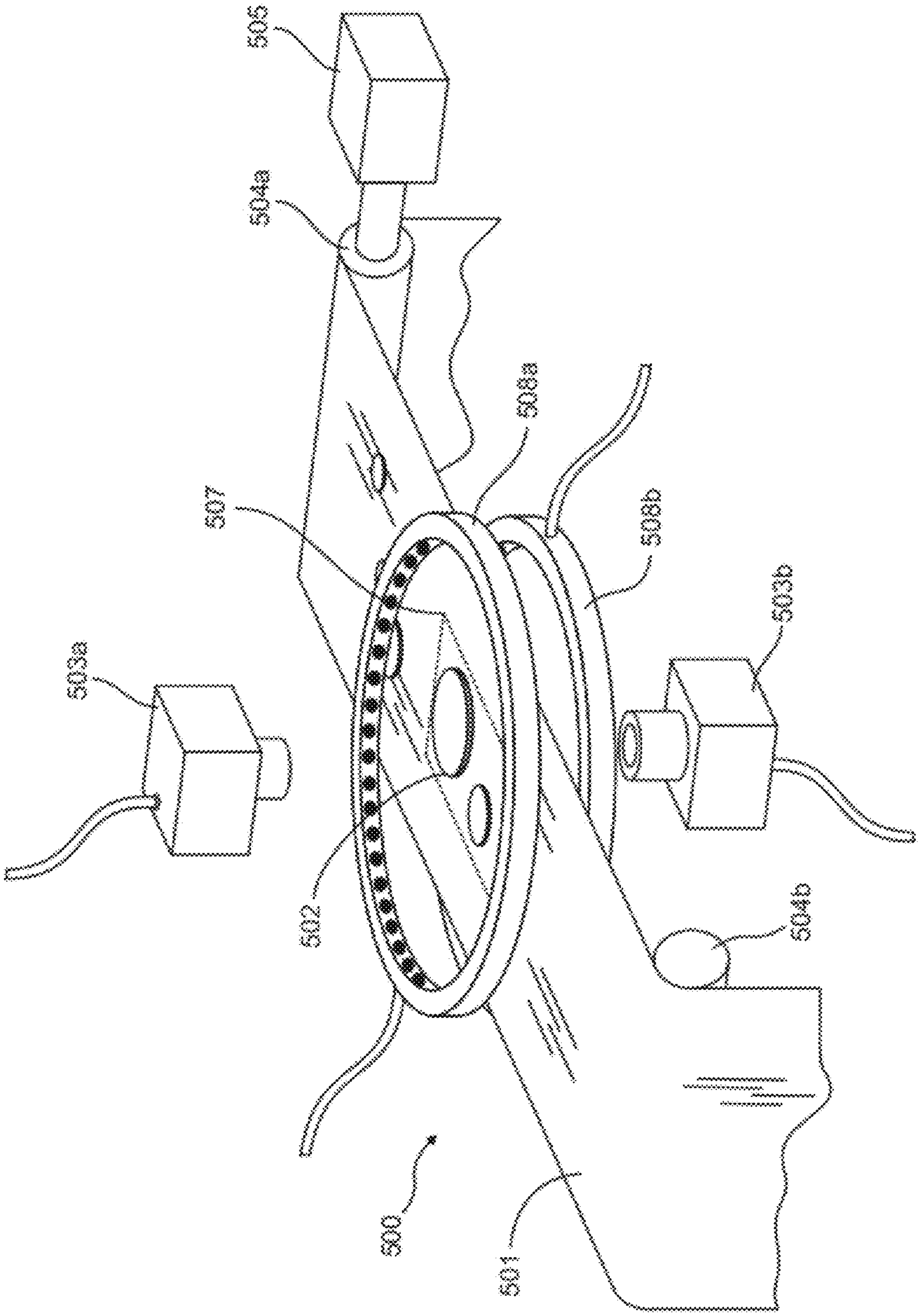
FIG. 5 is a perspective view of a coin conveyor belt and imaging assembly according to an embodiment of the present invention.

To facilitate passage of the coin 422 on the rail 402, the rail 402 may be tilted downward from the from the first end 410 of the rail 402 to the second end 412. This allows gravity to pull a coin 422 deposited at the first end 410 of the rail 402 to roll towards the second end 412 of the rail 402. Other means for transporting the coin 422 from the first end 410 to the second end 420 can be utilized, such as a conveyor system as shown in FIG. 5. However, utilizing gravity keeps the device simplistic and minimizes manufacturing costs.

In some embodiments, the rail 402 may further comprise coin stops. Coin stops are obstructions within the rail 402 that provide a means for slowing or temporarily stopping the coin 422 when it enters the imaging region 424 of the image capturing devices. This will minimize any blurring of the coin image.

The coin stop may be an obstruction created on the lip 418, on the wall 416, or coming down from the top that disrupts the natural traveling rate of the coin 422 through the rail 402. An obstruction may be any deviation from the smooth surface of the wall 416 or lip 418. By way of example only, a bump or void may be placed on the lip 418. A coin 422 traveling over the bump will naturally slow down. A coin traveling into the void may either slow down or become completely immobilized. In some embodiments, friction creating protrusions, such as brushes, may project into the coin path to slow down the rolling coin at the image field 424. If the obstruction is placed within the image field 424, the image capture device 404 can capture the image of the coin as it slows down or stops, allowing for a clear shot.

In embodiments utilizing friction creating obstructions, such as bumps, protrusions, brushes, and the like, the obstructions may be adjustable so that if the coin is stopped, the obstruction can be moved out from the pathway of the coin to allow the coin to resume forward. In embodiments utilizing the void, a movable member may be positioned to penetrate through the void so that if a coin is stuck in the void, the movable member can be inserted into the hole so as to push the coin out and back rolling again.

Movements of the obstructions can be coordinated with the coin advancing mechanism such as the stepper motor so as to avoid multiple coins jamming at the obstruction. For example, as a coin is being deposited onto the rail 402 from the advancing means, an obstruction that has slowed or stopped a coin 422 already in transit can be removed to allow the coin 422 to continue transit.

In some embodiments, no obstructions or coin stops are utilized. The imaging devices 404*a,b* may be high speed cameras that can capture a clear image of a moving coin 422. Furthermore, the speed of the coin 422 may be adjusted by adjusting the angle of the rail relative to the ground to slow the coin 422 down as necessary depending on the quality of the imaging devices 404*a,b*.

In some embodiments, a trigger may be set up to time the image capturing process to acquire an image just as the coin 422 passes in front of the imaging region 424 of the image capturing device 404. For example, a beam of light may be directed transversally through, or onto, the wall 416 within the path of the coin 422. When the coin 422 passes through the beam of light to disrupt the transmission of the light, a signal can be sent to the camera 404*a* to acquire the image immediately or within a specified time. A similar trigger can be set up for, or shared with, the second camera 404*b*.

To assure the imaging devices 404*a,b* can capture the entire image of a coin 422, the image field 424 may be broad. However, this can result in a loss of resolution. In some embodiments, once the trigger 426 is actuated, the imaging devices 404*a,b* can begin capturing a series of images in rapid succession for a period of time. Alternatively, a stop trigger can be positioned downstream of the image capture device such that actuation of the stop trigger stops the image capturing process. The stop trigger, like the acquisition trigger, may be a beam of light, disruption of which causes the image capture device to stop taking pictures. During the processing stage, images in which the entire coin 422 was not captured can be discarded. In another embodiment, the imaging devices 404*a,b* continuously acquire images.

Figure 4B:
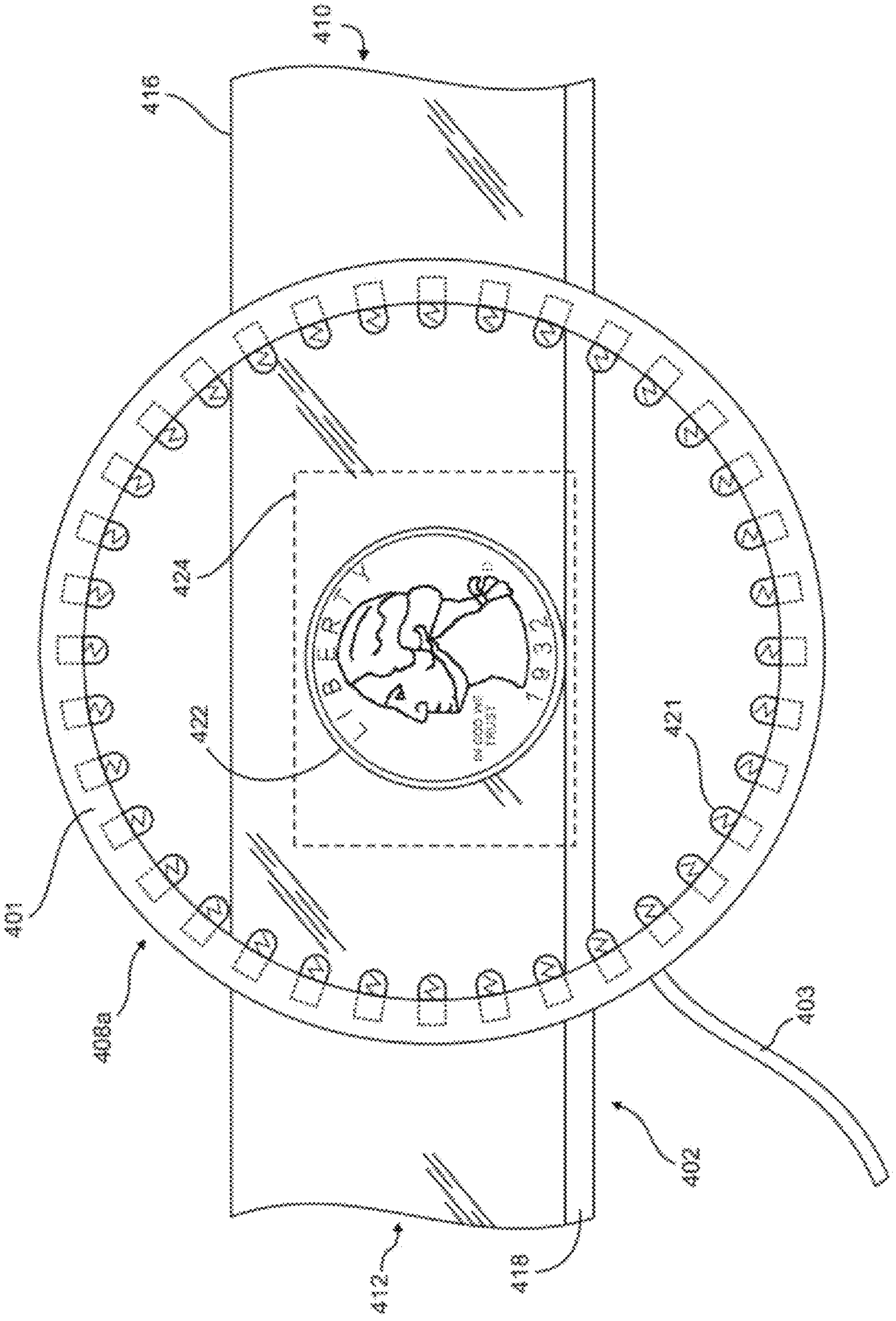
FIG. 4B is a side view of the coin rail and illumination elements depicted in FIG. 4A according to an embodiment of the present invention.

The lighting 408*a,b* can be of similar type and variation of make, orientation and triggering as that described above for the embodiments depicted in FIGS. 2A-C and FIG. 3. FIG. 4B shows a side view of the coin rail 402 more clearly demonstrating the lighting used in one particular embodiment. The lighting 408*a* consists of a circular bracket or hoop 401, referred to hereafter as the "hoop", with a plurality of lighting elements 421 affixed to the hoop 401 and directed radially inward such that coins in the interior region of the hoop 401, more specifically the imaging region 424, are illuminated, for example coin 422. The hoop 401 may be made of a hard material such as plastic, thermoplastic, glass, metal, wood or some composite.

The emission source for the lighting elements 421 may be fluorescent, halogen, xenon gas, light emitting diode ("LED") or the like. In one embodiment, the lighting elements 421 are high current, high intensity, flash-LEDs, due to their longevity, physically robust design, and low heat dissipation.

The lighting elements 421 may be affixed to the hoop 401 by solder, glue, epoxy, mechanical fasteners, or the like. The electrical leads of the lighting elements may be connected in series, parallel or some combination, to an external power source, and/or triggering source, via wires 403.

The hoop 401 may be affixed to an external mounting bracket to fix the position of the lighting 408*a,b* relative to coin rail 402.

Diffusers may be used in conjunction with the lighting 408*a,b* to produce greater uniformity of illumination across the imaging region 424. During operation, only a subset of the lighting elements 421 may be operated for a period of time. Upon the detection of a malfunction, expiration or burn-out of a certain number of lighting elements 421 within in a first subset, another, second subset may then be used during subsequent operation. In this way, human intervention is reduced in the replacement and maintaining of the uniform illumination of the imaging area.

Figure 4C:
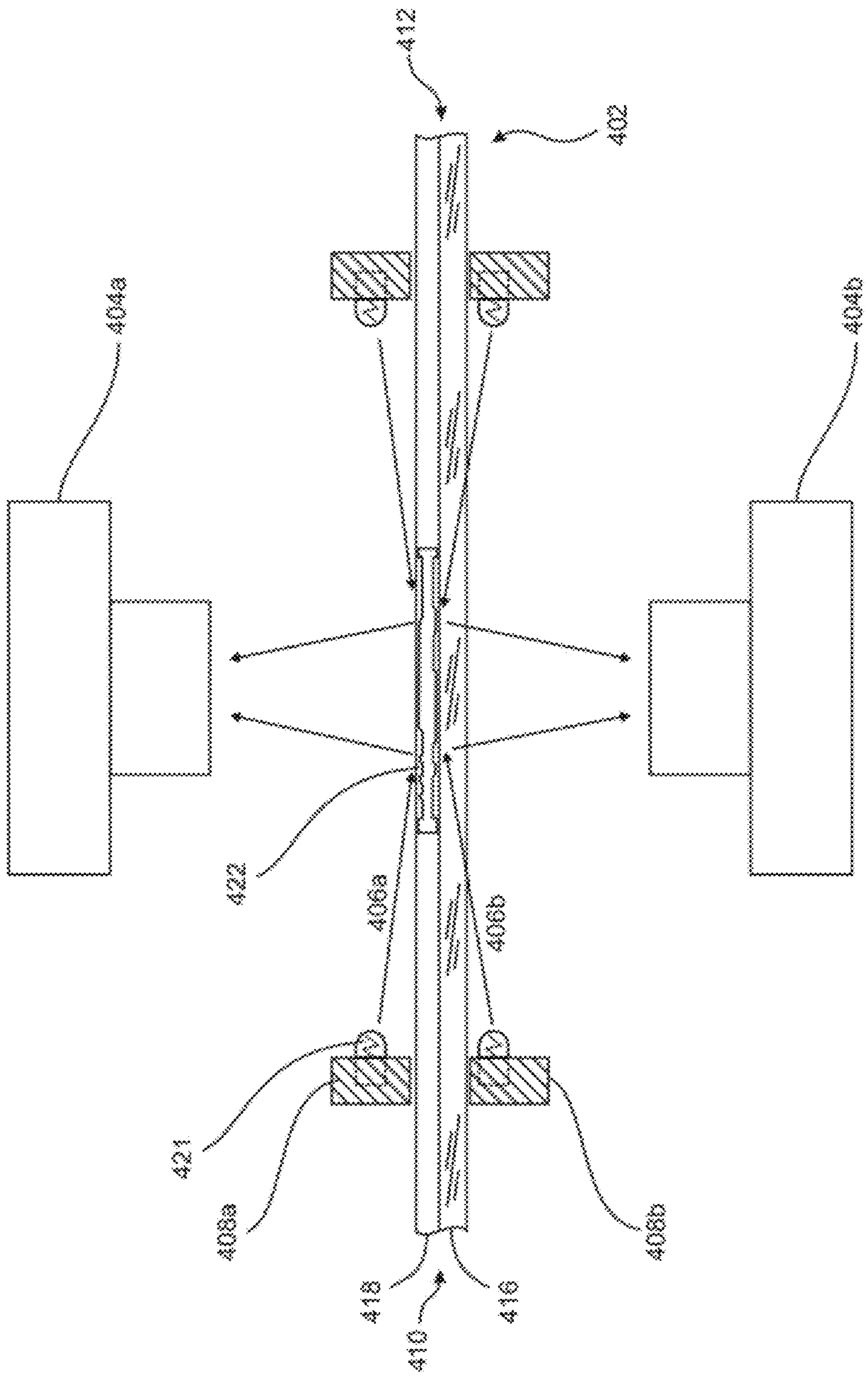
FIG. 4C is a top view of the coin rail and cross-section of the illumination elements depicted in FIG. 4A according to an embodiment of the present invention.

FIG. 4C shows a top cross-sectional view of the coin rail 402, better demonstrating the orientation of the lighting 408*a,b* with respect to the wall 416, a to-be imaged coin 422, and imaging devices 404*a,b*. In particular, this view better demonstrates the elevation of the lighting 408*a,b* with respect to the surface of the coin 422. This configuration allows light, for example light 406*a*, emitted from the lighting 408*a* to approach the surface of the coin 422 at large angles relative to the normal of the face of the coin 422. Due to this large angle, the flat portions of the coin will scatter relatively little light towards the imaging devices 408*a,b* and those regions of the coin will appear relatively dark in the acquired image. Conversely, the boundary of raised, embossed features of the coin will scatter relatively more light towards the imaging devices 408*a,b* and those regions of the coin will appear relatively bright in the acquired image.

This lighting technique, sometimes referred to as "dark field illumination", is particularly useful as the information to be extracted from the coin's image, e.g. the coin's primary attributes, tends to be embossed and thus highlighted in the acquired images. Examples of a coin's primary attributes include, but are not limited to, date of mint, place of mint or mint mark, inscription or legend (i.e. the portion of the coin on the obverse or reverse sides that tell us important things like who made the coin, Statehood, commemoration information, and denomination), the motto, the portrait, and the like.

Due to the extra space between the lighting 408*b* and the coin 422 induced by the wall 416, the angle at which light 406*b* is incident upon the bottom surface of the coin 422 may be different from the angle at which light 406*a* is incident upon the top surface of the coin 422. The positioning, configuration or manufacturing of the lighting 408*b* may be different from that of the lighting element 408*a* so as to correct for the presence of the wall 416 and allow light to be incident upon the coin 422 at substantially the same angle independent of the side of the coin being imaged.

The transparent sections of the wall 416 may be treated with an anti-reflective coating to mitigate reflections from the wall 416.

An auxiliary sensor and discrimination means may be placed downstream of the imaging region 424 of the coin rail 402 similar to that described above for the embodiments depicted in FIGS. 2A-C and 3. If an auxiliary sensor is upstream from the imaging section, the sensor may be used to reduce the parameter space for many of the image processing tasks, reducing computational time and errors.

In one embodiment, the wall 416 may have transverse protrusions, grooves, or be "ribbed", so as to reduce the contact surface of the wall 416 with the coin 422. These ribs may or may not continue, or extend through the imaging region 424.

FIG. 5 depicts a perspective view of another embodiment of the invention described herein. A transparent conveyor belt system 500 is employed as the means for advancing coins through an imaging region 507. This embodiment may be more resistant to jamming as well as prevent the degradation of the transparent surface through which coins are imaged as coins are not forced to slide against, or move relative to, the transparent surface during advancement. Further, this embodiment may be more conducive to the unsupervised, active cleaning of the transparent coin sliding surface during operation. This embodiment may also make the replacement of the transparent coin sliding surface easier and more economical than previously described embodiments.

The embodiment is comprised of a transparent conveyor belt 501 which may be guided by, and rolls along, rollers 504*a,b*, in addition to auxiliary rollers (not shown) which can tension, clean and redirect the belt 501, around other hardware so as to complete a loop allowing for the use of an "endless" belt. The rollers 504*a,b* may be made of any hard material such as plastic, thermoplastic, wood, metal, rubber or a composite. In one embodiment, the drive roller 504*a* is made of a material which can grip the belt 501 such as rubber. The auxiliary rollers, such as roller 504*b*, may be on bearings, bushings, or the like, to allow the rollers to rotate freely about mounted shafts or drive axles. The conveyor belt 501 may be made of a pliable, transparent surface such as a high quality, scratch resistant plastic. The drive roller 504*a* is connected to a drive means, such as a computer controlled stepper motor 505.

Coins, e.g. coin 502, are placed on the conveyor belt 501 by a user, or after having been pre-processed, conditioned, cleaned, etc. by a trommel device, passed over a coin tray, dropped from a chute, vacuumed or the like. The belt 501, driven by stepper motor 505, then advances the coins to the imaging region 507. The belt 501 may be advanced continuously or in discrete "steps" of fixed or variable displacement, with pauses of fixed or variable time between advancements. The imaging region 507 is illuminated by lighting 508*a,b* which can be of a similar type and variation of make, orientation and triggering as that described above for the embodiments depicted in FIGS. 2A-C, FIG. 3 and FIGS. 4A-C. The imaging region 507 is captured by imaging devices 503*a,b* such as cameras using CCD or CMOS imaging sensors. The imaging devices 503*a,b* may be directly opposing each other as in FIG. 5, or the imaging devices 503*a,b* may be opposing each other, yet staggered in succession with respect to the advancement of the belt 501. Multiple coins may be imaged in one exposure by the imaging devices 503*a,b* or coins may be substantially singulated before placement onto the belt 501 to facilitate higher resolution images of individual coins. Coins may also be singulated while on the belt 501, before entering the imaging area 507, for example by protrusions over the surface of the belt 501. The protrusions might be rails extending over the surface of the belt 501; the rails may be attached to springs or some other biasing force such that the rails may outwardly flex to prevent jamming.

In another embodiment, an additional conveyer belt is used to apply pressure to the top surface of coins entering the conveyor system 500. This effectively "pins" or "presses" coins to the lower conveyor belt 501 which may be useful in embodiments in which the belt is advanced in discrete steps. In such discrete-step embodiments, the additional conveyor belt would prevent coins from sliding, which would otherwise do so due to the inertia of the coins, the low friction of the belt 501, and the rapid stop-start motion of the belt.

The coins may be passed through an auxiliary sensor and a means for mechanically discriminating the coins similar to that described for the embodiments depicted in FIGS. 2A-C. This auxiliary processing may be done before and/or after coins are processed by the conveyor belt system 500.

Figure 6A:
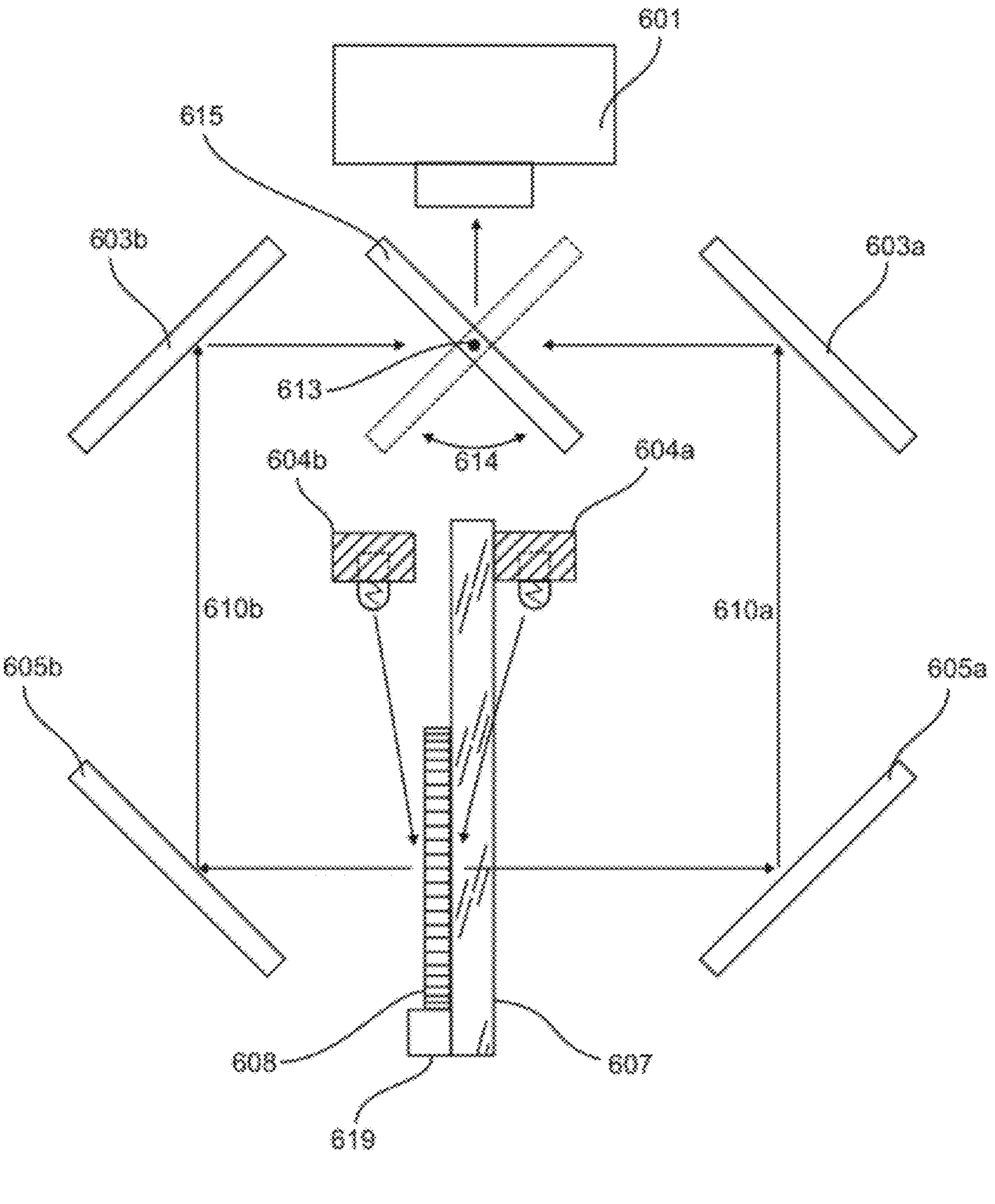
FIGS. 6A-C are side views of coin imaging assemblies according to embodiments of the present invention.
Figure 6B:
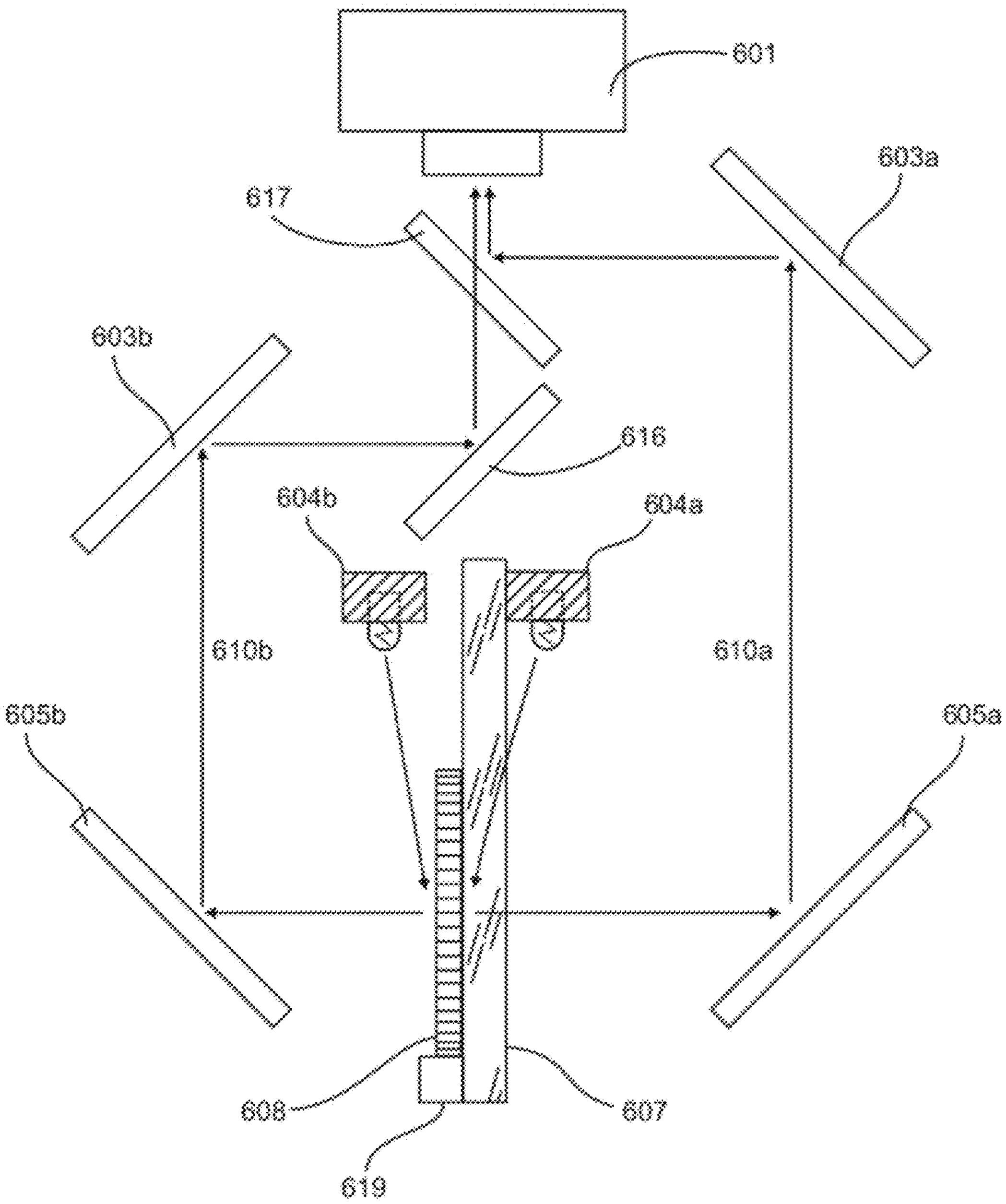
Figure 6C:
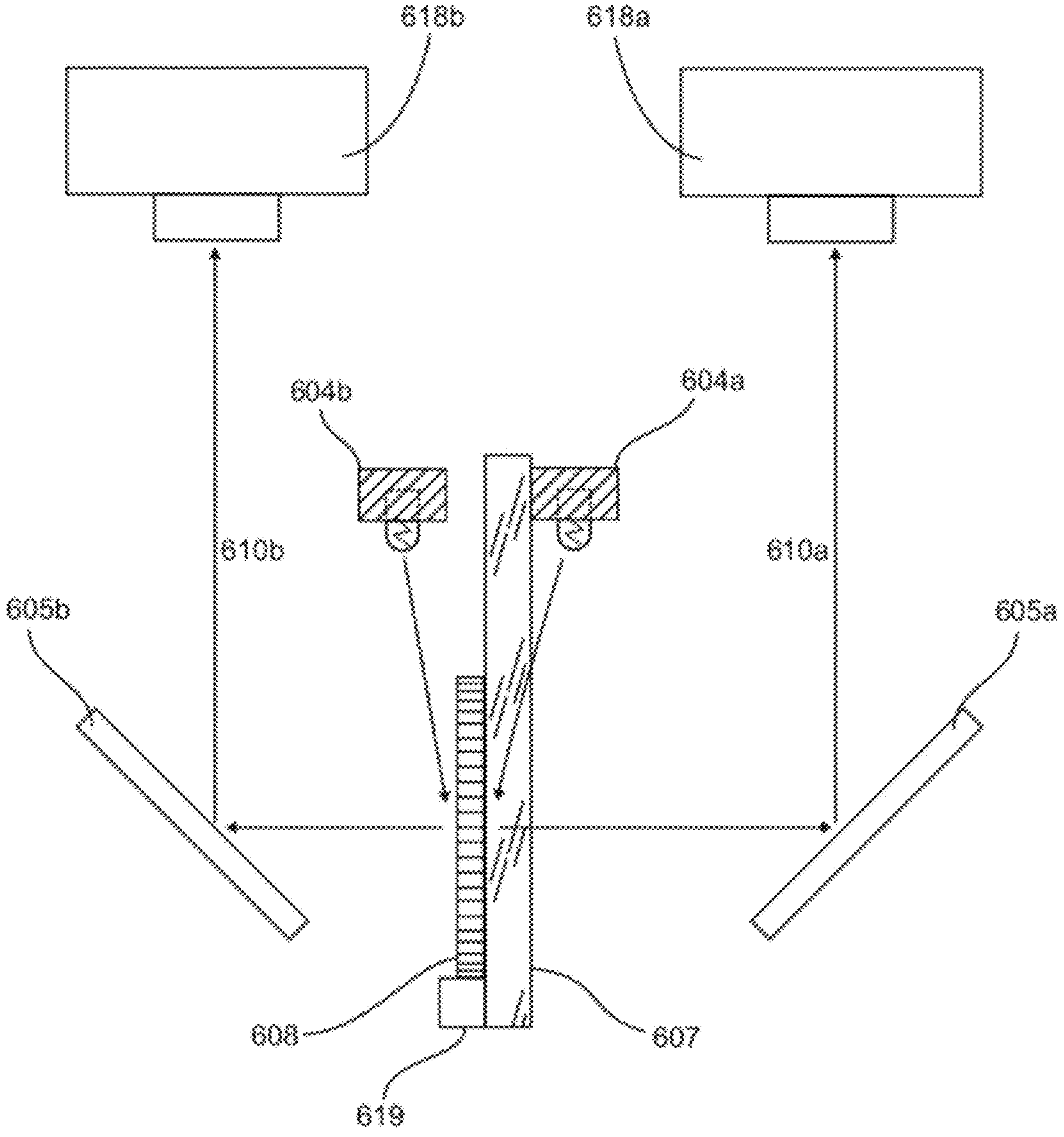

FIGS. 6A-C show cross-sectional views of alternate imaging configurations which can be used in many different embodiments, such as any of the embodiments described above. FIG. 6A depicts a configuration which allows for the use of only one imaging device 601 to capture both sides of coins being advanced through an apparatus. This may be advantageous if a high quality, costly imaging device is needed as it reduces the number of imaging devices required. The configuration of FIG. 6A consists of two primary reflectors 605*a,b*, two secondary reflectors 603*a,b*, and one main reflector 615 which is mounted such that the main reflector 615 can be pivoted about its longitudinal axis 613 allowing for a range of motion 614 which may be advanced by a computer controlled servo-mechanism or the like. By advancing the main reflector 615 from one extreme position to another, the image incident on the imaging device 601 is toggled between the opposing surfaces of the transparent plane 607. When a coin 608 adjacent the transparent plane 607, and in the embodiment shown, rolling along lip 619, is illuminated by lighting 604*a,b*, light reflecting from the coin 608 reflects off of the primary reflectors 605*a,b* and is directed to the secondary reflectors 603*a,b*, which then direct the light to the main reflector 615. Depending on the orientation of the main reflector 615, light originating from only one selected side of the transparent plane 607 is directed towards the imaging device 601. The arrows 610*a,b* show the pathway of the image from the coin 608 to the imaging device 601.

FIG. 6B depicts another imaging configuration in which a tertiary reflector 616 and a half-mirror 617 are used in place of the main reflector 615 in FIG. 6A. This may be advantageous to the embodiment depicted in FIG. 6A as no moving parts are required in the image path 610*a,b*. In the configuration shown, the apparatus is isolated from ambient light and the side of the transparent plane 607 which is desired to be imaged is selected by illuminating the respective lighting 604*a,b* of the desired side. Light originating from lighting 604*b* reflects off the side of the coin 608 opposite the side of the coin 608 adjacent the transparent plane 607 (left most surface of the coin 608 in FIG. 6B) to a primary reflector 605*b* which directs that light 610*b* onto a secondary reflector 603*b*, which then directs the light towards a tertiary reflector 616 which then directs the light through a half-mirror 617 and onto an imaging device 601. Lighting originating from lighting 604*a* reflects off the side of the coin 608 adjacent the transparent plane 607 (right most surface of the coin 608 in FIG. 6B) to a primary reflector 605*a* which directs that light 610*a* onto a secondary reflector 603*a*, which then directs the light towards a half-mirror 617 which then directs the light onto the imaging device 601. In this embodiment, the exposure of the imaging device 601 may be synchronized to the emission from whichever lighting 604*a,b* is being triggered. The angle of the light emitted from lighting 604*a,b* should be sufficiently obtuse with respect to the normal of the transparent plane 607 such that light originating from one side of the transparent plane 607 is not substantially propagated along the opposing image path.

FIG. 6C depicts another imaging configuration in which two imaging devices 618*a,b* are used, however, the use of primary mirrors 605*a,b* allow the imaging devices 618*a,b* to be positioned at angles with respect to the normal of the transparent plane 607. This configuration may be advantageous if design constraints do not allow for imaging devices to be placed directly over the imaging region such that the imaging axis of the imaging device is substantially orthogonal to the transparent plane 607.

Figure 7A:
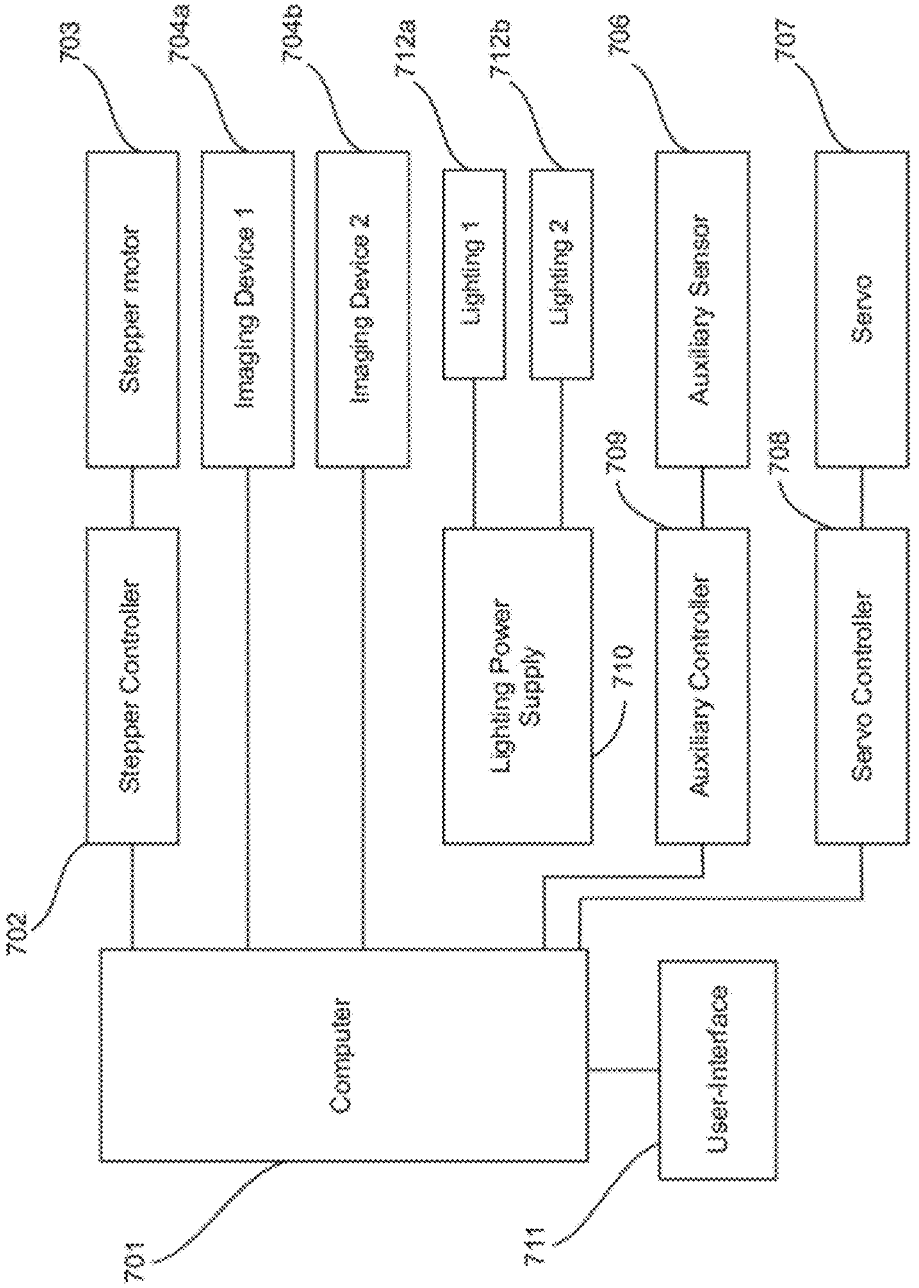
FIGS. 7A-C are block diagrams of electronic components according to embodiments of the present invention.

FIG. 7A is a block diagram for one particular configuration of the electronic components used in an embodiment of the present invention. A stepper controller 702, two imaging devices 704*a,b*, an auxiliary controller 709, and a servo controller 708 are connected to a central computer 701 via USB, Firewire, GigE, serial or proprietary connection interfaces, or the like. A user-interface 711 such as a touch-screen monitor, or a monitor, keyboard, keypad, mouse, or the like, is also connected to the central computer 701 by the appropriate connection interfaces. Each electronic component may require an auxiliary power connection which are not shown in FIGS. 7A-C.

The stepper motor 703 controls the means of coin advancement (for example, the carousel 203 in FIG. 2A,B, the paddles 307*a,b,c,d* in FIG. 3, the conveyor belt 505 in FIG. 5, or the like). The design of the stepper motor 703 allows for the central computer 701 to precisely advance the motor in continuous or discrete angular displacements via a stepper controller 702 which serves as an interface between the stepper motor 703 and the central computer 701. In one embodiment, a NEMA-23, bipolar 4-wire stepper motor is used which has holding torque of 12.5 kg-cm at 2.2 amps and a stepping angle of 1.8 degrees. The stepper controller used is a 1063-Phidget-Stepper Bipolar 1-Motor controller which allows for the control of the position, velocity, and acceleration of one bipolar stepper motor via a USB interface with the central computer 701. In another embodiment, a speed controller is used as the interface to control a non-stepper type motor.

Imaging Devices 704*a,b* can be connected to the central computer 701 by a variety of interfaces, such as those listed above, in addition to composite, coaxial, and s-video interfaces, or the like. The imaging sensor of the imaging devices 704*a,b* may be of MOS-type or CCD-type architecture, monochromatic or color, with a plurality of resolutions and frame rates. In one particular embodiment, two Imaging Source DFK-31BU03 cameras are used as imaging devices, which implement a 1024 by 768 pixel color Sony CCD imaging sensor, capable of capturing 30 frames per second. For some imaging devices, dedicated hardware may be required, such as a frame grabber, to serve as an interface between the imaging devices 704*a,b* and the central computer 701.

Two distinct apparatuses, lighting 712*a,b*, are used with the distinction referring to the side of the transparent surface the lighting is disposed towards. The lighting 712*a,b* are powered by a lighting power supply 710 which may allow for setting the operation and relative intensities of individual lighting elements, or a subset of individual lighting elements, of each of the lighting 712*a,b* to help achieve uniform illumination across the imaging region.

The auxiliary sensor 706 may consist of a core material with a wire winding about the core, such as a low-frequency and a high-frequency wire winding about the core. The core is disposed along the passageway of coins and is capable of measuring changes in inductance as coins pass the sensor. By analyzing the resulting signal, the denomination and authenticity of the coin can be accurately identified. The auxiliary sensor 706 may be connected to an auxiliary controller 709 which may include the necessary electronics (micro-controllers, oscillators, etc.) to execute the inductive measurements on passing coins. The auxiliary controller 709 serves as an interface between the auxiliary sensor 706 and the central computer 701, and allows for information to be conveyed to the central computer 701 regarding the data obtained from the auxiliary sensor 706 and auxiliary controller 709.

The servo-mechanism 707 activates the mechanical discriminator used to direct coins to different chutes, return trays, etc. The servo-mechanism 707 is connected to a servo controller 708 which serves as an interface between the central computer 701 and the servo-mechanism 707. The central computer 701 can trigger the servo 707 based on data collected from the imaging devices 704*a,b* and/or auxiliary sensor 706. In one embodiment, the servo controller 708 is connected directly to the auxiliary controller 709 as in FIG. 7B for cases in which coins need not be mechanically discriminated based on the respective image data of the coins. Cooling elements such as fans may be used to reduce ambient heat produced by the lighting elements 712*a,b* and other electronic components during operation.

The central computer 701 may be a PC type computer such as one employing an Intel Pentium processor or the like. The computer may run a variety of operating systems such as Windows XP or a Linux based operating system. In one embodiment, the means for capturing and processing the image data collected from imaging devices 704*a,b* is performed by the central computer 701 using image processing algorithms. Image processing speed may be improved through the use of software optimization libraries such as Intel's Integrative Performance Primitives or Intel's Thread Building Blocks. Those skilled in the art will recognize that the processing tasks (described in detail below) can be executed using a variety of programming languages such as C++, Java, Python, etc. as well as other dedicated computer vision software such as VisionPro© software by Cognex. Processing performance may also be accelerated through the use of multiple (parallel) processors, multi-core processors, graphics processing units (GPUs), and other hardware. In one embodiment, a Dell Optiplex GX620 PC is used with a Pentium 4 HT processor, 2 gigabytes of RAM, running the Windows XP operating system.

Figure 7B:
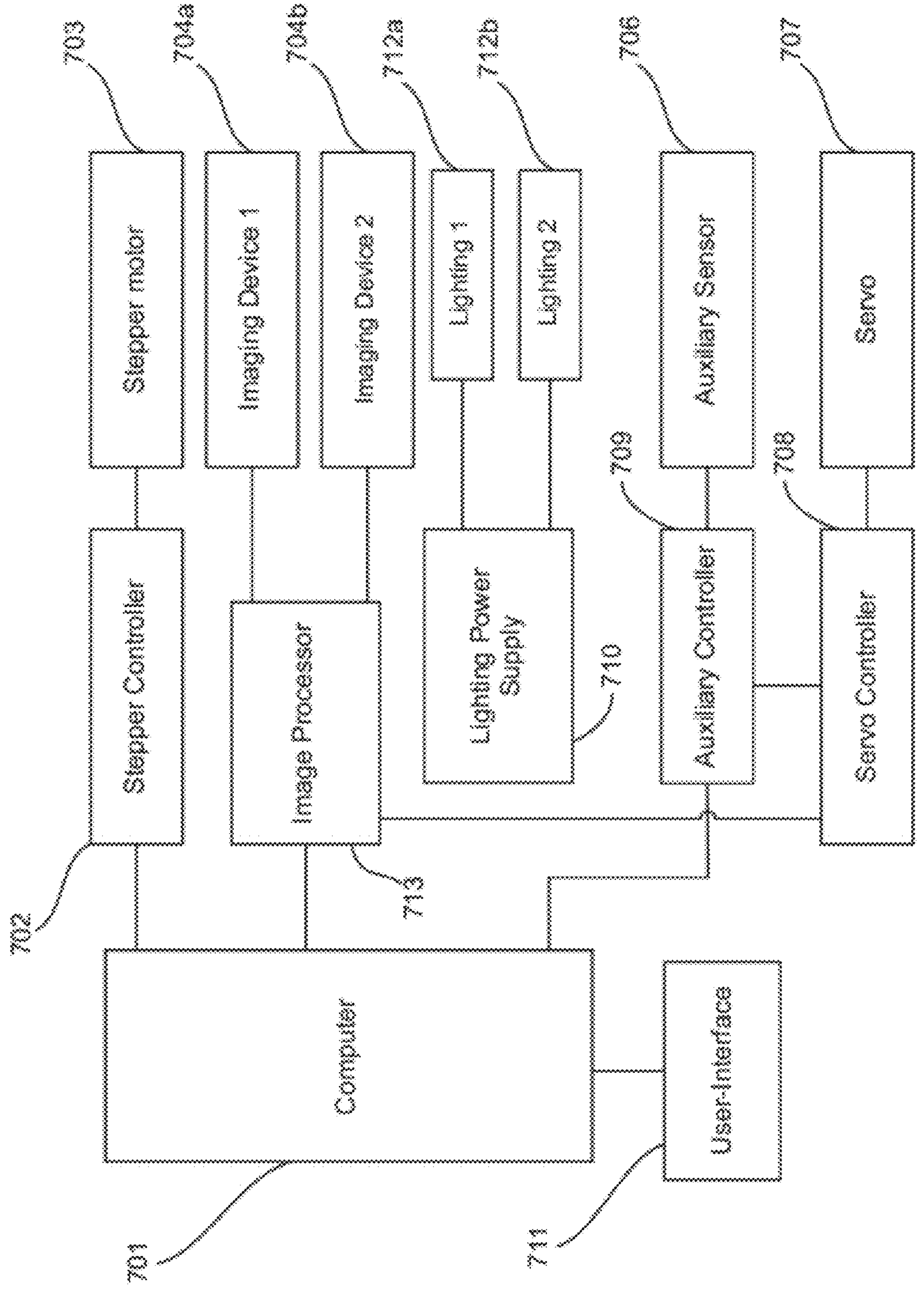

FIG. 7B is a block diagram for one particular configuration of the electronic components used in an embodiment of the present invention where a dedicated image processor 713 is used to improve the efficacy and speed at which images are processed. In this embodiment, the image processor 713 may be directly connected to the servo controller 708 to allow for high speed mechanical discrimination of coins based on the respective image data of the coins. A combination of field programmable gate arrays (FPGAs), application specific integrated circuits (ASICs), digital signal processors (DSPs), micro-controllers or the like may be used to produce the dedicated hardware needed to execute the image processing tasks described in detail below.

Figure 7C:
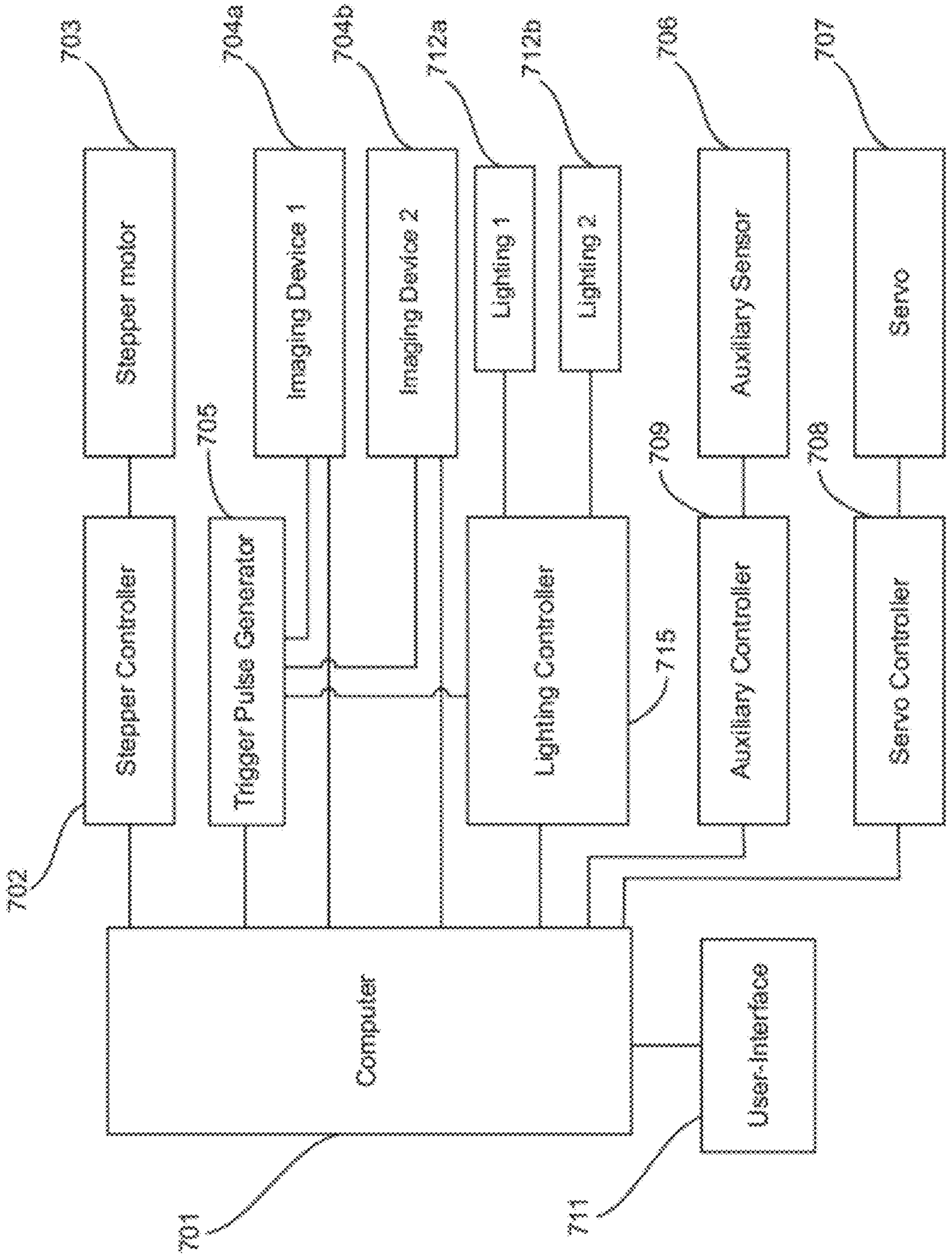

FIG. 7C is a block diagram for one particular configuration of the electronic components used in the present invention where a synchronization or timing device is used to implement burst, or flash-type lighting. A trigger pulse generator 705 is used to trigger the exposure of the imaging devices 704*a,b* and the lighting 712*a,b*. The central computer 701 acquires images by sending a signal to a trigger pulse generator 705 which sends a pulse, such as a rising edge signal, to trigger the imaging devices 704*a,b* to begin exposure. The triggering pulse is also sent to a lighting controller 715 which then illuminates the lighting 712*a,b* for a specified period of time. The trigger pulse generator 705 may send out different signals at different times to different imaging devices 704*a,b* depending on the particular embodiment implemented. Similarly, the lighting controller 715 may illuminate a subset of the lighting elements of the lighting 712*a,b* at different times or intensities than other lighting elements of the lighting 712*a,b*. The lighting controller 715 may also induce a delay to the triggering signal to produce optimal lighting conditions. Parameters such as the delay, intensity and duration of lighting may be set by interface with the central computer 701. Similarly, the timing parameters of the trigger pulse generator 705 may be set by interface with the central computer 701. The triggering pulse may also be induced by other triggering methods such as mechanical or optical switches.

The calibration of the electronic components can be done using a variety of methods, procedures and sequences. The calibration settings of certain electronic components may be interdependent on the calibration settings of other electronic components, thus certain steps in the calibration procedure may need to be repeated multiple times until the desired refinements are achieved. In one calibration procedure, the parameters associated with the lighting 712*a,b* are calibrated first. Depending on the particular lighting configuration, these parameters may include the overall lighting intensity, the relative intensities for multi-element lighting, as well as the pulse duration, intensity and delay for flash-type lighting, and the physical orientation for lighting with adjustable mounting. In many cases an "active" histogram can be used as an aid for achieving uniform illumination across the imaging area. An active histogram is a plot of the number of pixels in an image having a particular value, for example values ranging from 0 to 255. The histogram is updated repeatedly through a succession of images like that from the video source of a imaging device viewing the particular imaging area for which the lighting elements are being calibrated for. By placing testing targets, or "test patterns", in the imaging area and generating an active histogram for the entirety of, or from various regions of interest within, the images acquired the lighting levels can be adjusted such that the histograms generated show little variation over the imaging area.

If the apertures (the opening through which light is focused onto the imaging sensor) of the imaging devices 704*a,b* are adjustable, they may also be calibrated. A large aperture will allow more light to be incident on the imaging sensor but will produce a narrower depth of field (the portion of the imaging region that appears acceptably focused in the acquired image). However, a large aperture may also cause significant geometric distortion in the acquired image. A small aperture will typically provide a larger depth of field and less spatial distortion but may require a longer exposure time (the amount of time during which the imaging sensor samples incident light) to produce an adequate signal-to-noise ratio. The optimal setting will depend on the lighting, optics and imaging sensor used.

After setting the aperture, the focus of the camera can then be calibrated. The focus may be adjusted manually ("by hand") or with an electronically controlled assembly. It might not be possible to bring the entire imaging region into focus due to the aperture setting, thus the aperture may need to be readjusted (generally, made smaller) and the focus calibration repeated. A test pattern containing contrasting regions of various spatial frequency, such as the USAF 1951 Test Pattern, may be placed on the imaging plane and used as an aid for finding the optimal focus. Optimal focus can be achieved "by eye" by examining images acquired successively as the focus setting is altered. In another method, an algorithm can aid in calibration by measuring the contrast of the acquired images of the test pattern. By adjusting the focus setting to maximize the contrast measurement for the test pattern, the image can be brought into optical focus. If the focus setting is electronically controlled, this process may be automated.

The optimal exposure time generally depends on lighting levels, the quantum efficiency of the imaging sensor, and the aperture setting. For embodiments where coins are discretely advanced and thus brought to rest before imaging, the exposure time can be set to acquire the largest amount of light without significant pixel saturation (the point at which pixels cannot register any more incident light). By maximizing the exposure time, the aperture may be reduced which will tend to improve the depth of field and minimize geometric distortion in the acquired images. However, the exposure time should not be set so long that overall processing time is unacceptably lengthened. For embodiments where coins are advanced continuously, the need to mitigate blurring in the acquired images may dictate the optimal exposure time, in which case the aperture may need to be readjusted to achieve the desired signal-to-noise ratio. An active histogram can assist in setting the optimal exposure time such that the highest signal to noise ratio is achieved without significant pixel saturation. For flash-type lighting, the optimal pulse duration and delay time may be dependent on the exposure time and may have to be re-calibrated.

For some imaging sensors the resolution of the acquired images can be changed, typically causing the imaging sensor to operate at a different frame rate. It may be desirable to decrease the resolution of the images being acquired by the imaging sensors to increase the frame rate of the imaging sensors and thus reduce the total processing time. The optimal balance between processing speed and resolution may be set empirically and the processing software can be designed to account for changes in resolution and scaling appropriately.

After operating the imaging devices 704*a,b* under operating conditions for a period of time, "dark frame" images can be taken by acquiring multiple images with lens caps on the imaging devices 704*a,b*. The images acquired will produce an estimate of the fixed pattern noise generally arising from the thermal noise and amplifier noise of the imaging sensors. By taking the pixel-wise median of the group, or "stack", of acquired dark frame images, an estimate of the fixed pattern noise is obtained and can be subtracted from images acquired during operation. This may not be necessary for some imaging sensors due to their quality or design.

For some embodiments, it is desirable for the optical axis of the imaging devices 704*a,b* to be perpendicular to the imaging plane so consistent images of coins can be acquired regardless of the position or orientation of the coins within the imaging plane. An off-axis camera will generally cause distortion such that circular coins will appear approximately elliptical in the acquired images. In one embodiment, the cameras 704*a,b* are mounted on fixed hardware which precisely aligns the cameras 704*a,b* with respect to the imaging plane. In another embodiment, the cameras 704*a,b* are mounted on hardware which allows for fine adjustments to be made to the positioning of the camera with respect to the imaging plane. To aid the calibration process, multiple images of different coins can be acquired and ellipses can be "fit" to the periphery of the coins (the method by which to do so is described in detail below). For a misaligned camera, the ellipses fit will have some average eccentricity and an average angle of orientation. Using the average angle of orientation of the ellipses, adjustments can be made to the position of the misaligned camera. The process may be repeated several times and as the camera becomes aligned, the average eccentricity of the fitted ellipses should approach zero indicating that the coins are approximately circular and thus the camera is perpendicular to the plane.

Due to imperfections in the manufacturing process, imaging devices may produce spatial distortion in the images acquired, and for some cameras this can significantly affect photogrammetric processing. Reducing the size of the aperture can reduce some distortion, however corrections may still need to be made "in-software'", this is especially the case if an extreme wide-angle or "fish-eye" lens is used in conjunction with the imaging sensor. A common technique for correcting this distortion is to use multiple images of a test pattern, such as a checkerboard pattern composed of contrasting squares or an array of solid dots arranged with regular spacing in a grid pattern. By comparing points in the acquired images to points in the known geometry of the test pattern, a model of the distortion can be extracted. One common distortion model used is that of Brown (D. C. Brown, "Close-range camera calibration," Photogrammetric Engineering 37 (1971): 855-866), which assumes the distortion contains a radial and a tangential component. After appropriately modeling the distortion, a geometric transform can be used to correct the distortion from subsequent images acquired during normal operation. This distortion calibration method can also produce estimates of the extrinsic parameters of the imaging device (those pertaining to the orientation of the imaging sensor with respect to the imaging plane) and can be used to make further physical corrections to the orientation of the imaging device as well as in-software corrections via another geometric transform.

The imaging devices 704*a,b* may become misaligned after prolonged operation of the apparatus due to mechanical vibration, impulses, etc. It is thus beneficial to have a method for correcting the alignment of the imaging devices 704*a,b* without direct intervention from the user or a technician. One such method for automating alignment correction is to store in memory the parameters of the ellipses fitted to the periphery of coins in the acquired images during normal operation (described in more detail below). As the camera drifts out of alignment, the ellipses which are fit to the images of the approximately circular coins will become more eccentric. By knowing that the ellipses are in fact representations of an approximately circular surface on a plane, one can define a mapping, or geometric transformation, to correct the images taken from the misaligned cameras. For small deviations in the alignment, an affine-type transformation can be applied. For large deviations, a projective-type transformation maybe required, which can be estimated using known methods (see Q. Chen et al., "Camera Calibration with Two Arbitrary Coplanar Circles", Proc. European Conf. Computer Vision, 2004, pg. 521-532 and M. Lourakis, Plane Metric Rectification from a Single View of Multiple Coplanar Circles, Proc. Of IEEE ICIP, Cairo, Egypt, 2009) which make use of the fact the imaged coins are coplanar circles. Further, the eccentricity of the ellipses fit to the periphery of coins during operation can be used to signal or alert an operator that the imaging device is in need of realignment.

For some embodiments in which the imaging devices 704*a,b* are triggered by the central computer 701, the position of the coin advancing means may need to be known so images encompassing the complete coin(s) can be captured. One method for calibrating the position of the coin advancing means involves placing a calibration mark (such as a circle, ring, ellipse, star etc.) of known dimensions and possibly color, and with high contrast, on the coin advancing means. Before normal operation of the apparatus, the stepper motor advances the coin advancing means. For embodiments in which the coin advancing means is advanced in discrete steps, the coin advancing means is advanced in small steps (typically subtending smaller displacements than the normal operating steps). As the coin advancing means is advanced, images are acquired and processed such that if the calibration mark is detected in an image, using the known geometric properties of the calibration mark, the location of the calibration mark (its center) in the image is recorded and the coin advancing means is no longer advanced. By having previously determined the trajectory of the calibration mark, the measured location of the calibration mark can be used to determine the orientation of the coin advancing means. For a carousel embodiment like that depicted in FIGS. 2A-C, a calibration mark may be placed adjacent to each socket, allowing the computer to track the location of the carousel after each step and make any corrections necessary should the apparatus begin to drift out of calibration. A similar method may be employed for paddle embodiments similar to that depicted in FIG. 3.

The acceleration and speed of the stepper motor during operation can be set empirically, such that the operation is as quick as possible without causing coins to become dislodged, jammed, jerked, or slide past the imaging area due to the inertia of the coins.

For two imaging device embodiments (one imaging device on each side of the transparent surface on which coins are imaged), it may be difficult to position the imaging devices at precisely the same vertical distance from the imaging plane, thus images taken from one camera may display a scene at a different scale or magnification than images taken from the other imaging device. These differences can be corrected by measuring and comparing the radius of multiple known coins imaged by both imaging devices, to produce an accurate scaling factor. For example imaging device 704*a* may measure a US Quarter to have an average radius of 270 pixels, whereas imaging device 704*b* may measure the average radius of a US quarter to be 255 pixels. Subsequent images from imaging device 704*a* can then be scaled down by a factor of 0.9444 (255/270) during processing to match the scale of images produced by imaging device 704*b*. This calibration process also determines the overall scale factor used in the image processing of US coins. For example, if in the particular configuration US Quarters have been determined to have an average radius of 255 pixels, this can be considered the standard scale and the radius for other valid coins can then be determined; for example, the radius of US Nickels would then be known to be approximately 223 pixels (smaller than a US Quarter by a factor of 0.874). Similarly, the expected radius of dimes, pennies, etc. can be determined Using the scaling factor, images can be scaled appropriately so they can be compared to templates of fixed resolution. Alternatively, templates can be resized to the scaling factor for the particular setup. Determining changes in the scaling factor during operation can be automated by tracking the drift in the parameters of the ellipses fit to the periphery of known coins. This can help mitigate errors due to changes in the imaging device alignment, which may be a result of mechanical vibration or the temporary removal of the imaging device for cleaning or maintenance.

If more than one imaging device is used per side of the transparent surface the images may need to be "stitched together" into one larger image before being processed. This stitching may be calibrated by placing a test pattern on the imaging plane and using well known point-set image registration methods where points common to the acquired images of the imaging devices are used to determine the proper geometric transformation.

After the imaging devices 704*a,b* have been calibrated, "scratch images" can be acquired which are images of the transparent surface viewed in the imaging region in the absence of coins. These scratch images can be used to subtract the effects of physical scratches on the transparent coin sliding surface during operation. The scratch images may be used to notify the apparatus, user or service personnel that the transparent surface may need to be cleaned, replaced or toggled such that another portion of the transparent surface is brought into the imaging region. Additionally, the scratch images may be used for background subtraction during operation.

After imaging device and lighting calibration, image processing parameters can be set for the various algorithms used. These may include values dictating processes such as binary thresholding, adaptive thresholding, edge detection and smoothing levels, the specific details of which will be described in more detail below. These parameters may be set empirically by passing coins of known denomination, type, date, and mint and adjusting the parameters to maximize the accuracy in identifying those parameters.

Calibration of the auxiliary sensor 706 and servo-mechanism 707 can be accomplished with known methods specific to the particular devices used.

Figure 8A:
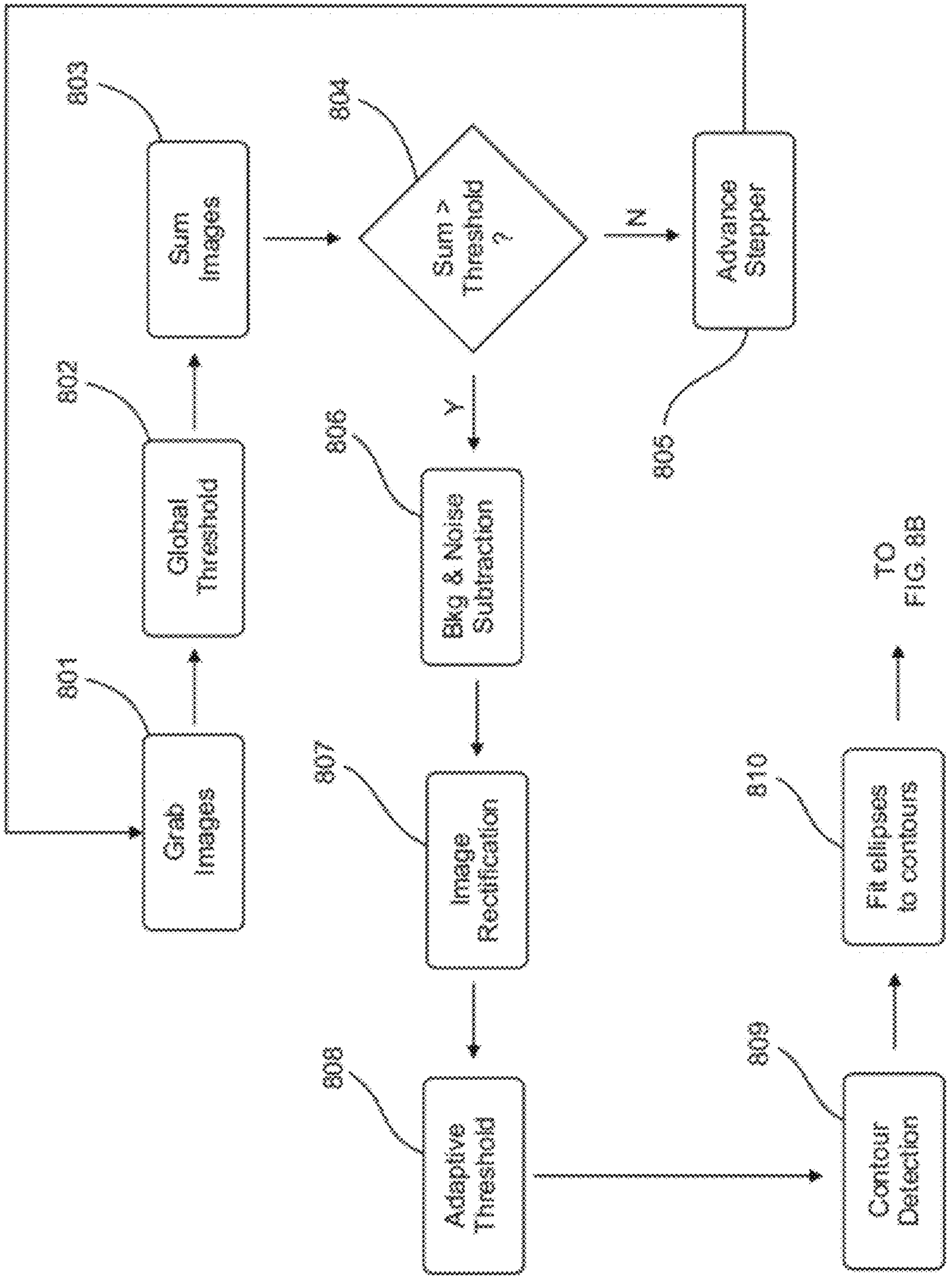
FIGS. 8A-C are flowcharts showing a means for processing image data according to an embodiment of the present invention.
Figure 8B:
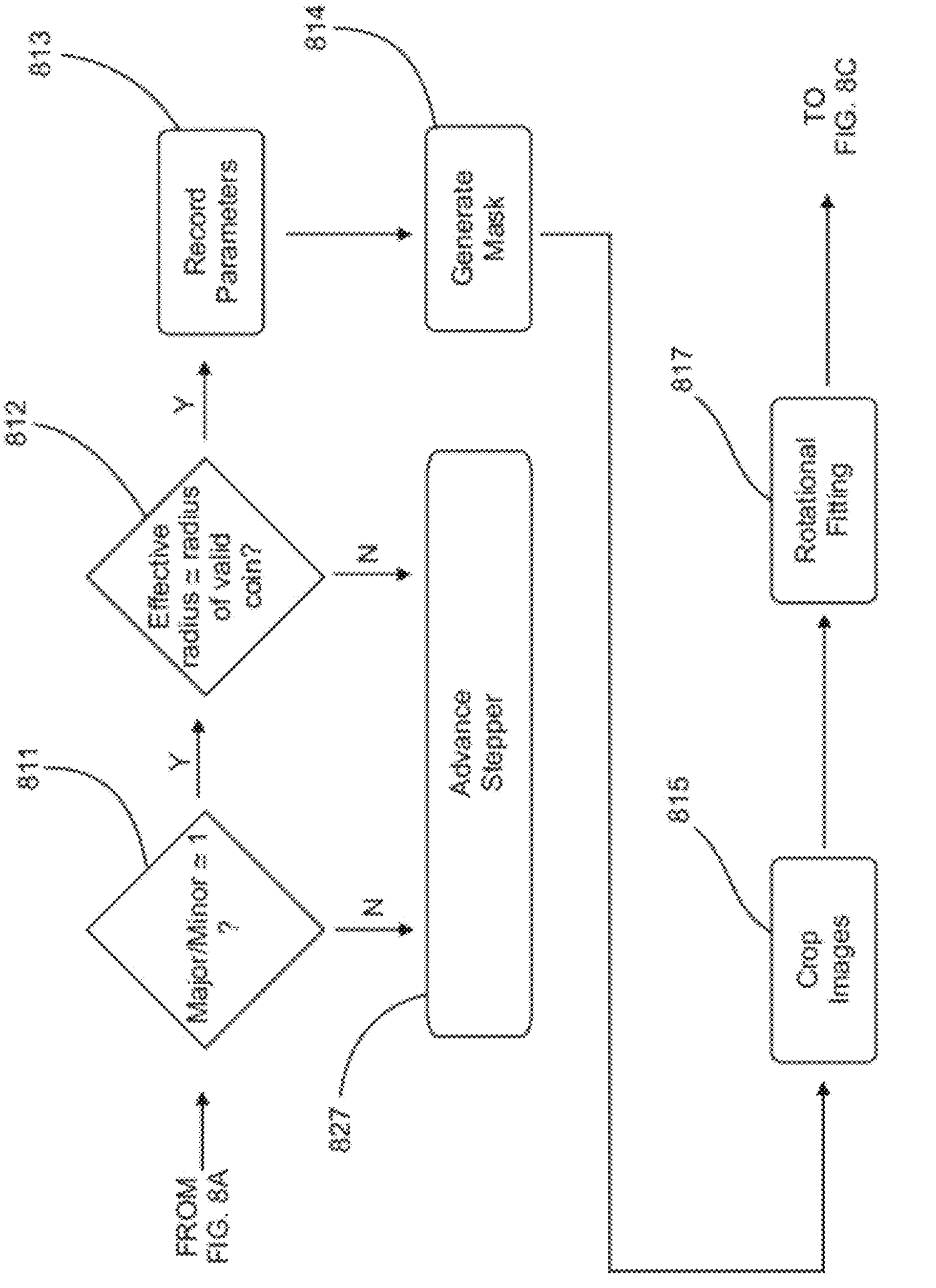
Figure 8C:
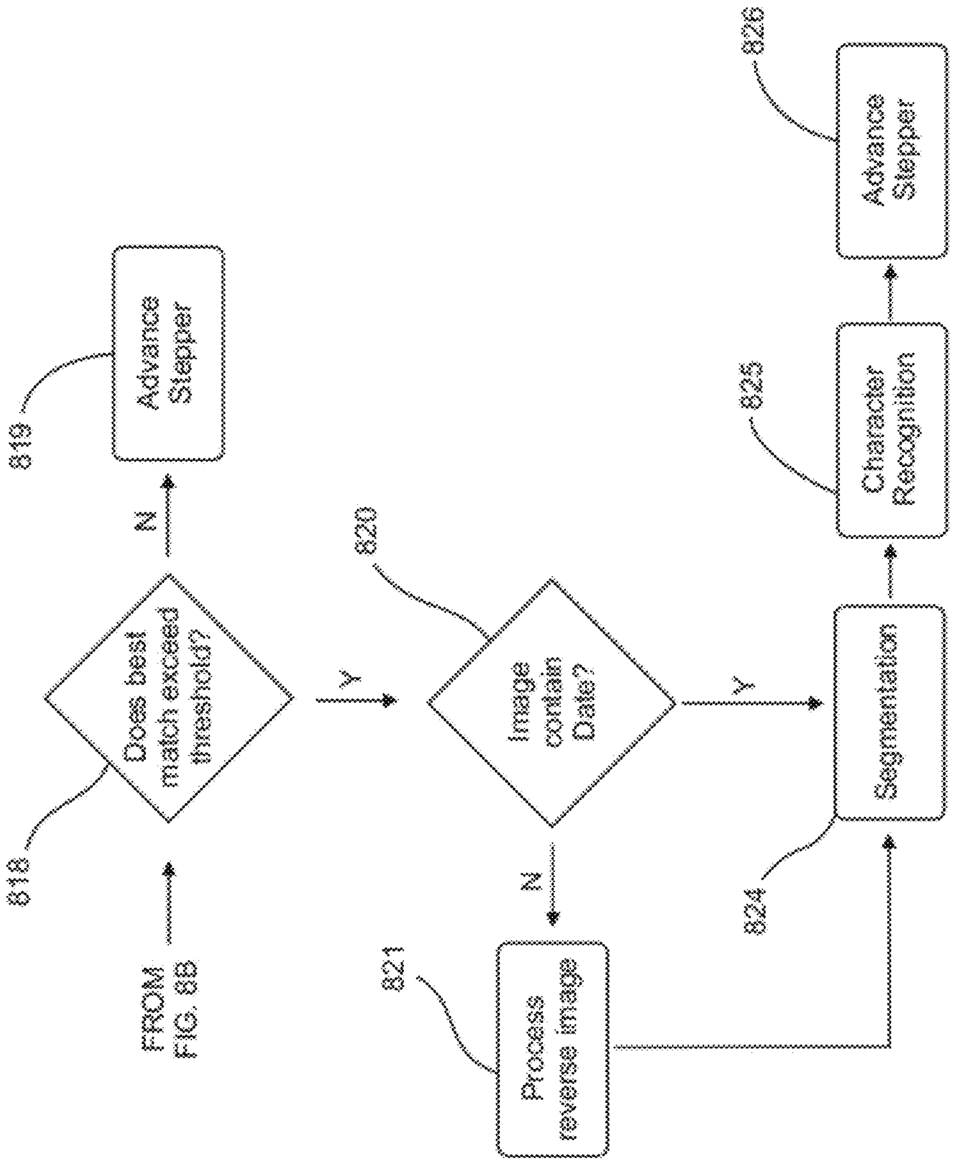

FIGS. 8A-C show a flow diagram for one particular processing sequence as a means for processing the acquired images or image data from an apparatus such as one of the embodiments described above. Those skilled in the art will recognize that there are many methods and variations by which images may be processed to execute the intended purpose of this invention, and FIGS. 8A-C show just one instance of the algorithms and processing chains which can be used. The processing chain diagrammed in FIGS. 8A-C is for an embodiment where coins are imaged one at a time by two imaging sensors, such as in the carousel-type embodiment depicted in FIGS. 2A-C. Relatively simple changes can be made to allow for the processing of images containing multiple coins. For some embodiments, if processing is not done in "real-time", a buffer memory (not shown) may be used to queue the images.

In the following description, images are considered two-dimensional arrays, or matrices, with each individual element in the array referred to as a pixel. The "depth" of the image is the number of bits used to represent the value of each pixel. A binary image is an image in which pixels can have only two values such as 0 or 1 (black or white, respectively) in the case for images with a depth of 1-bit. For images with a depth of 8-bits, the pixels in so called "binary" images can only have values 0 or 255 (black or white, respectively) which is the convention used for the description set forth below. Grayscale images have a larger range of pixel values than binary images, namely values between 0 to 255 (inclusive) for pixels with a depth of 8-bits. It is worth noting that in the description below, the processes described are not necessarily destructive, which is to say image data is not necessarily lost after undergoing a process, and typically new memory is allocated for the new data, or image, output from a process. Thus images or data input into a process can still be refereed to after the process has occurred, as opposed to the process "writing over" the input image or data.

Processing begins with grabbing images (step 801) from the imaging devices for processing. In some embodiments, only one image may be grabbed and processed at a time because for many coins there is a 50 percent chance that the first image processed will contain all the information needed, namely the denomination, type, date and mint of the coin. If it is determined that the first image grabbed and processed does not contain all the necessary information, then the second image is processed. This technique is useful as it decreases the average processing time per coin. In another embodiment, both images are processed in parallel, and this method will be assumed for the remainder of the description.

Before further processing, it is assumed that the images are in grayscale format. If the images are taken with a color imaging sensor, the resulting color image may need to be de-bayered and/or converted to a grayscale format. A global threshold 802 is then applied to the images where each pixel value of the acquired image is compared to a constant threshold value (typically set in calibration). Pixels with values above the threshold value are set to a high value (255) and those pixels below the threshold value are set to a low value (0), thus producing a binary image.

All the pixel elements in the global threshold images are then summed 803 and the sum is compared to a threshold value 804 (typically set in calibration). If the sum is above the threshold, the image is considered to contain an object, if the sum is below the threshold, then no object is considered to be in the image and no further processing is done. In the case where there is no object detected in the acquired images, the images are discarded (cleared from memory, or "freed"), the stepper advances 805 and the processing chain restarts with a new set of acquired images.

For the case in which the sum of the global threshold images is greater than the set threshold 804, the original acquired grayscale images are corrected for background artifacts, artifacts arising from scratches in the transparent surface if applicable and noise 806. Further, any geometric distortions determined in the calibration process are then rectified 807 in the images.

Figure 9A:
FIGS. 9A and 9B are example images of a coin after undergoing adaptive thresholding according to an embodiment of the present invention.
Figure 9B:

Images then undergo adaptive (also known as "dynamic" or "local") thresholding 808, the resulting binary image is used for, among other things, finding the periphery of the object in the image so an ellipse or circle may be fit to the boundary. FIGS. 9A and 9B show examples of images after having undergone adaptive thresholding 808. This set of images will serve as an example throughout the description to exemplify the techniques used in the processing chain. Adaptive thresholding is typically more robust than global thresholding when there are illumination or reflectance gradients in the image. Adaptive thresholding can also be desirable for thresholding objects which may exhibit a large range of reflectivity, for example the difference in reflectivity of a mint condition US Quarter and a worn, highly circulated US Penny. There are several methods of adaptive thresholding 808; in one particular method the threshold value is set on a pixel by pixel basis by computing the weighted average of a b-by-b region around each pixel location minus a constant, where b is the region size in pixels. The pixels can be uniformly weighted or be weighted by some distribution such as a Gaussian distribution. Those pixels which exceed their pixel-specific threshold level are set to a high output (255) and those pixels below their pixel-specific threshold level are set to a low output (0). Images may be "smoothed" before undergoing adaptive thresholding 808 by convolving the image with a Gaussian or averaging filter.

Images then undergo contour detection 809, in which boundaries between black and white (0 and 255, respectively) regions are found in binary images. A contour is a list of pixel elements which represent a curve in an image corresponding to a boundary. Contour detection 809 produces a list of contours, which can then be filtered according to the length of each contour such that only relatively long contours are used for the next process of fitting ellipses to each contour 810. Filtering by length of contour saves computation time as small contours generally correspond to noise, reflections, and artifacts in the image as opposed to the periphery of an object such as a coin.

Figure 10A:
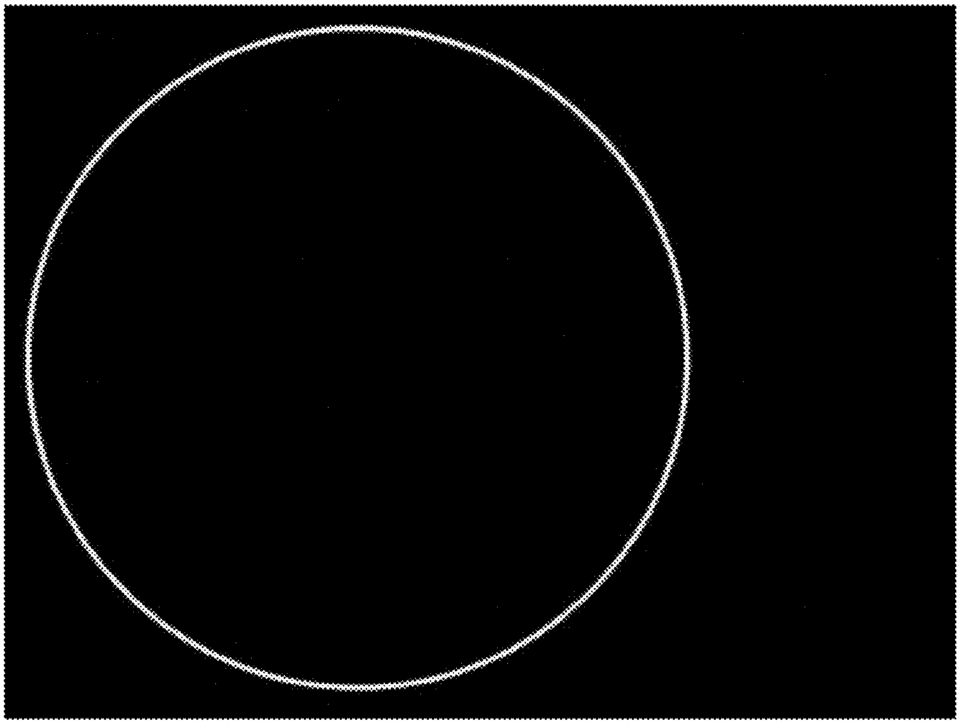
FIGS. 10A and 10B are example images of the ellipse fit to the periphery of an imaged coin according to an embodiment of the present invention.
Figure 10B:
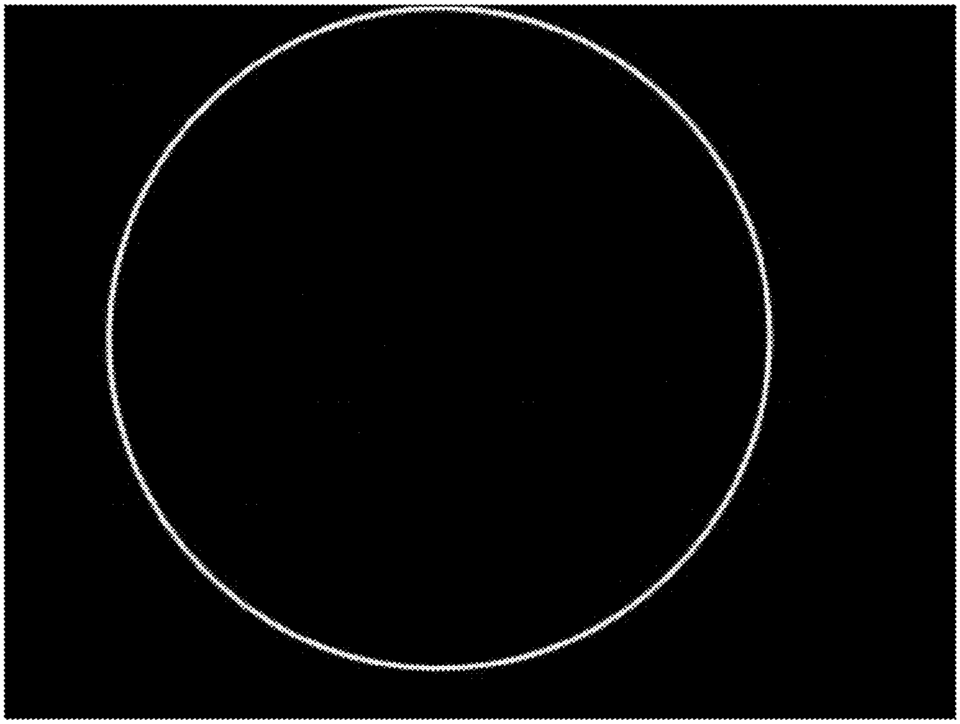

Ellipses are then fit to the length-filtered contours 810 by a least-squares method, rendering a list of the parameters for the "best fit" ellipse for each contour, these parameters include: center of ellipse, semi-major axis length, semi-minor axis length (all measured in pixels) as well as the angle of orientation of the semi-major axis (in degrees) with respect to the horizontal axis of the image. Only ellipses with a ratio of semi-minor axis to semi-major axis near unity are considered good candidates for coins 811 and only ellipses with an effective radius, (semi-minor+semi-major)/2, within the tolerance of a valid coin are considered for further processing 812. If no such ellipses exist, the images are discarded and the stepper motor is advanced 827, and the process is repeated by grabbing the next image 801. FIGS. 10A and 10B show the ellipses fit to the contours of the images shown in FIGS. 9A and 9B respectively.

For images containing an object with valid effective radius and eccentricity, the adaptive threshold process may be repeated using different processing parameters. This may be useful as coins of some denominations, and thus radii, may be composed of materials that exhibit different reflectivity and imaging properties. A more robust binary image may be extracted by using parameters in the adaptive thresholding process optimized for such coins. For example a US Penny may have different optimal adaptive thresholding parameters than a US Quarter.

For images containing an object with valid effective radius and eccentricity, the parameters of the fitted ellipse are recorded 813 and are later used for calibration purposes. An elliptical mask is then generated 814 with a region of interest identical to the fitted ellipse and applied to the adaptive threshold image. A mask is a binary image where a region of interest is set to one value (255) and the rest of the image to another value (0). The mask is then applied to an image (such as a grayscale image) creating an new image in which pixels corresponding to pixels of value 255 in the mask image take on the value of the image the mask was applied to. Pixels corresponding to pixels of value 0 in the mask image are set to 0 in the new image. Applying a mask aids in the removal of background artifacts that might still be in the image of the coin after being cropped.

Figure 11A:
FIGS. 11A and 11B are example images of a coin after masking and cropping according to an embodiment of the present invention.
Figure 11B:

Images are then cropped 815 into images of dimension specific to the coin believed to be in the images. For example, if an object in an acquired image was measured to have an effective radius of 183 pixels, and this effective radius was within the tolerance range for a US dime which has and effective radius of 188 pixels (determined from calibration), the acquired image would be cropped to an 376 by 376 pixel image, the standard set for US dimes, as opposed to a 366 by 366 pixel image. FIGS. 11A and 11B shown the cropped images extracted from the images shown in FIGS. 9A and 9B, respectively.

Another method for determining the location and radius of circular objects in an image is the circular Hough Transform. This method can be used in place of fitting ellipses to contours 810 and may be particularly useful for embodiments in which multiple coins can be contained in one image. The circular Hough Transform can use either an edge detection algorithm (such as algorithms to be described in more detail below) or contour detection to produce a binary image representative of boundaries in the image. In one instance of the circular Hough Transform, an "accumulator space" is created which is a three dimensional array of size m by n by r. Where m and n are the dimensions of the binary image to be processed and r is the number of different radius circles tested to be in the image. For each r, one can imagine a circle of some fixed radius being centered on each (pixel) element in the input binary image. All non-zero (positive) pixels one radius distance away from each element in the m by n binary image are summed and that number is recorded to the respective element in the accumulator space. In this way, edge (or contour) pixels which lie along the outline of a circle of the given radius all contribute to the accumulator space at the center of the circle. In this way, peaks in a plane (one of the m by n sub-spaces) of the accumulator space correspond to the centers of circular features of a given radius in the original image. This method can be robust against noise; however, it generally requires a large amount of computation time and memory. There are variations to the circular Hough Transform which can improve efficiency, and bounding the radius range and resolution can dramatically improve speed.

For embodiments in which multiple coins can be contained in one image, the pixel coordinates for centers of the circles detected in images from one imaging device may be different from the pixel coordinates for centers of the circles detected in images from the opposing imaging device. A grouping method may be needed in order to appropriately group images of the top and bottom of a particular coin. Many grouping methods can be executed; in one grouping method the distance between centers of circles of similar radius from both images are measured and the pairing which minimizes the distance is the considered the correct pairing.

For many of the processes described above and below, computation time may be reduced by using "pyramidal" techniques. By downsampling an image by some set factor before applying a process such as circle detection, the computation time is reduced because there are less pixels which need to be processed. For processes in which geometric parameters are found such as the radius and position of a fitted circle, the parameters may be scaled up by the reciprocal of the factor used to scale down the image before processing. Processing downsampled images typically reduces the accuracy of fitting parameters, thus pyramidal processing may be used for iterative processes in which small scale images are used as first approximations and serve to confine the parameter space for processing at higher resolutions, or at full scale.

Edge detection algorithms may be used for contour detection instead or in addition to adaptive thresholding for subsequent contour detection or other stages of image processing. Those skilled in the art will recognize that a variety of edge detection and edge enhancement techniques can be used such as the use of Sobel or Laplacian operators. In one embodiment, the Canny edge detection algorithm is used for edge detection. The Canny algorithm typically works by first convolving an input grayscale image with a Gaussian or averaging filter to reduce noise in the image. Horizontal and vertical derivatives of the resulting image are then computed using operators such as the Roberts, Prewitt or Sobel operators. From these gradient images the direction and magnitude of edges in the input image are found. The gradient direction is rounded to one of four angles representing vertical, horizontal and diagonal directions; the pixels where these directional gradients are local maxima are candidates for assembling into edges. The Canny algorithm then tries to assemble individual edge candidate pixels into contours. These contours are formed by applying a hysteresis threshold to the pixels of the gradient image, where there are two thresholds, an upper and lower. If a pixel has a gradient larger than the upper threshold, then it is accepted as an edge pixel; if a pixel has a value below the lower threshold, it is rejected. If a pixel's gradient is between the thresholds, then it will be accepted only if it is connected to a pixel that is above the high threshold. Typically good high-to-low threshold ratios are between 2:1 and 3:1. Other algorithm variables to be set include the size of the smoothing filter as well as the size of the derivative operators; larger operators may give better approximations of the directional derivatives. These parameters may also be specific to coins of particular radii or iteratively varied such that a sufficient level of edge detail is produced. Edge detail may be measured by summing all the edge pixels and comparing the sum to a denomination-specific threshold. The resulting image is a binary image with positive regions typically representative of contours of the image.

Images then undergo rotational fitting 817 where the binary edge images (such as those in FIGS. 11A,B) are compared to templates in order to identify the type of coin, which face of the coin is in which image (obverse or reverse) and the rotational orientation of the coin. This also serves to determine whether the object in the image is a valid coin or merely a "slug" or other circular object with the same radius as a valid coin. The effective radius measured in the ellipse fitting process 810 determines what denomination of the coin (e.g. nickel, dime, quarter, etc.) the circular object is a candidate for and thus which set of templates should be used for comparison to the binary edge images.

Within each denomination, templates are produced in advance for obverse and reverse sides of each type of coin expected to be processed. For example, for US Quarters between 1932 and 2008, we have templates for the Obverse and Reverse sides of the US Washington Quarter (FIGS. 12A and 12B, respectively), a template for the reverse side of the US Washington Bicentennial Quarter (FIG. 12C), a template for the obverse side of the US Washington Statehood Quarter (FIG. 12D), and templates for the 50 variations of the reverse sides of the US Washington Statehood Quarter corresponding to each US State (FIGS. 12E-BB).

A variety of methods may be used to create templates. In one method, templates are created using control point image registration, where multiple cropped binary edge images of coins of the same denomination, type and face (obverse or reverse) are visually inspected for points corresponding to common features among the images. A program, such as MATLAB, can be used to generate a geometric transform based on the selected points and apply that transform to the group of images such that the images all align with one another. After a group of images for a particular coin denomination, type and face have been registered the images are then "stacked" such that corresponding pixels from each registered image are summed to form a new intensity image, which is then normalized to form a grayscale image. The grayscale image will have high pixel values for features (positive regions) occurring in many of the images and have low pixel values for less common features. The template can then be threshold such that only features occurring more than a set number of times remain in the template image, and those occurring less are removed. This process reduces noise and anomalies in the template image. Alternatively, the template image may be used as a grayscale image or thresholding may be applied to convert the template image into a binary image.

A "rotational set" is produced for each template in advance. A rotational set is composed of multiple images of a template rotated about the center of the template in discrete angular displacements. The range of the angular displacements can vary from 0 to 360 degrees and various sizes of angular spacing between displacements can be used, for example, in one embodiment the rotational sets consist of 180 images of each template rotated in 2 degree steps, in another embodiment the rotational sets consist of 90 images of each template rotated in 4 degree steps. In the embodiment described herein, all US Washington Statehood Quarter rotational templates consist of templates rotated in 4 degree steps; the reverse US Washington Quarter, reverse US Washington Bicentennial Quarter, and the obverse US Washington Statehood Quarter templates depicted in FIGS. 12B, 12C and 12D respectively, have rotational sets consisting of each template rotated in 2 degree steps. The obverse Washington Quarter template depicted in FIG. 12A has a rotational set consisting of a template rotated in 1 degree steps in order to make subsequent steps of processing more robust.

For templates which are binary images (images with pixels having values of only 0 and 255), some algorithms which produce artificial rotations render grayscale images (images with pixels having values between 0 and 255) due to the interpolation method used, such as bi-linear or bi-cubic interpolation. Other interpolation methods can be used to preserve the binary nature of the templates such as nearest-neighbor interpolation, however, interpolation methods producing grayscale images provide better matching results. By creating rotational sets of the templates in advance, processing time is saved because computationally intensive interpolation does not need to be performed during operation. In one embodiment, the rotational sets for each template are loaded into memory, such as RAM, to improve computation time as opposed to using hard-disk memory storage which tends to have longer access times.

Each image in the rotational set for each template appropriate to the measured radius is then matched to the binary edge images produced in the edge detection step 816. The image with the best match renders the rotational orientation, the type and face of the coin in each image. Template matching can be done a variety of ways, in one embodiment a normalized correlation coefficient method is used. The normalized correlation coefficient matching method operates such that a perfect mismatch between the template and binary edge image will result in a match index of −1, a perfect match will result in a match index of +1; and a value of 0 means there is no correlation between the template and image (i.e. there are only random alignments among the pixels).

For normalized correlation coefficient matching each image in the rotational sets for each template are converted to "signed" grayscale images which allow pixels to have values ranging from −255 to 255. For each image, the mean pixel value of the entire image is calculated and subtracted from each individual pixel such that the resulting image is an intensity map relative to the mean of the original image. The preparation of such "mean-corrected" template images may be done in advance to conserve computational resources during normal operation. Similar to templates, during operation a mean-corrected image is produced of the acquired binary edge image to be matched, referred to hereafter as the "mean-corrected target image". For each mean-corrected template in a rotational set, the match index is found as a function of rotational orientation of the mean-corrected template using the equation (Eq. 1):

$$\text{match}(\theta) = \frac{\sum_{x,y} T(\theta) * I}{\sqrt{\sum_{x,y} T(\theta)^2 * \sum_{x,y} I^2}}$$

where θ is the angle of template rotation, match(θ) is the measured normalized correlation coefficient, or "match-index", T(θ) is the mean-corrected template image from the rotational set for the particular coin type being fit, I is the mean-corrected target image, and the multiplication operator * denotes pixel-wise multiplication between two images and denotes scalar multiplication when between two scalars.

During operation, the rotational sets of template images may be loaded into memory (such as RAM) in one contiguous "image vector", such that all template images can be called, or retrieved, using a single index. All the templates of all the rotational sets can be loaded into one contiguous space of memory, which allows for faster processing. For example, the image vector for the US Quarter contains 4950 images from all the template images in all the rotational sets for that coin denomination. Further, to increase processing time, the templates and the target images can be downsampled to lower pixel resolution to increase computational efficiency, for example all the US Quarter templates and target image are reduced by a factor of 8, from 756 by 756 images to 90 by 90 images.

Figure 12A:
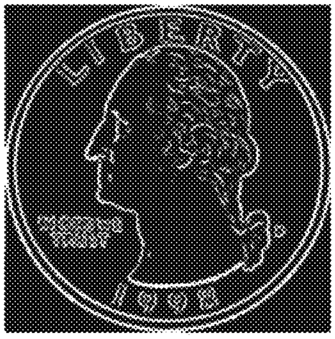
FIGS. 12A-BB are template images of different types of US Quarters according to an embodiment of the present invention.
Figure 12B:
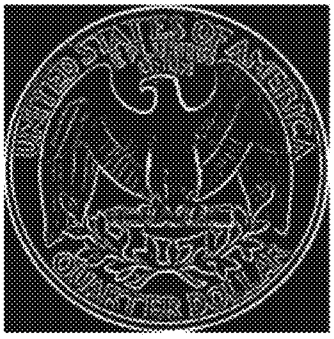
Figure 12C:
Figure 12D:
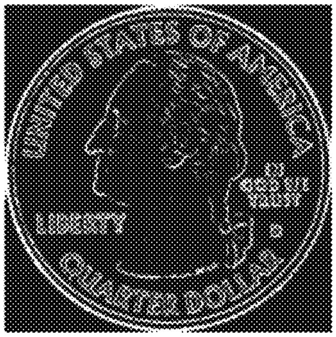
Figure 12E:
Figure 12F:
Figure 12G:
Figure 12H:
Figure 12I:
Figure 12J:
Figure 12K:
Figure 12L:
Figure 12M:
Figure 12N:
Figure 12O:
Figure 12P:
Figure 12Q:
Figure 12R:
Figure 12S:
Figure 12T:
Figure 12U:
Figure 12V:
Figure 12W:
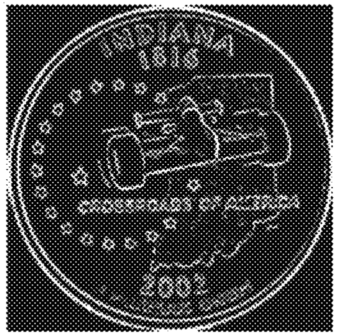
Figure 12X:
Figure 12Y:
Figure 12Z:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12A:
Figure 12B:
Figure 12B:
Figure 13A:
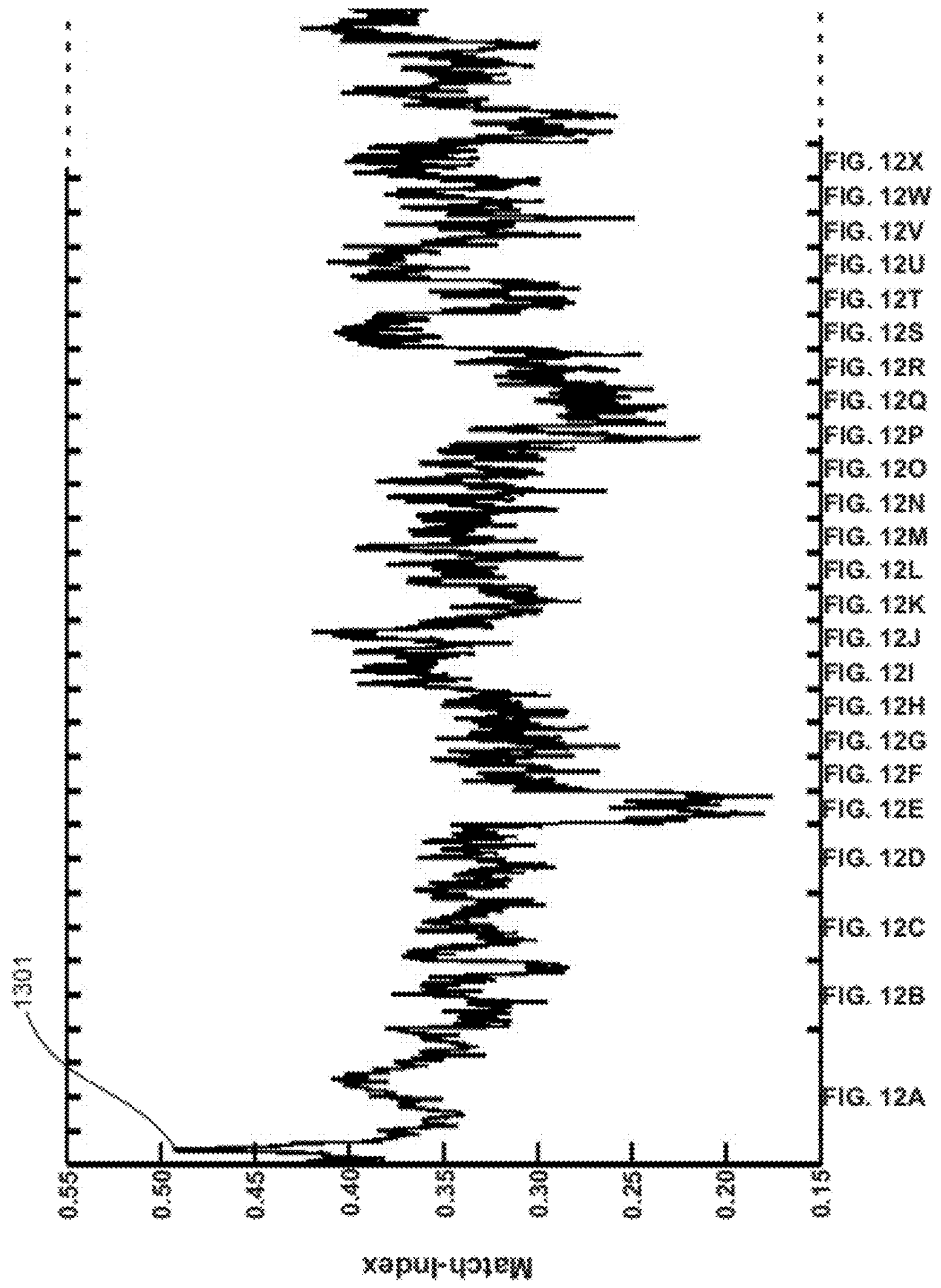
FIGS. 13A and 13B are plots of matching values from matching the templates in FIGS. 12A-BB to the images in FIGS. 11A and 11B respectively, according to an embodiment of the present invention.
Figure 13A:
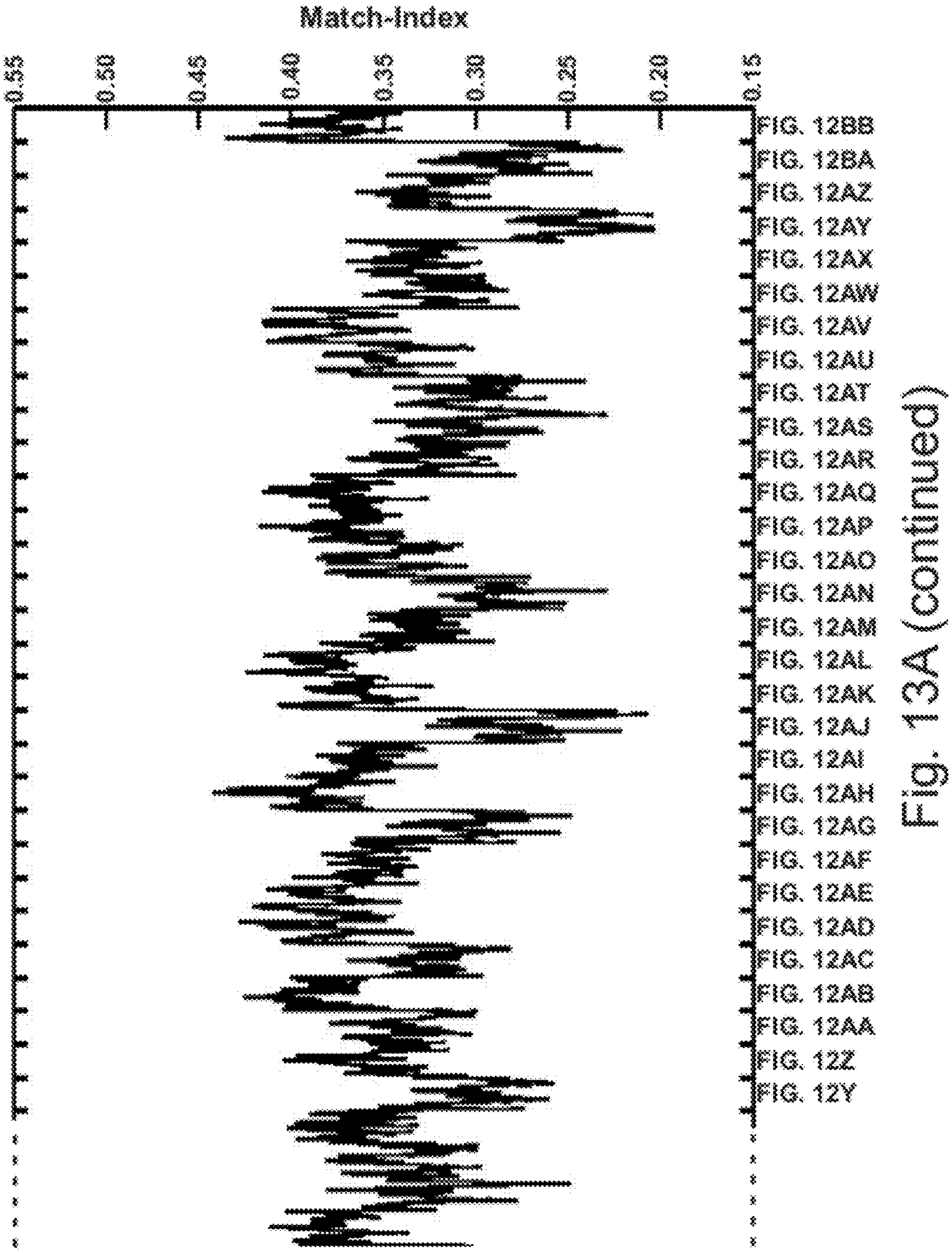
Figure 13B:
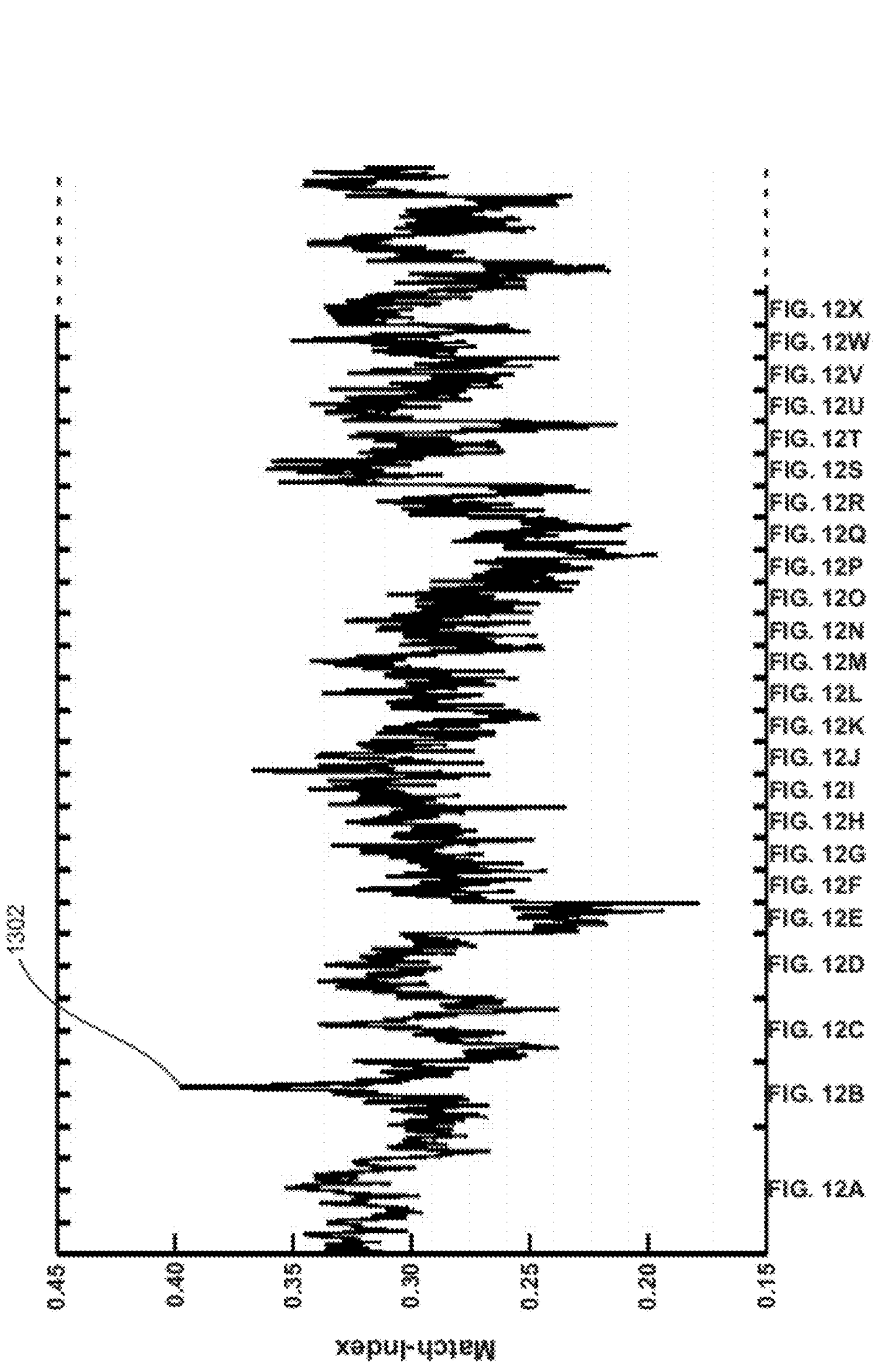
Figure 13B:
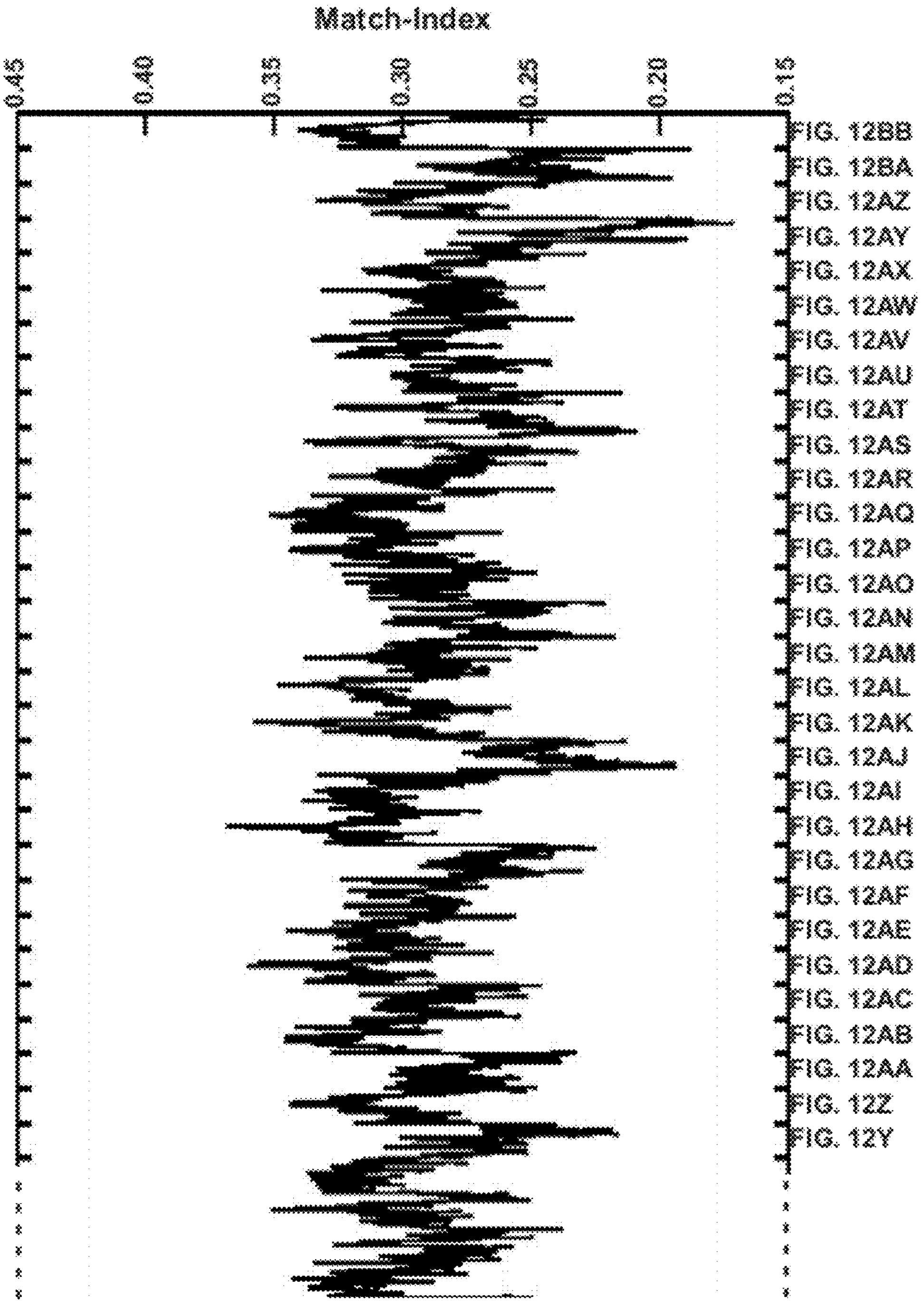

FIGS. 13A and 13B show a graph of the match-index from the matching of the templates shown in FIGS. 12A-BB to the binary edge images shown in FIGS. 11A and 11B, respectively. For FIGS. 13A and 13B, the vertical axis is the match-index and the horizontal axis is the template index, which corresponds to all the rotational sets for all the templates of the US Quarter considered. The peaks 1301 and 1302, or global maxima, represent the templates that best match the respective target images. The template corresponding to each peak 1301,1302 provides the template that best matches the target image; using a look-up table, the peak index provides the type, face and rotational orientation of the coin. In one embodiment, the match-index value corresponding to the best match must exceed some threshold to be considered a valid match 818 and to be processed further. If the match threshold is not exceeded than the images are discarded and the stepper is advanced 819. The match threshold can be template specific, an absolute threshold or a relative threshold such as the peak in comparison to the mean of the match-index such as a "signal-to-noise" ratio, and a combination thereof. In this way slugs, foreign coins or objects with radii similar to the valid coin can be rejected. Alternatively, target images that don't meet the match threshold requirements can be altered and reprocessed to further confirm or deny the validity of the coin or object. Such alterations may include changing the parameters of the adaptive threshold applied to the target image, changing the scale at which the target images and template images are matched or changing the location where the coin or object was cropped from the acquired images. To reduce computation time, a subset of the original template images can be matched against the altered target image.

For embodiments in which the pair of acquired images are processed in series, if it is determined 820 that the first processed image contains the face of the coin which contains no information, such as date and mint, then the processing chain can be restarted with the other, opposing image 821.

For embodiments in which the pair of acquired images are processed in parallel, or both images are processed serially prior to further processing, "coin logic" or redundancy can be implemented such that if one image is a heads the other should be a tails, and the rotations of those coins should be strongly correlated, if not the best matches that make logical sense can be used instead of the best matches selected independent of the other match results. For certain embodiments, it is conceivable that coins can be stacked on top of each other during imaging, in which case there can be contradictory matching results, such as a two headed US Quarter, in these cases the images may be rejected, or if possible, information such as date and mint may still be retrieved.

In the example shown, the images (correctly) correspond to the obverse and reverse side of a US Washington Quarter at 84 and 264 degrees respectively. Therefore, the rest of the relevant information sought (date and mint) is on the first image, FIG. 11A.

Figure 14:
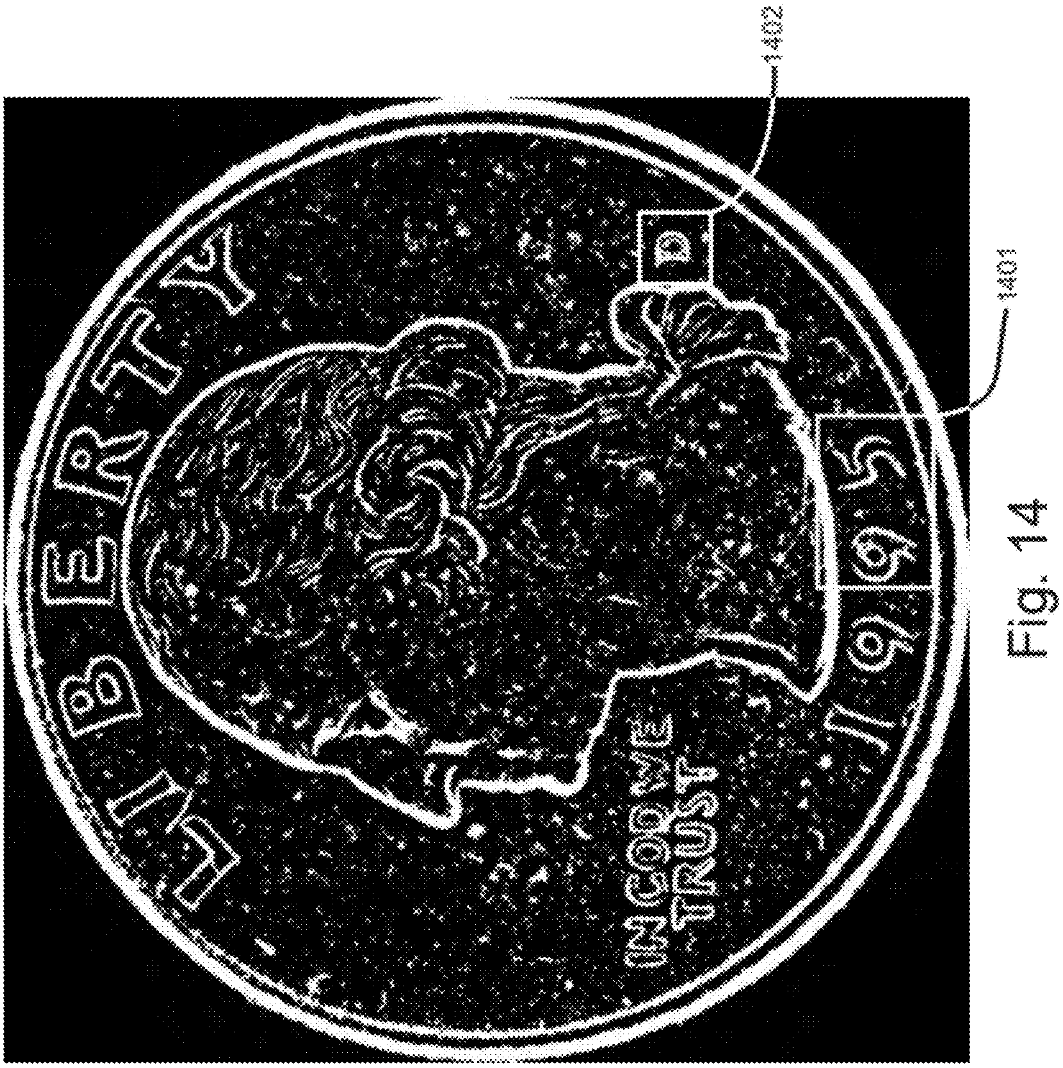
FIG. 14 is an image of the example coin in FIG. 11A corrected for rotational orientation according to an embodiment of the present invention.

FIG. 14 and shows the image from FIG. 11A corrected for the rotation with respect to the best fitting template. The rotationally corrected image then undergoes segmentation 824 to extract sub-images containing the desired date and mint image information. In one embodiment, the specific pixel coordinates of the general region in which the desired image information is located are fixed for the particular denomination and type of coin; by having corrected for the rotation of the coin, the date information lies approximately in the correct region, for example regions 1401 and 1402 for the obverse side of the US Washington Quarter. In another embodiment, the specific pixel coordinates of the general region in which the desired image information is located are modified based on other parameters, such as properties of the ellipse fit to the coin. In one embodiment, the digits composing the date are segmented 824 into individual images so each digit can be processed independently. In another embodiment, multiple digits are segmented into one sub-image, for example in FIG. 14 the area 1401 is cropped into a sub image, shown separate in FIG. 15A, referred to as the "digits target". In the case for the US Washington Quarter, dates can only range from 1932 to 1998, so it is known that the first two digits must be "19", and only the last two digits are considered for recognition. In one embodiment, recognition accuracy is improved by using both digits in the same extracted sub-image as in FIG. 15A; this dual-digit target, or digits target, preserves the inter-digit spacing in the sub-image, which is helpful in the subsequent recognition processing as for some years dates may have been minted with different inter-digit spacing, as well as different orientation with respect to the coin itself, which both provide additional criteria on which to discriminate. In another embodiment, targets containing multiple digits are matched first, and then based on that first match, single digits, or a smaller number of digits, are used as targets for further matching. Such a "divide and conquer" approach can improve segmentation of target digits and reduce the possible valid template digits to be matched, thus improving accuracy and computational efficiency. For some coins, the date information is known from the rotational fitting process because coins of a particular pattern can only originate from a specific date, for example the Connecticut US Washington Statehood Quarter was only minted in 1999. Similar to the date digits, the mint mark is extracted from region 1402, shown as a separate image in FIG. 15B.

Figure 15B:
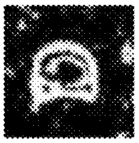
FIGS. 15A and 15B are sub-images extracted from the example coin image in FIG. 14 according to an embodiment of the present invention.
Figure 15A:

The digits target, FIG. 15A, and mint mark target, FIG. 15B, then undergo a form of character recognition 825 such that a corresponding ASCII character can be assigned to each character in those sub-images, FIGS. 15A and 15B, produced by segmentation 824. Those skilled in the art will recognize that many methods can be used for character recognition 825, such as employing genetic algorithms, artificial neural networks, fuzzy c-means, support vector machines, finite automata, feature mapping, boosting, self-organization, template relaxation, or a combination therein. The remainder of the description is focused on the recognition of the digits composing the date; however, the same techniques and methods described can be used for mint mark recognition. For the remainder of the description, and the ongoing example, only the dates of US Washington Quarters from 1965 to 1998 are considered, however the same analysis may be used for a greater range of dates.

Figure 17A:
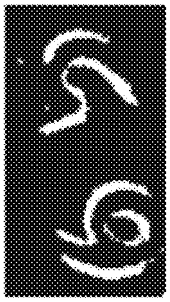
FIGS. 17A-AG are date template images according to an embodiment of the present invention.
Figure 17B:
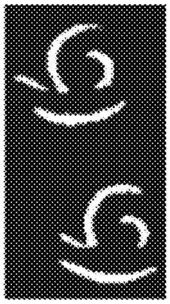
Figure 17C:
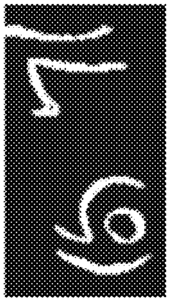
Figure 17D:
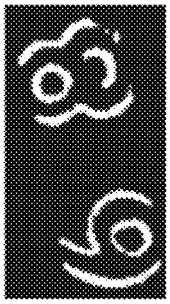
Figure 17E:
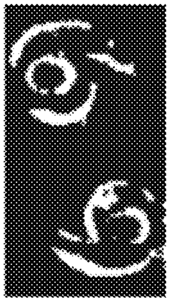
Figure 17F:
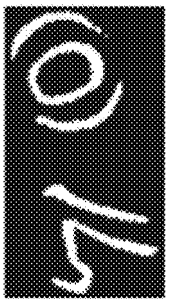
Figure 17G:
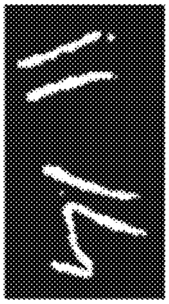
Figure 17H:
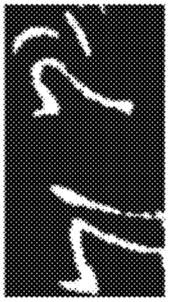
Figure 17I:
Figure 17J:
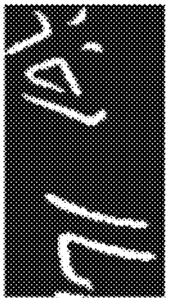
Figure 17K:
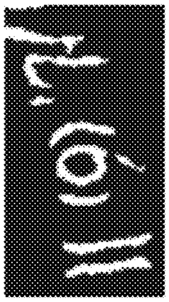
Figure 17L:
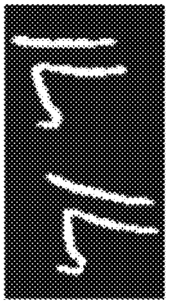
Figure 17M:
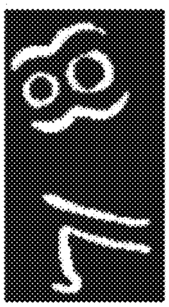
Figure 17N:
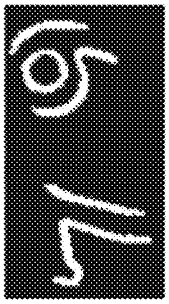
Figure 17O:
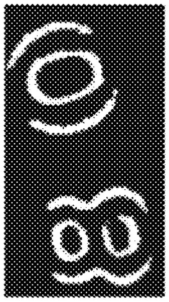
Figure 17P:
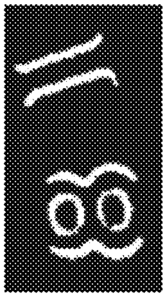
Figure 17Q:
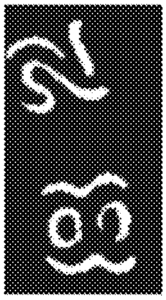
Figure 17R:
Figure 17S:
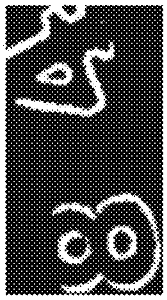
Figure 17T:
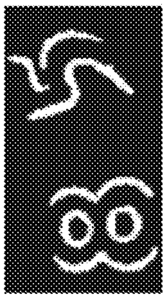
Figure 17U:
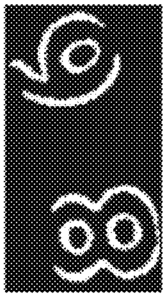
Figure 17V:
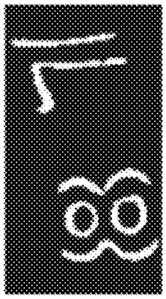
Figure 17W:
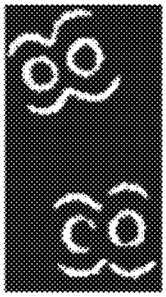
Figure 17X:
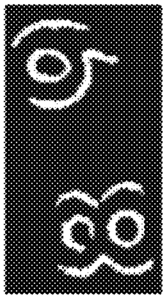
Figure 17Y:
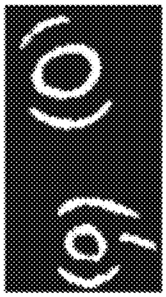
Figure 17Z:
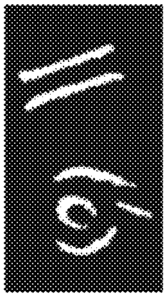
Figure 17A:
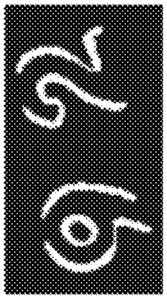
Figure 17A:
Figure 17A:
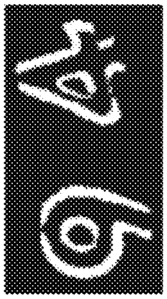
Figure 17A:
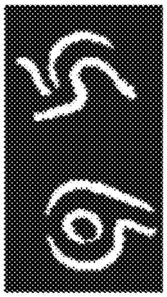
Figure 17A:
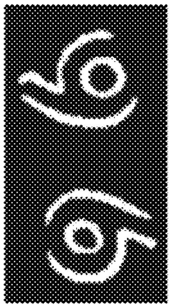
Figure 17A:
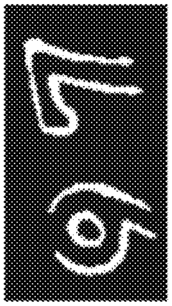
Figure 17A:
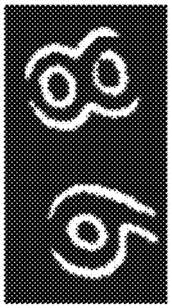
Figure 18A:
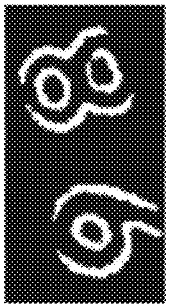
FIGS. 18A-E are example rotational images of the image in FIG. 17AG according to an embodiment of the present invention.
Figure 18B:
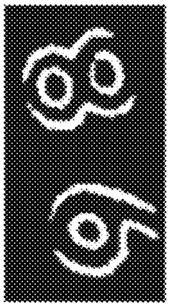
Figure 18C:
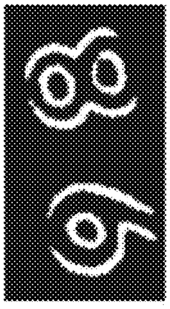
Figure 18D:
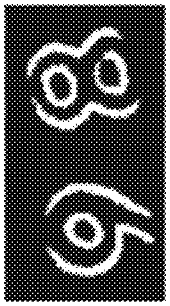
Figure 18E:
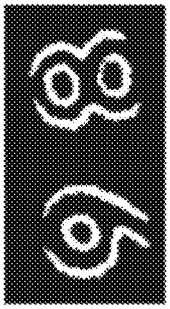

In one embodiment, a template matching method is used to achieve character recognition. For this method, digits templates for each coin denomination and type can be formed using a template creation method similar to the control point image registration method described above for building the templates used in rotational fitting. The digits templates may be modified to eliminate any features which may be shared with other template digits. The digits templates, such as those shown in FIGS. 17A-AG for the US Washington Quarter, are resized to the calibrated scale for the particular apparatus. Alternatively, the digits target, the sub-image we wish to perform character recognition on, may be scaled to the dimensions of the digits templates. The individual digits templates may be binary images or grayscale images.

The digits target is compared with each of the digits templates, for the date ranges of the respective coin denomination and type, using a normalized correlation coefficient method. Further, for each digits template there are additional digits templates of the same digits template, only rotated by some tolerance. For example, in one embodiment each digits template consist of a set of the original digits template and four additional digits templates rotated by −4, −2, +2, +4 degrees, for example, the rotation sets for the "98" digits template are shown in FIGS. 18A-E. In this way, if there is a rotational error due to a poor fit in the rotational fitting stage, it may be accounted for in subsequent stages of processing.

Figure 16B:
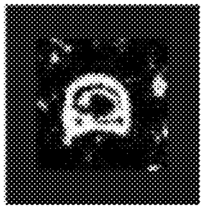
FIGS. 16A and 16B are the padded images of the images in FIGS. 15A and 15B respectively, according to an embodiment of the present invention.
Figure 16A:
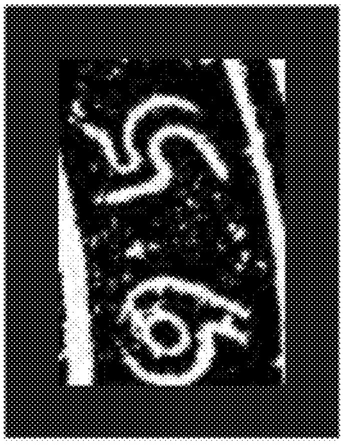

In one embodiment, the digits target and mint mark target are "padded" with zero value pixel elements around the border of the images to allow for greater translational variations between the templates and the target during the matching process. In another embodiment, the digits target and mint mark target are generously cropped, with the region cropped significantly larger than the desired features contained within the cropped image. FIGS. 16A and 16B show the padded version of the images in FIGS. 15A and 15B respectively. The digits templates and digits target are converted to mean corrected images using the process described above for the rotational fitting process. For each digits template and digits target pair, a matching array is created using the following formula (Eq. 2):

$$R(x, y) = \frac{\sum_{x',y'} T(x', y') * I(x + x', y + y')}{\sqrt{\sum_{x',y'} T(x', y')^2 * \sum_{x',y'} I(x + x', y + y')^2}}$$

where R(x,y) is the matching array in which each element indicates the normalized correlation coefficient, or match-index, between a particular mean-corrected digits template I and a mean-corrected digits target T at the relative displacement x,y. The elements of R(x,y) can take on values between +1 for a perfect match and −1 for a perfect mismatch; x' and y' are "dummy" variables for the purposes of referencing pixel elements in the summation, and the multiplication operator * denotes pixel-wise multiplication between two images and scalar multiplication when between two scalars.

Figure 19:
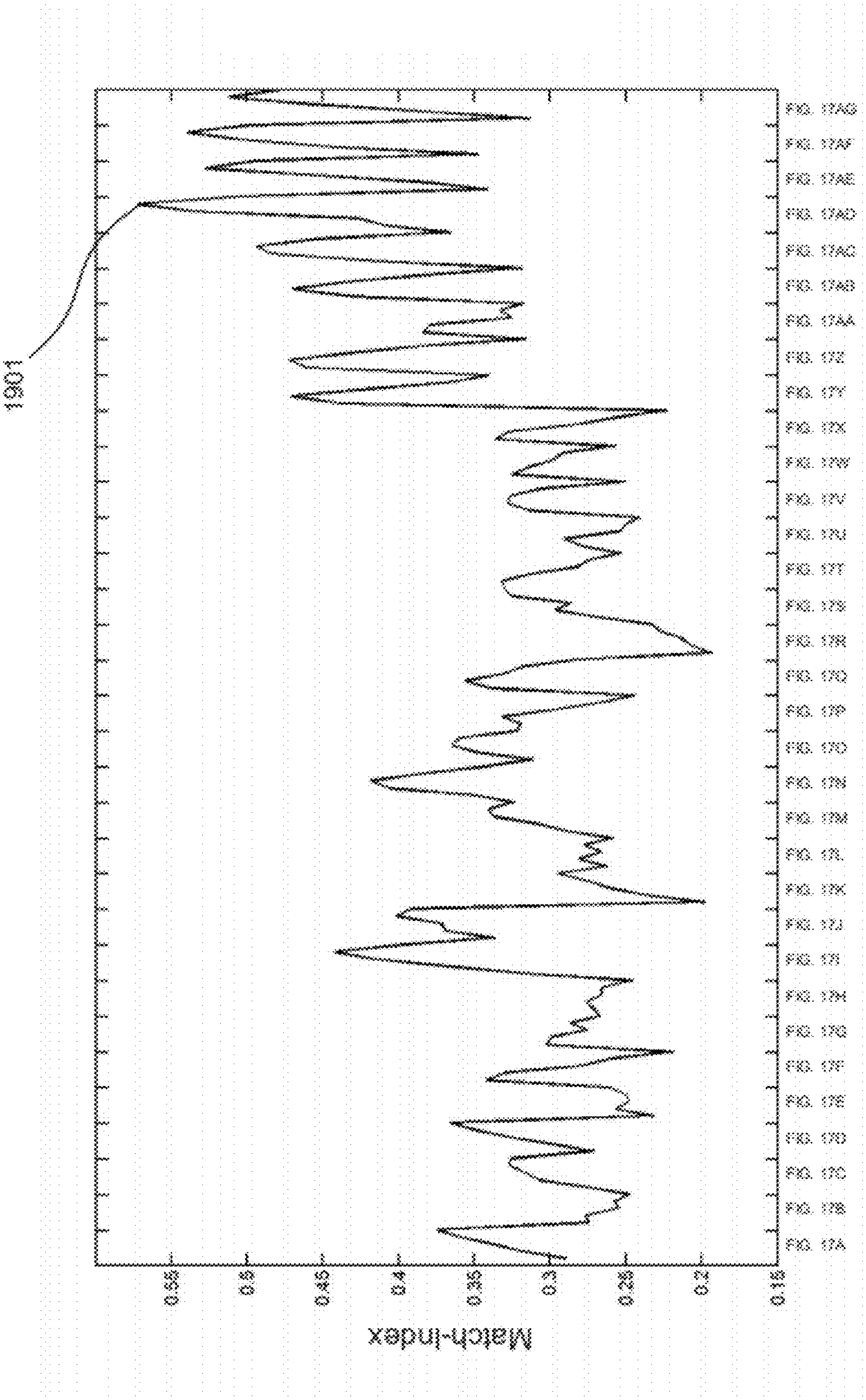
FIG. 19 is a plot of the matching values from matching the date template images in FIGS. 17A-AG to the padded image in FIG. 16A according to an embodiment of the present invention.

For each matching array created from matching a digits template to the particular digits target, the maximum element in the array is extracted indicating the best fit achieved for each digits template. These values are complied into a vector, the resulting vector from matching the digits templates of FIGS. 17A-AG to the padded digit target of FIG. 16A are plotted in FIG. 19, where the horizontal axis corresponds to the digits template being matched (those shown in FIGS. 17A-AG, and the associated rotational variations) and the vertical axis corresponds to the match-index for the digits templates being matched to the digits target. The index corresponding to the overall maximum element of the match vector, which in the case shown is peak 1901 corresponding to the "95" digits template, indicates the digits template which matches best and can thus be used for character recognition.

To decrease the likelihood of misclassification of target digits various augmentations can be made to the template matching method. For example, likelihood criteria can be applied to the results in the matching vector, weighted by the empirically determined likelihood of finding a particular date in circulation, for example a 1944 US Washington Quarter is more unlikely to be found than a 1995 US Washington Quarter.

In one embodiment, grayscale images of coins are enlarged to higher resolution using an interpolation method, such as bi-cubic interpolation, and then the enlarged grayscale images undergo adaptive threshold to become binary images. These binary images are then used for segmentation and character recognition, typically achieving more accurate recognition. This method can be used in addition to processing at normal scale. In one embodiment, if the match levels among template digits are close to one another, or certain threshold parameters are not met such as signal-to-noise ratios, then processing occurs at higher resolution and with a subset of template digits. These methods can be particularly useful for smaller coins, such as US Dimes, which may exhibit smaller features than larger coins, such as US Quarters.

Topological features of the digits target can be used to further weight certain digits templates in the matching vector or reduce the subset of possible digits templates. Such features may include topological "holes" which are closed loops such as those found in "8"s, "6"s, "9"s, "4"s, and "0"s.

A corner detection algorithm may be applied to the image, such as a version of the Harris corner detection algorithm, and corners (number of, sharpness of, location of, etc.) can be used as another classification feature.

The "moments" of the digits templates and digits target may be compared such as centers of "mass" and distribution of "mass" of the images or collections of moments can be compared, such as "Hu moments", to define another metric for measuring the quality of match between a digits template and digit target.

In one embodiment, the results in the matching vector, as well as any additional information such as the distances between centers of mass, distance between other moments, topological measurements, etc. are to be put into a "master" table and a machine learning algorithm is used to determine an appropriate weighting scheme for each feature to produce robust digits recognition. There are many such machine learning methods which may be implemented, many involve having a large "training set" of images with previously identified digits from which the algorithm iteratively determines the most effective weighting scheme to maximize matching accuracy. The "trained" weighting scheme is then used during normal operation.

Similar matching algorithms as those described above can be used for matching and identifying the mint mark target. It is possible for some coins for there to be no mint mark, thus the match-index for mint mark matching or some other criteria may have to be above a certain threshold to indicate that there is in fact a mark. The result of the image processing described is an ASCII string containing the denomination, type, date and mint of each imaged coin. For example, the ASCII string produced from processing the images in FIGS. 9A and 9B is: "US Quarter, Washington, 1995, D." This information can then be used for a plurality of functions, such as checking against a database or table, to trigger hardware such as a discrimination mechanism and produce user notifications via a user interface.

Figure 20A:
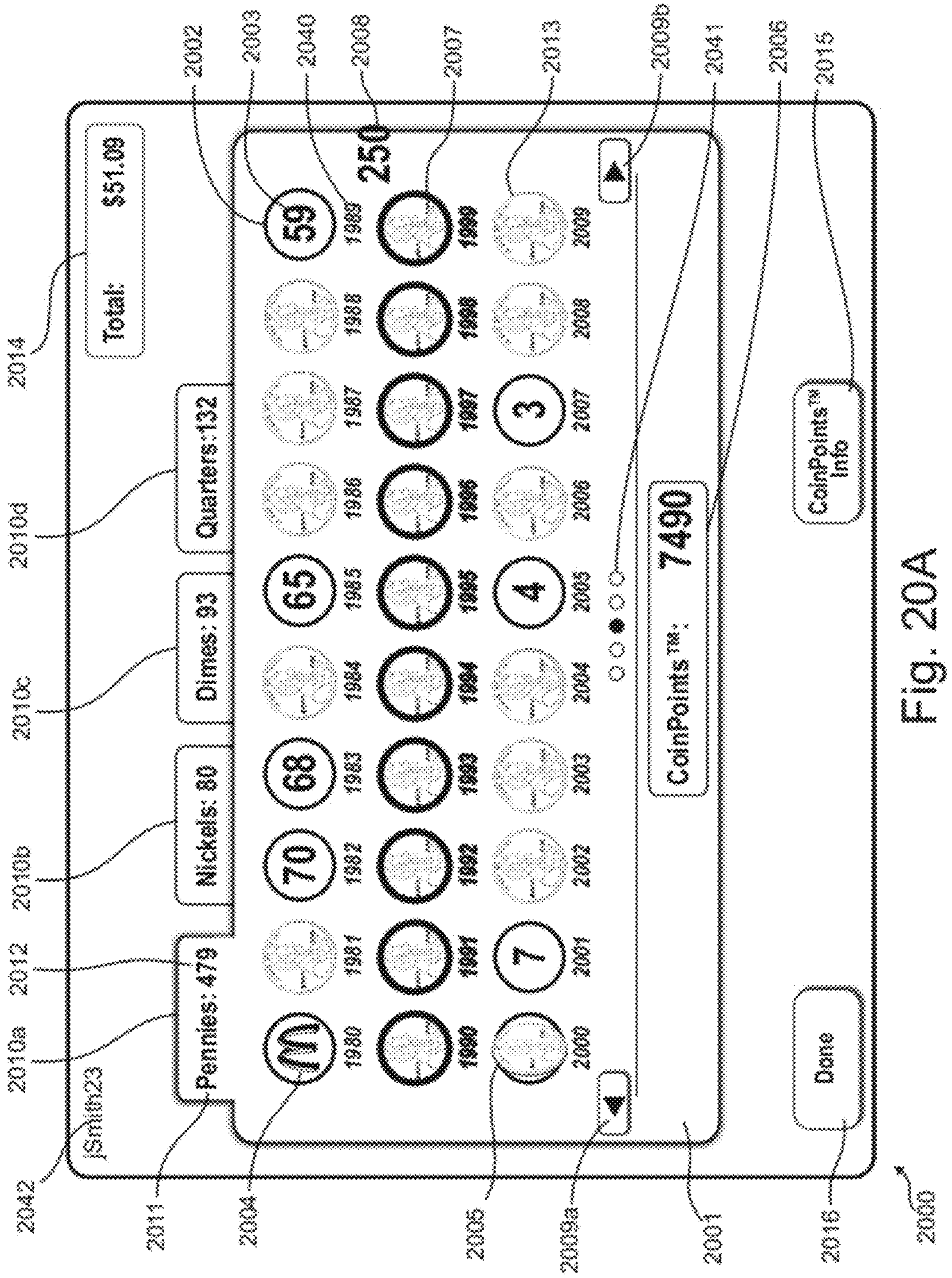
FIGS. 20A-C are example user interface screens according to an embodiment of the present invention.
Figure 20B:
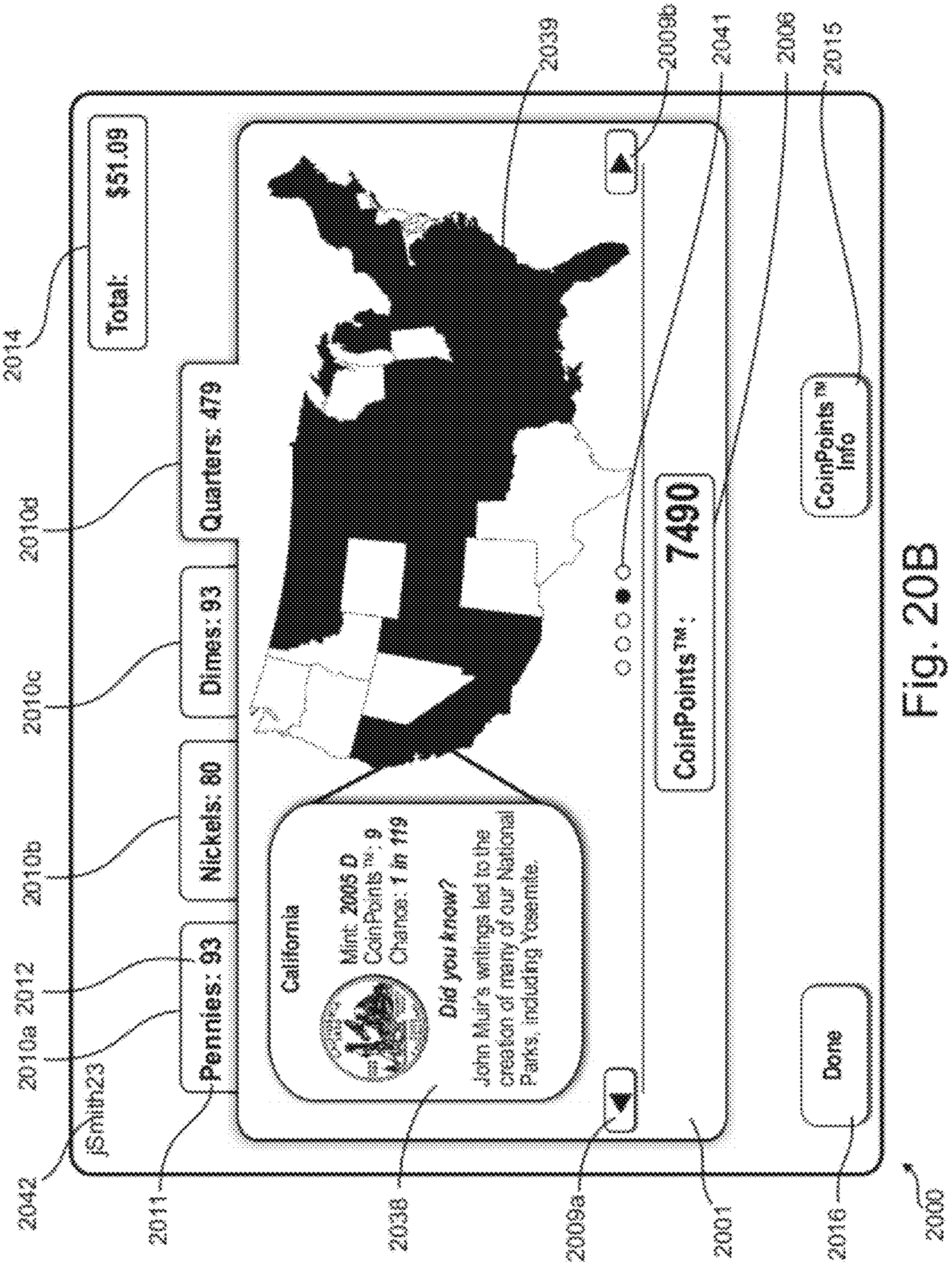
Figure 20C:
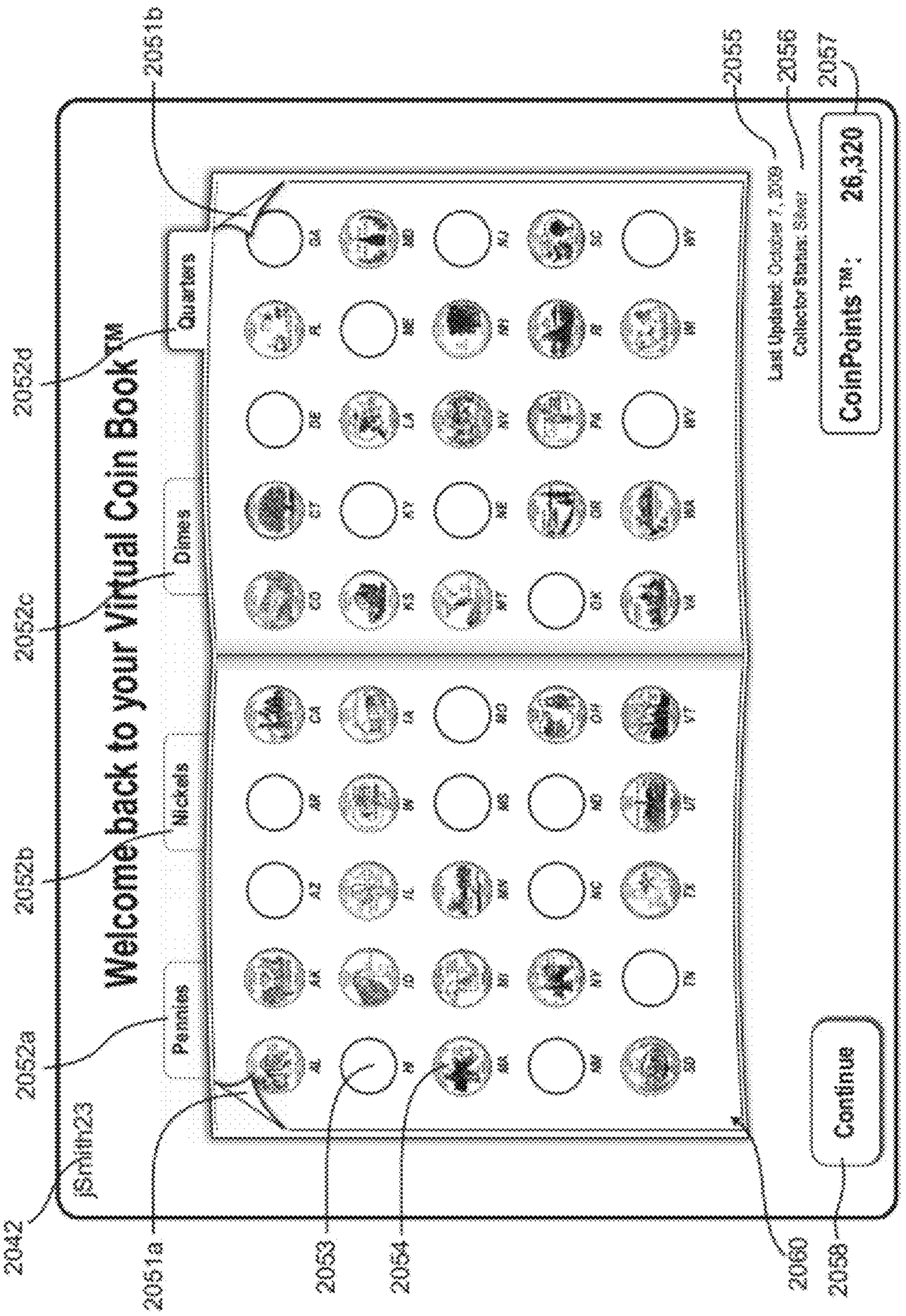

In one embodiment, the ASCII string containing the coin attributes is used by a "front-end" graphical user interface to present the coin attributes to the user on a touch-screen display. Examples of one particular graphical user interface is shown in FIGS. 20A-C. The screen 2000 shown in FIG. 20A consists of a coin display feature 2001, a coin total box 2014, an information button 2015 and an exit button 2016. The screen 2000 may be shown on a display, such as screen 151 in FIG. 1B, while the user is depositing coins in the coin counting kiosk.

Absent from current coin counting and sorting devices is a means for informing the user of the primary attributes of coins deposited, nor is there a means for presenting such information in an entertaining and engaging manner. The coin display feature 2001 is used to organize and communicate the coin data acquired during operation to the user in an intuitive, entertaining and engaging manner. In one embodiment, the coin display feature 2001 consists of a grid with a plurality of coin vacancies 2002 with a date 2040 of the respective coin below each coin vacancy 2002. In this particular embodiment, each row of coin vacancies 2002 corresponds to a particular decade of coin dates 2040. In one embodiment, within each coin vacancy 2002 there is a loyalty point value 2003 or graphic 2004, such as a corporate, charity or organization logo indicating an award, bonus, coupon, donation, merchandise or prize, or other promotional value, that the user would receive for having deposited a coin with the corresponding date of the coin vacancy 2002 enclosing the graphic 2004.

When a coin is deposited and the coin's primary attributes extracted (denomination, type, date, and mint) using the methods described above, the coin is "registered" and the corresponding coin vacancy 2002 is filled, notifying the user that that particular coin has been deposited. In the embodiment depicted in FIG. 20A, when a coin is registered an animated image 2005 of the coin registered (either the image of the actual coin registered or a template or "stock" image) is used to notify the user. In the embodiment shown, the animation consists of a coin rotating about a vertical axis such that the user can see both the obverse and reverse side of the animated coin. The rate of rotation slowly decays until the coin "locks" in place and becomes a static image such as coin 2013. Another animation then follows indicating promotional value, such as the loyalty point value, or bonus, prize, reward, achievement, donation, badge, or merchandise awarded to the user. In an embodiment using loyalty points, the total number of loyalty points accumulated are displayed in a point total box 2006 below the coin grid.

In the embodiment shown in FIG. 20A, when an entire row of coin vacancies 2002 are filled, and thus coins from each year in that decade have been deposited, the user is notified by highlighting the dates 2040 and placing a "halo" 2007 around each of the coin images 2013 in the respective row. The user is also given a graphical indication 2008 of an award such as promotional point value for the row completion which is an animated number that fades after a period of time.

The user may also select to view other coins of the same denomination, such as older or newer dates and types of coins, by using the navigation buttons 2009*a,b* to toggle between other coin grids. For the particular screen shown, the user may select the left most navigation button 2009*a* to view older US Pennies or select the right most navigation button 2009*b* to view different types of Lincoln Bicentennial Pennies. A coin grid page indicator 2041 may be used to indicate the current coin grid being viewed relative to the other coin grids. The user may also view and explore other denominations of coins by selecting one of the denomination tabs 2010*a,b,c,d*. Each denomination tab 2010*a,b,c,d* indicates the denomination 2011 and the total number of coin of that denomination registered 2012. The user may gather further information about each coin shown by selecting or actuating the coin image 2013. Such information may include the origin of mint, images of both sides of the user's actual coin, how many of the selected coin were minted, how many times the select coin was registered during the deposit, or during the history of the apparatus, the odds or probability of finding the selected coin in circulation, the number of loyalty points awarded for the selected coin, etc. Different coin images 2013 may be used to represent and communicate the quality of the coin registered, for example a more worn coin may be represented by an image of a coin with less luster and of a different general color. The total monetary value of the coins registered may be indicated in a separate coin total box 2014. Users may select the information button 2015 during the coin deposit process to view information such as an explanation of the features of the user interface screen 2000. When a user has deposited all of their coins, the user may select the exit button 2016 to indicate the completion of depositing coins. A user may identify themselves using a loyalty card, or the like, prior to, or during coin deposit. In one embodiment the username 2042 of the user is displayed on the screen 2000 during coin deposit.

FIG. 20B shows another aspect of the coin display feature 2001, in this case one of the pages is viewable in the Quarters denomination. In the page shown, users are notified of the detection of specific US Washington Statehood Quarters by illuminating the respective states in a state map 2039. Users may select specific states to retrieve more information about the coin, such as the year and location of mint, the number of loyalty points awarded, the chances of finding the coin in circulation, facts pertaining to the specific State or coin, or additional information in an information box 2038.

FIG. 20C shows another feature in which users can track the coins deposited over multiple deposits or transactions with the apparatus. For example, users can view their progress as they deposit or "collect" every version of the US Washington Statehood Quarter. Prizes, loyalty points, status, badges, merchandise, rewards, donations, coupons, or publicity, and any other loyalty point value, and other promotional value that encourage users to use this system may be awarded to the user for completing multi-transaction achievements. The feature shown in FIG. 20C organizes the users' coin data (e.g. the coin's primary and/or secondary attributes and any information or statistic collected or calculated during the coin processing of all the coins deposited and any derivative data) into a "virtual coin book" 2060. Using the virtual coin book 2060 users can view their coin data using coin images 2054 and coin vacancies 2053 representing the coins which have and have not been deposited in the kiosk respectively. Users can browse their coin data by selecting denomination tabs 2052*a,b,c,d* to view other denominations of coins, users may also select leaflets 2051*a,b* to view different coins within the same denomination. In one embodiment, if the user has identified themselves to the apparatus, or logged-in, for example by scanning a loyalty card, the total accrued loyalty points are displayed to the user in an accrued loyalty points box 2057. Other data such as last log-in date 2056 or loyalty status 2056 may be shown.

Figure 21:
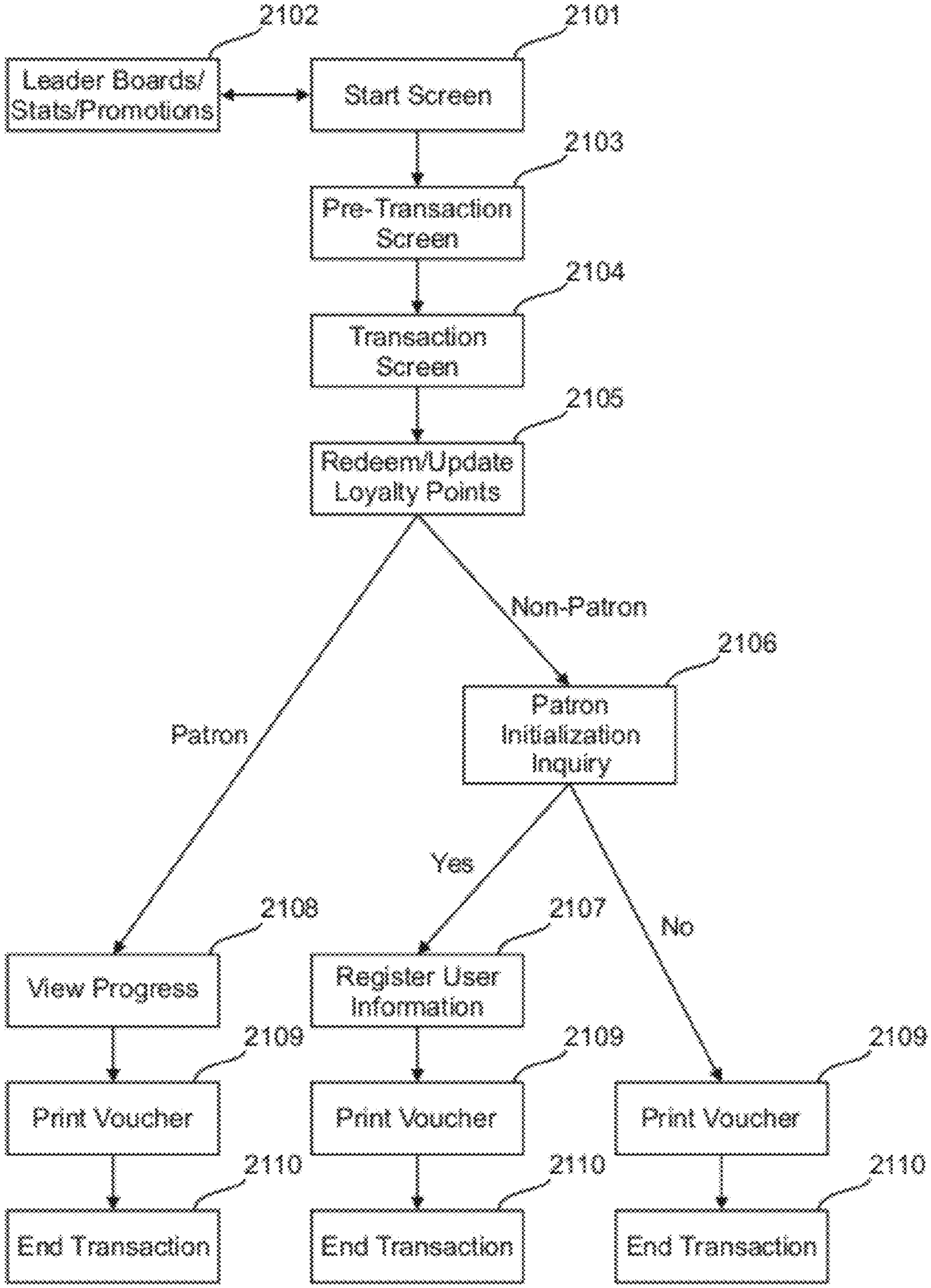
FIG. 21 is a transaction flowchart according to an embodiment of the present invention.

FIG. 21 shows a flow chart for the screens which may be navigated by a user during a transaction in one embodiment of the invention. A Start Screen 2101 is shown by default when the machine is not processing coins. The Start Screen 2101 may display animations, video or instructions on how to use the kiosk and information about the services provided. From the Start Screen 2101 users may access a Leader Boards, Statistics and Promotions screen 2102 where users may view top loyalty point scores from prior transactions, or for specific coins deposited, as well as view the details about those specific coins and transactions, such as the dates of the coins, date of the transaction, name or alias of the user. Users may also view special promotions such as a Coin of the Month, special prizes or coupons, the points awarded for specific coins, etc. Some of the information on the Leader Boards, Statistics and Promotions screen 2102 may also be presented on the Start Screen 2101 so people passing by the kiosk can take notice of the information without manipulating the kiosk. Some of the leader boards displayed may be accessed via mobile device as well as reflect data from members of social networks of which the user is a part of.

From the Start Screen 2101, users who wish to initiate a transaction are taken to a Pre-Transaction screen 2103 where the user is notified of any options, fees, terms and conditions for the service. If the user proceeds, the user is taken to a Transaction Screen 2104, such as the screens shown in FIGS. 20A and 20B, which are displayed and can be interacted with while the user deposits coins. During the deposit of coins, the user may acquire promotional value, such as loyalty points, promotions, coupons, rewards, badges, prizes, etc. as well as the amount of coins counted. Upon completing the deposit of coins, the user is then taken to a Redemption Screen 2105 where the user may instantly redeem any promotional value, such as loyalty points earned for a tangible product, such as, coupons, merchandise, services, vouchers, prizes, etc. In one embodiment, at any time during the transaction the user may scan a loyalty card via a bar code scanner. Upon identifying the user, the user's transaction history is retrieved and any loyalty points saved from previous transactions can then be redeemed at the Redemption screen 2105 shown. Other methods to identify the user may include near-field technology, RFID, a personal password, electronic mailing address, magnetic strip reader, bar code reader, keypad, mobile device, or the like. The user's selections on the Redemption screen 2105 may result in the debit of the user's loyalty points. Any additional loyalty points not used may be automatically saved for registered users (referred to as "patrons") who have already logged-in, for unregistered users (referred to as "non-patrons") or users who are patrons but are not logged-in, those users may be prompted with a Patron Initialization Inquiry screen 2106. On the Patron Inquiry screen 2106, if the user desires to save their loyalty points, the user can then register with the kiosk by providing some identification information on a Register User Information screen 2109. For users who do not desire to become patrons, the user is then notified via a Print Voucher screen 2109 that their transaction voucher is printing. For both patrons and non-patrons, the voucher printed may contain loyalty point redemption or prize information, which the user may be reminded of on the Print Voucher Screen 2109. The user is then notified of the end of the transaction via an End Transaction screen 2110.

Users who are logged-in patrons may view their coin progress in a Progress Screen 2108, which allows users to view the various denomination, types, dates and mints of the coins deposited over the course of their transactions. In one embodiment, the progress information is organized in the form of a virtual coin book similar to that shown in FIG. 20C. Data from a users social network may also be integrated into the Progress Screen 2108.

Figure 22:
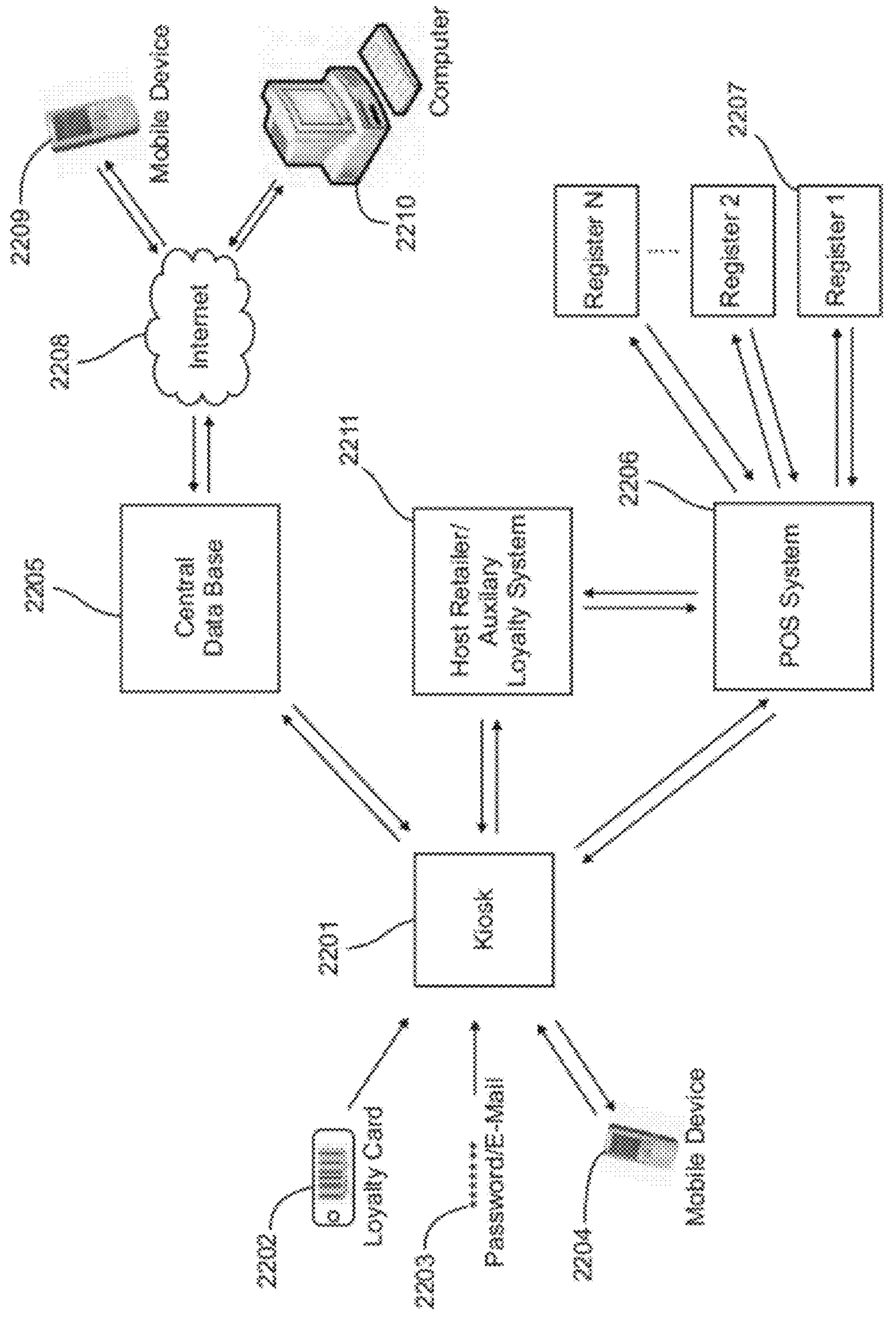
FIG. 22 is a kiosk network diagram according to an embodiment of the present invention.

FIG. 22 is a diagram showing how a kiosk 2201 may interact with the consumer environment according to one embodiment of the invention described herein. The kiosk 2201 may be connected to a Central Data Base 2205 via some communication facility such as an internet, intranet, wireless, telephone or other communication connection. The kiosk 2201 may transmit to the Central Data Base 2205 data relating to the transactions, coin data, such as the primary and secondary attributes of coins, and any derivative data, such as data relating to promotional value awarded to the user, registered at the kiosk 2205. Other data may be sent from the kiosk 2201 to the Central Data Base 2205 concerning the operation status, repair needs, kiosk access, or the like. Additionally, the kiosk 2201 may receive from the Central Data Base 2205 specific user data such as transaction history, coin data, loyalty points data, rewards data, as well as software updates, for example changes in the user interface or data relating to the coin processing operations such as template data for a new type of coin in circulation or update template data, as well as data from social networks and social media outlets. The Central Data Base 2205 may be at a remote location different from the location of the kiosk 2201.

The data stored in the Central Data Base 2208 may also be accessed by users while not at the kiosk 2201, for example users may use a computing device, such as mobile devices 2209 or computers 2210, to access the Central Data Base 2208 via the internet 2208 to view their coin data, find out about promotions, trade virtual coins with other users, post versions of their coin data, or progress, badges, awards to social media outlets, social networks and websites, view statistics, leader boards, and the like.

The kiosk 2201 may also be connected to a host retailers' loyalty system or Point of Sale (POS) System 2206, which may also be accessed by registers 2207 or tellers at the same location as the kiosk 2201. This may be used to register the amount of the transactions as promotional value, such as points, prizes, awards, coupons, vouchers, or the like, earned at the kiosk 2201.

The kiosk 2201 may collect user's information and identify users using a unique or already issued loyalty card 2202, identification Card, bar code, magnetic strip, RFID, password 2203, electronic mailing address, mobile device 2204, near-field technology device, or the like. The kiosk 2201 may interact with a user's mobile device 2204 to update information, such as transaction data, coin data or any derivative data, for example via a software application running on the mobile device 2204. Information acquired from users (including information regarding the coins deposited) will allow users to interact with each other with their respective computing devices or mobile devices 2204 to exchange information, such as transaction data, coin data, any derivative data, contact information, and the like to foster discussion, trading, etc.

INDUSTRIAL APPLICABILITY

This invention may be industrially applied to the development, manufacture, and use of a coin identification apparatus and method for identifying and sorting coins based on primary attributes and/or secondary attributes, and displaying the results in an entertaining and engaging manner. The apparatus comprises a tray 101 into which coins are loaded; a coin pick-up assembly 107 operatively connected to the tray 101 into which the coins are deposited from the tray 101; an imaging device 207 to acquire an image data selected from the group consisting of a denomination, a type, a date, and/or an origin of mint; a computer specially programmed for processing the image data; a means for mechanically discriminating the coins based on the image data, causing the coins to be routed into one of a plurality of bins 109; and an output device to display at least one primary attribute of the coins in graphical form. The graphical representation of the coin data can be presented in animated form to entertain the user as the data is updated in real time.

What is claimed is:

1. A coin identification system, comprising:

a. a tray into which coins are loaded;

b. a coin pickup assembly operatively connected to the tray into which the coins are deposited from the tray;

c. an imaging device to acquire an image data selected from the group consisting of a denomination, a type, a date and an origin of mint;

d. a means for processing the image data; and e. an output device to display at least one primary attribute of the coins, wherein the output device is a screen operatively connected to a computer, wherein the computer causes the screen to display a graphical representation of the coins processed, wherein the graphical representation of the coins processed comprises a grid comprising:

a. a plurality of coin vacancies; and b. a date associated with each vacancy, c. wherein each vacancy is populated with a graphic representing a value associated with the respective vacancy.

2. The coin identification system of claim 1, further comprising a means for discriminating the coins to be routed into one of a plurality of bins.

3. The coin identification system of claim 1, further comprising a circular lighting bracket comprising lighting elements directed radially inward, the lighting bracket positioned adjacent to the imaging device.

4. The coin identification system of claim 1, wherein the graphical representation further comprises a plurality of denomination tabs, each tab comprising a separate grid representing a specific denomination of coins.

5. A method for discriminating coins and displaying a result of the discriminated coins in real time to entertain users, comprising:

a. receiving a plurality of coins in a tray;

b. delivering the plurality of coins to a coin pickup assembly;

c. delivering the plurality of coins to an imaging device;

d. capturing an image data of primary attributes selected from the group consisting of a denomination, a type, a date, and an origin of mint with the imaging device;

e. collecting, with an auxiliary sensor, additional data of secondary attributes by which coins can be discriminated;

f. processing acquired images of a number of coins having at least one of the primary attributes and at least one of the secondary attributes with a computer, wherein the computer determines primary attributes of the coins and secondary attributes of the coins;

g. routing the plurality of coins along a ramp into one of a plurality of bins; and h. displaying a graphical representation of at least one primary attribute on to a screen in real time, wherein the graphical representation of the coins processed comprises a grid comprising a plurality of coin vacancies, each coin vacancy having associated with it coin data selected from the group consisting of primary attributes and secondary attributes.

6. The method of claim 5, wherein processing acquired images comprises performing adaptive thresholding.

7. The method of claim 5, wherein processing acquired images comprises performing segmentation to extract a sub-image containing at least one primary attribute.

8. The method of claim 5, further comprising populating each vacancy with a graphic representing a value associated with the coin data associated with the respective vacancy in real time.

9. The method of claim 8, further comprising temporarily animating the vacancy with an animated image when a coin belonging to that vacancy is registered.

10. The coin identification system of claim 5, wherein the graphical representation further comprises a plurality of denomination tabs, each tab comprising a separate grid representing a specific denomination of coins.

11. The method of claim 5, further comprising displaying the total value of the coins processed.

12. The method of claim 5, further comprising displaying additional data about each coin when a coin image is actuated.

13. The method of claim 5, further comprising determining a promotional value based on information selected from the group consisting of primary attributes and secondary attributes.

14. The method of claim 13, further comprising redeeming the promotional value for a tangible product.

15. The method of claim 5, further comprising saving information acquired from a user on a central database for remote access from a computing device.

16. The method of claim 5, further comprising sending information acquired from a first user to a computing device of a second user.

* * * * *